United States Patent
Hoyes

(10) Patent No.: US 10,388,500 B2
(45) Date of Patent: *Aug. 20, 2019

(54) MASS SPECTROMETER

(71) Applicant: Micromass UK Limited, Wilmslow (GB)

(72) Inventor: John Hoyes, Stockport (GB)

(73) Assignee: Micromass UK Limited, Wilmslow (GB)

( * ) Notice: Subject to any disclaimer, the term of this patent is extended or adjusted under 35 U.S.C. 154(b) by 33 days.

This patent is subject to a terminal disclaimer.

(21) Appl. No.: 15/619,726

(22) Filed: Jun. 12, 2017

(65) Prior Publication Data

US 2017/0372881 A1 Dec. 28, 2017

Related U.S. Application Data

(63) Continuation of application No. 11/996,236, filed as application No. PCT/GB2006/002728 on Jul. 21, 2006, now Pat. No. 9,679,752.

(60) Provisional application No. 60/701,466, filed on Jul. 21, 2005.

(30) Foreign Application Priority Data

Jul. 21, 2005 (GB) .................................. 0514964.6

(51) Int. Cl.
*H01J 49/00* (2006.01)
*C08L 23/04* (2006.01)
*H01J 49/42* (2006.01)

(52) U.S. Cl.
CPC ............ *H01J 49/004* (2013.01); *C08L 23/04* (2013.01); *H01J 49/422* (2013.01); *H01J 49/429* (2013.01); *H01J 49/4215* (2013.01)

(58) Field of Classification Search
CPC .... H01J 49/004; H01J 49/4215; H01J 49/422; H01J 49/429; C08L 23/04
USPC .......................... 250/281, 282, 283, 292, 293
See application file for complete search history.

(56) References Cited

U.S. PATENT DOCUMENTS

| | | | |
|---|---|---|---|
| 5,206,506 | A | 4/1993 | Kirchner |
| 6,177,668 | B1 | 1/2001 | Hager |
| 6,504,148 | B1 | 1/2003 | Hager |
| 6,525,312 | B1 | 2/2003 | Cousins |
| 6,585,891 | B1 | 7/2003 | Ohkawa |
| 6,660,154 | B2 | 7/2003 | Franzen et al. |

(Continued)

FOREIGN PATENT DOCUMENTS

| | | |
|---|---|---|
| EP | 1271138 | 1/2003 |
| EP | 1367633 | 12/2003 |

(Continued)

OTHER PUBLICATIONS http://www.indiana.edu./~clemmer/Research/ion20mobility/intro/im20intro.htm, Indiana University webpage explaining the principle of ion Mobility.

(Continued)

*Primary Examiner* — Nicole M Ippolito

(57) ABSTRACT

A mass spectrometer is disclosed comprising a mass selective ion trap and a quadrupole rod set mass filter arranged downstream of the mass selective ion trap. Ions are mass selectively ejected from the ion trap in a substantially synchronized manner with the scanning of the mass filter in order to increase the duty cycle of the mass filter.

19 Claims, 35 Drawing Sheets

(56) References Cited

U.S. PATENT DOCUMENTS

| | | |
|---|---|---|
| 6,693,276 B2 | 2/2004 | Weiss et al. |
| 6,744,043 B2 | 6/2004 | Loboda |
| 6,770,871 B1 | 8/2004 | Wang et al. |
| 6,781,116 B2 | 8/2004 | Bateman |
| 6,791,078 B2 | 9/2004 | Giles et al. |
| 6,794,642 B2 | 9/2004 | Bateman et al. |
| 6,800,846 B2 | 10/2004 | Bateman et al. |
| 6,812,453 B2 | 11/2004 | Bateman et al. |
| 6,835,928 B2 | 12/2004 | Bateman |
| 6,838,662 B2 | 1/2005 | Bateman et al. |
| 6,875,980 B2 | 4/2005 | Bateman et al. |
| 6,884,995 B2 | 4/2005 | Bateman et al. |
| 6,891,157 B2 | 5/2005 | Bateman et al. |
| 6,894,286 B2 | 5/2005 | Derrick et al. |
| 6,906,319 B2 | 6/2005 | Hoyes |
| 6,914,241 B2 | 7/2005 | Giles et al. |
| 6,956,205 B2 | 10/2005 | Park |
| 6,977,371 B2 | 12/2005 | Bateman et al. |
| 6,992,283 B2 | 1/2006 | Bateman et al. |
| 7,034,292 B1 | 4/2006 | Whitehouse et al. |
| 7,045,797 B2 | 5/2006 | Sudakov et al. |
| 7,049,583 B2 | 5/2006 | Bateman et al. |
| 7,071,467 B2 | 7/2006 | Bateman et al. |
| 7,084,398 B2 | 8/2006 | Loboda et al. |
| 7,087,897 B2 | 8/2006 | Bateman et al. |
| 7,095,013 B2 | 8/2006 | Bateman et al. |
| 7,095,014 B2 | 8/2006 | Hoyes |
| 7,102,126 B2 | 9/2006 | Bateman et al. |
| 7,145,139 B2 | 12/2006 | Syka |
| 7,205,538 B2 | 4/2007 | Bateman et al. |
| 7,288,942 B2 | 10/2007 | Zhang et al. |
| 7,309,861 B2 | 12/2007 | Brown et al. |
| 7,365,319 B2 | 4/2008 | Hager et al. |
| 7,405,401 B2 | 7/2008 | Hoyes |
| 7,586,088 B2 | 9/2009 | Bateman et al. |
| 7,622,711 B2 | 11/2009 | Wildgoose et al. |
| 7,829,841 B2 | 11/2010 | Bateman et al. |
| 7,829,849 B2 | 11/2010 | Giles |
| 7,858,926 B1 | 12/2010 | Whitehouse et al. |
| 7,919,747 B2 | 4/2011 | Green et al. |
| 7,960,694 B2 | 6/2011 | Hoyes |
| 8,153,960 B2 | 4/2012 | Giles et al. |
| 8,389,933 B2 | 3/2013 | Hoyes |
| 8,410,437 B2 | 4/2013 | Brown et al. |
| 8,426,803 B2 | 4/2013 | Green et al. |
| 8,519,328 B2 | 8/2013 | Giles et al. |
| 8,586,917 B2 | 11/2013 | Green et al. |
| 8,598,518 B2 | 12/2013 | Green et al. |
| 8,633,435 B2 | 1/2014 | Kenny et al. |
| 8,742,339 B2 | 6/2014 | Hoyes |
| 8,952,320 B2 | 2/2015 | Bateman et al. |
| 9,012,840 B2 | 4/2015 | Bateman et al. |
| 9,184,039 B2 | 11/2015 | Pringle et al. |
| 9,312,118 B2 | 4/2016 | Hoyes |
| 9,679,752 B2 * | 6/2017 | Hoyes ................ C08L 23/04 |
| 2003/0111595 A1 | 6/2003 | Bateman et al. |
| 2003/0160168 A1 | 8/2003 | Speakman et al. |
| 2004/0026613 A1 * | 2/2004 | Bateman ............. H01J 49/004 250/281 |
| 2004/0031920 A1 | 2/2004 | Giles et al. |
| 2005/0151076 A1 | 7/2005 | Yamaguchi et al. |
| 2008/0251711 A1 * | 10/2008 | Reilly ............... H01J 49/067 250/282 |
| 2009/0134321 A1 | 5/2009 | Hoyes |
| 2010/0065737 A1 | 3/2010 | Bateman et al. |

FOREIGN PATENT DOCUMENTS

| | | |
|---|---|---|
| GB | 2389704 | 12/2003 |
| GB | 2397433 | 7/2004 |
| JP | 2004281350 | 10/2004 |
| JP | 2005116246 | 4/2005 |
| WO | 03/102508 | 12/2003 |
| WO | 2005/067000 | 7/2005 |
| WO | 2006/061593 | 6/2006 |
| WO | 2006/129106 A2 | 12/2006 |
| WO | 2007/125354 A2 | 11/2007 |

OTHER PUBLICATIONS

Tolmachev et al., "Radical Stratification of Ions as a Function of Mass to Charge Ratio in Collisional Cooling Radio Frequency Multipoles Used as Ion Guides or Ion Traps", Rapid Communications in Mass Spectrometry, vol. 14, No. 20, pp. 1907-1913. (2000).

* cited by examiner

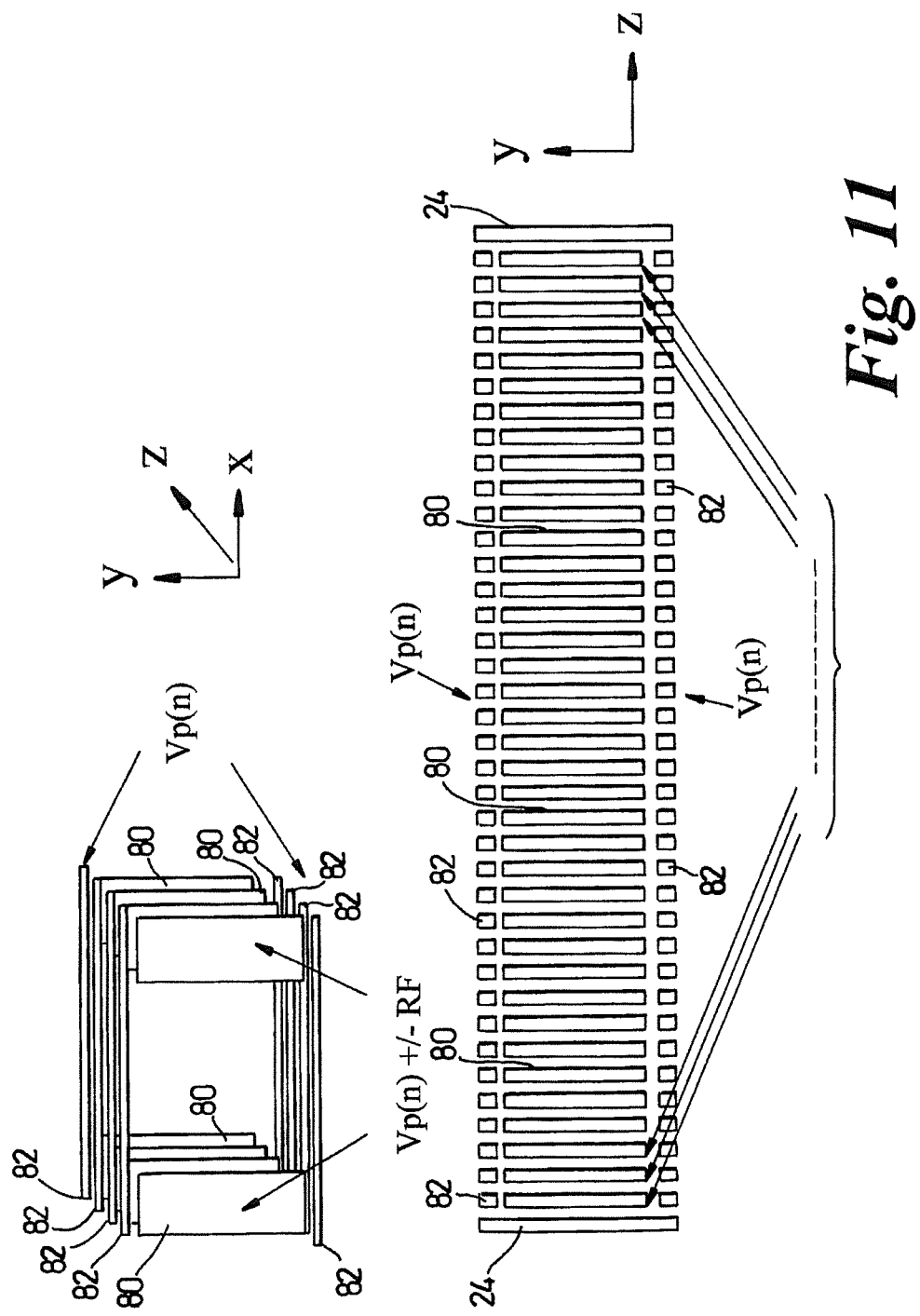

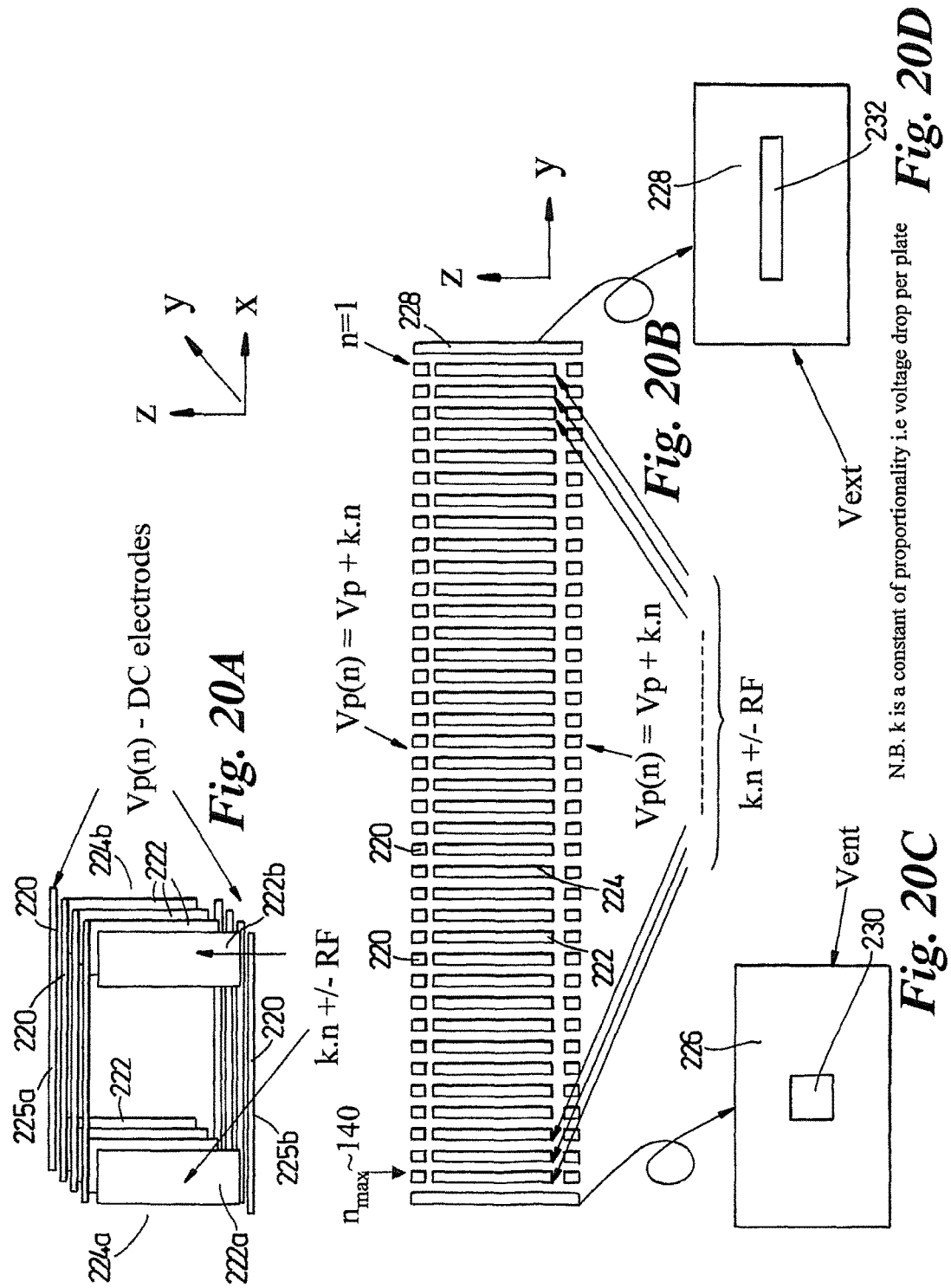

RF plates confine ions in one dimension only, dotted lines show periodicity in effective potential.

V0=50V, Mass 200, X=0 plane, Vent = Vext = 1V showing complete 3D trapping

Potential minima positions are mass dependant so exit plate has rectangular hole to allow ions to exit the device successfully

MASS SPECTROMETER

CROSS-REFERENCE TO RELATED APPLICATION

This application is a continuation of U.S. Application Ser. No. 11/996,236, which is the National Stage of International Application No. PCT/GB2006/002728, filed 21 Jul. 2006, which claims benefit of Provisional Application Ser. No. 60/701,466, filed 21 Jul. 2005, and claims priority from and the benefit of United Kingdom patent application No. 0514964.6 filed on 21 Jul. 2005. The entire contents of these applications are incorporated herein by reference.

BACKGROUND OF THE INVENTION

The present invention relates to a mass spectrometer and a method of mass spectrometry.

DISCUSSION OF THE PRIOR ART

Mass scanning quadrupole mass filters/analysers are ubiquitous analytical devices. However, a major drawback of mass scanning quadrupole mass filters/analysers is that such devices have a low sensitivity due to having a poor duty cycle. If a quadrupole mass filter/analyser scans a mass range of x Da with a mass resolution or peak width of y Da, then the duty cycle of the quadrupole mass filter/analyser will be y/x. Conventional quadrupole mass filters/analysers may typically scan a mass range of 1000 Da with a mass resolution of 1. Accordingly, the duty cycle of a conventional quadrupole mass filter/analyser may be only 1/1000 or 0.1%. As a result the quadrupole mass filter/analyser is only capable of onwardly transmitting 0.1% of the total mass range of ions received by the quadrupole mass filter/mass analyser at any particular instance in time. All ions other than those which are onwardly transmitted at the particular instance in time will have unstable trajectories through the quadrupole mass filter/analyser and hence will be attenuated by the quadrupole mass filter/analyser.

SUMMARY OF THE INVENTION

According to an aspect of the present invention there is provided a mass spectrometer comprising:
a mass or mass to charge ratio selective ion trap comprising a plurality of electrodes;
a first mass filter/analyser or mass spectrometer arranged downstream of the mass or mass to charge ratio selective ion trap; and
control means arranged and adapted:
(i) to cause ions to be selectively ejected or released from the ion trap according to their mass or mass to charge ratio; and
(ii) to scan the first mass filter/analyser or mass spectrometer in a substantially synchronised manner with the selective ejection or release of ions from the ion trap.

The first mass filter/analyser or mass spectrometer preferably comprises a mass or mass to charge ratio scanning mass filter/analyser or mass spectrometer. The first mass filter/analyser or mass spectrometer preferably comprises a quadrupole mass filter/analyser or mass spectrometer e.g. a quadrupole rod set mass filter/analyser or mass spectrometer.

According to a less preferred embodiment the first mass filter/analyser or mass spectrometer may comprise a magnetic sector mass filter/analyser or mass spectrometer.

The ion trap preferably has a mass or mass to charge ratio resolution selected from the group consisting of: (i)<1; (ii) 1-5; (iii) 5-10; (iv) 10-15; (v) 15-20; (vi) 20-25; (vii) 25-30; (viii) 30-35; (ix) 35-40; (x) 40-45; (xi) 45-50; (xii) 50-100; (xiii) 100-150; (xiv) 150-200; (xv) 200-250; (xvi) 250-300; (xvii) 300-350; (xviii) 350-400; (xix) 400-450; (xx) 450-500; (xxi) 500-600; (xxii) 600-700; (xxiii) 700-800; (xxiv) 800-900; (xxv) 900-1000; and (xxvi)>1000.

The first mass filter/analyser or mass spectrometer preferably has a mass or mass to charge ratio resolution selected from the group consisting of: (i)<100; (ii) 100-200; (iii) 200-300; (iv) 300-400; (v) 400-500; (vi) 500-600; (vii) 600-700; (viii) 700-800; (ix) 800-900; (x) 900-1000; (xi) 1000-1500; (xii) 1500-2000; (xiii) 2000-2500; (xiv) 2500-3000; and (xv)>3000.

A preferred feature of the present invention is that the mass or mass to charge ratio resolution of the first mass filter/analyser or mass spectrometer may be greater than the mass or mass to charge ratio resolution of the ion trap. According to an embodiment the mass or mass to charge ratio resolution of the first mass filter/analyser or mass spectrometer is greater than the mass or mass to charge ratio resolution of the ion trap by a multiplicative factor selected from the group consisting of: (i) 1-2; (ii) 2-3; (iii) 3-4; (iv) 4-5; (v) 5-6; (vi) 6-7; (vii) 7-8; (viii) 8-9; (ix) 9-10; (x) 10-11; (xi) 11-12; (xii) 12-13; (xiii) 13-14; (xiv) 14-15; (xv) 15-16; (xvi) 16-17; (xvii) 17-18; (xviii) 18-19; (xix) 19-20; (xx) 20-50; (xxi) 50-100; (xxii) 100-150; (xxiii) 150-200; (xxiv) 200-250; and (xxv)>250.

The first mass filter/analyser or mass spectrometer is preferably arranged to receive ions which have been selectively ejected or released from the ion trap.

The control means is preferably arranged and adapted to cause ions to be sequentially or progressively ejected or released from the ion trap according to their mass or mass to charge ratio.

The control means is preferably arranged and adapted to scan the first mass filter/analyser or mass spectrometer in a substantially continuous and/or linear and/or progressive and/or regular manner. According to another embodiment the control means may be arranged and adapted to scan the first mass filter/analyser or mass spectrometer in a substantially non-continuous and/or stepped and/or non-linear and/or non-progressive and/or irregular manner.

The control means is preferably arranged and adapted to synchronise the selective ejection or release of ions from the ion trap with the scanning of a mass or mass to charge ratio transmission window of the first mass filter/analyser or mass spectrometer.

At least some of the ions selectively ejected or released from the ion trap are preferably onwardly transmitted by the first mass filter/analyser or mass spectrometer.

According to an embodiment one or more ion detectors may be arranged upstream and/or downstream of the ion trap and/or the first mass filter/analyser or mass spectrometer.

A further mass analyser is preferably arranged downstream and/or upstream of the ion trap and/or the first mass filter/analyser or mass spectrometer. The further mass analyser is preferably selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Flight mass analyser; (vi) a magnetic sector mass spectrometer; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic Fourier Transform mass spectrometer; and (xiii) a quadrupole mass analyser.

The ion trap is preferably arranged in a mode of operation to release ions having a first range of mass to charge ratios whilst substantially retaining ions within the ion trap which have mass to charge ratios outside the first range. The first range of mass to charge ratios preferably falls within one or more ranges selected from the group consisting of: (i)<100; (ii) 100-200; (iii) 200-300; (iv) 300-400; (v) 400-500; (vi) 500-600; (vii) 600-700; (viii) 700-800; (ix) 800-900; (x) 900-1000; (xi) 1000-1100; (xii) 1100-1200; (xiii) 1200-1300; (xiv) 1300-1400; (xv) 1400-1500; (xvi) 1500-1600; (xvii) 1600-1700; (xviii) 1700-1800; (xix) 1800-1900; (xx) 1900-2000; and (xxi)>2000.

The ion trap preferably comprises an ion guiding means.

The ion trap preferably comprises an RF electrode set. The RF electrode set may comprise at least one pair of RF electrode stacks. The stacks in each pair of RF electrode stacks are preferably spaced apart across a gas cell and the RF electrodes in each stack are stacked along an ion extraction pathway.

The RF electrode set preferably comprises subsets of RF electrodes disposed along an ion extraction pathway.

One or more potential barriers are preferably created along the axis of the ion trap by a periodicity in an oscillatory RF potential applied to the subsets of RF electrodes.

Means for applying an oscillatory RF potential of a common phase to a plurality of adjacent RF electrodes in a subset of RF electrodes is preferably provided so that a periodicity in an oscillatory RF potential is established between groups of RF electrodes in the subsets.

Means for applying an oscillatory RF potential to the electrodes is preferably provided so as to: (i) generate a pondermotive ion trapping potential generally along at least one axis which is transverse to an ion extraction pathway; and (ii) generate, at least in part, an effective potential along an ion extraction pathway, wherein the effective potential comprises at least one potential barrier the magnitude of which is dependent upon the mass to charge ratio of an ion in a supply of ions and substantially independent of the position of an ion along the transverse axis, wherein the at least one potential barrier is caused by a periodicity in an oscillatory RF potential applied to the electrodes.

The ion trap preferably further comprises AC or RF voltage means arranged and adapted to apply an AC or RF voltage to at least some of the plurality of electrodes.

The AC or RF voltage means is preferably arranged and adapted to apply the AC or RF voltage to at least some of the plurality of electrodes in order to confine radially at least some ions within the ion trap.

The AC or RF voltage means is preferably arranged and adapted to apply an AC or RF voltage to at least 1%, 5%, 10%, 20%, 30%, 40%, 50%, 60%, 70%, 80%, 90%, 95% or 100% of the plurality of electrodes.

The AC or RF voltage means is preferably arranged and adapted to supply an AC or RF voltage having an amplitude selected from the group consisting of: (i)<50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi)>500 V peak to peak.

The AC or RF voltage means is preferably arranged and adapted to supply an AC or RF voltage having a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv)>10.0 MHz.

The ion trap preferably comprises means for confining ions radially within the ion trap. The ion trap preferably comprises means for generating a pondermotive or RF ion trapping potential. The pondermotive or RF ion trapping potential is preferably generated in a direction across or orthogonal to a direction of flow of gas and/or ions through the ion trap. The pondermotive or RF ion trapping potential is preferably generated in a direction orthogonal to a direction of an electrostatic or DC ion trapping potential. The pondermotive or RF ion trapping potential is preferably generated in a direction orthogonal to a direction of an axial electric field applied along the length of the ion trap.

The ion trap preferably comprises means for generating a plurality of axial pseudo-potential wells having a periodicity. The amplitude of the axial pseudo-potential wells is preferably dependent upon the mass to charge ratio of an ion.

The ion trap preferably further comprises means for generating an electrostatic or DC ion trapping potential well.

The electrostatic or DC ion trapping potential well is preferably generated in a direction across or orthogonal to the direction of flow of gas and/or ions through the ion trap. The electrostatic or DC ion trapping potential well is preferably generated in a direction orthogonal to the direction along which a pondermotive or RF potential is generated. The electrostatic or DC ion trapping potential well is preferably generated in a direction orthogonal to a direction of an axial electric field applied along the length of the ion trap.

The means for generating an electrostatic or DC ion trapping potential well preferably comprises at least one pair of electrodes, the electrodes in the at least one pair of electrodes being spaced apart across a gas cell.

The means for generating an electrostatic or DC ion trapping potential well preferably comprises a series of pairs of electrodes disposed along a gas cell.

The ion trap preferably further comprises means for generating further potentials to provide an effective potential which prevents ions from being extracted from an extraction region of the ion trap.

The ion trap is preferably arranged so that the characteristics of the effective potential which prevent ions from being extracted from the extraction region are caused, at least in part, by the generation of a pondermotive or RF ion trapping potential.

According to the preferred embodiment means for applying an axial electric field along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion trap is provided.

The ion trap preferably further comprises means for applying a drift potential along an ion extraction pathway.

The ion trap preferably further comprises means for varying the magnitude of the drift potential in order to selectively extract ions.

The ion trap preferably comprises a gas cell in which a supply of ions in a body of gas is located in use.

At least a portion of the gas cell comprises a gas flow conduit through which ions entrained in a flow of gas can be transported, the conduit having a direction of gas flow. Gas flow means is preferably provided for providing the flow of gas.

The ion trap preferably comprises an ion extraction volume defining an ion extraction pathway. The ion extraction volume preferably comprises a cuboid having a width, height and length. The ratio of the width to the height of the cuboid is selected from the group consisting of: (i)≥1; (ii)≥1.1; (iii)≥1.2; (iv)≥1.3; (v)≥1.4; (vi)≥1.5; (vii)≥1.6; (viii)≥1.7; (ix)≥1.8; (x)≥1.9 and (xi)≥2.0.

According to the preferred embodiment ion extraction means are preferably provided for selectively extracting ions having a predetermined mass to charge ratio or ion mobility from an extraction region of the ion trap.

The ion extraction means is preferably arranged for spatially selective extraction of populations of ions located at a predetermined spatial location within the ion trap.

The ion extraction means may comprise an ion barrier disposed across a gas cell and having an aperture formed therein. The ion trap may further comprise means for applying an extraction field to extract ions through the aperture. The ion trap preferably further comprises an inwardly extending tube formed of a leaky dielectric material which is in communication with the aperture.

The ion trap preferably further comprises means for varying or scanning a plurality of axial pseudo-potential wells created along the axial length of the ion trap.

The ion trap preferably further comprises means for varying an effective potential so as to allow ions of a predetermined mass to charge ratio or ion mobility to be selectively extracted from the ion trap.

The means for varying the effective potential may vary an oscillatory RF potential so as to selectively extract ions.

The means for varying the effective potential preferably varies a pondermotive or RF ion trapping potential within the ion trap in order to cause a selected population of ions to move to a predetermined spatial location.

The means for varying the effective potential may vary an electrostatic or DC ion trapping potential well within the ion trap in order to cause a selected population of ions to move to a predetermined spatial location.

According to a less preferred embodiment means for varying the pressure of a body of gas may be provided in order to cause a selected population of ions to move to a predetermined spatial location.

The ion trap according to an embodiment may comprise a device in which ions are entrained in a laminar flow of a carrier gas and are trapped in a barrier region in which an electrical field is applied across the laminar flow.

According to another embodiment the ion trap may comprise first means arranged and adapted to maintain one or more DC, real or static potential wells or a substantially static inhomogeneous electric field along at least a portion of the axial length of the ion trap in a first mode of operation. The first means may be arranged and adapted to maintain at least 1, 2, 3, 4, 5, 6, 7, 8, 9, 10 or >10 potential wells along at least a portion of the axial length of the ion trap. Preferably, the first means is arranged and adapted to maintain one or more substantially quadratic potential wells along at least a portion of the axial length of the ion trap.

The first means is preferably arranged and adapted to maintain one or more substantially non-quadratic potential wells along at least a portion of the axial length of the ion trap.

The first means is preferably arranged and adapted to maintain one or more potential wells along at least 1%, 5%, 10%, 20%, 30%, 40%, 50%, 60%, 70%, 80%, 90%, 95% or 100% of the axial length of the ion trap.

The first means is preferably arranged and adapted to maintain one or more potential wells having a depth selected from the group consisting of: (i)<10 V; (ii) 10-20 V; (iii) 20-30 V; (iv) 30-40 V; (v) 40-50 V; (vi) 50-60 V; (vii) 60-70 V; (viii) 70-80 V; (ix) 80-90 V; (x) 90-100 V; and (xi)>100 V.

The first means may be arranged and adapted to maintain in the first mode of operation one or more potential wells having a minimum located at a first position along the axial length of the ion trap. The ion trap preferably has an ion entrance and an ion exit, and wherein the first position is located at a distance L downstream of the ion entrance and/or at a distance L upstream of the ion exit, and wherein L is selected from the group consisting of: (i)<20 mm; (ii) 20-40 mm; (iii) 40-60 mm; (iv) 60-80 mm; (v) 80-100 mm; (vi) 100-120 mm; (vii) 120-140 mm; (viii) 140-160 mm; (ix) 160-180 mm; (x) 180-200 mm; and (xi)>200 mm.

The first means preferably comprises one or more DC voltage supplies for supplying one or more DC voltages to at least 1%, 5%, 10%, 20%, 30%, 40%, 50%, 60%, 70%, 80%, 90%, 95% or 100% of the electrodes.

The first means is preferably arranged and adapted to provide an electric field having an electric field strength which varies or increases along at least a portion of the axial length of the ion trap.

The first means may be arranged and adapted to provide an electric field having an electric field strength which varies or increases along at least 1%, 5%, 10%, 20%, 30%, 40%, 50%, 60%, 70%, 80%, 90%, 95% or 100% of the axial length of the ion trap.

According to the preferred embodiment the ion trap preferably comprises second means arranged and adapted to maintain a time varying substantially homogeneous axial electric field along at least a portion of the axial length of the ion trap in the first mode of operation. The second means is preferably arranged and adapted to maintain the time varying homogenous axial electric field along at least 1%, 5%, 10%, 20%, 30%, 40%, 50%, 60%, 70%, 80%, 90%, 95% or 100% of the axial length of the ion trap.

The second means may comprise one or more DC voltage supplies for supplying one or more DC voltages to at least 1%, 5%, 10%, 20%, 30%, 40%, 50%, 60%, 70%, 80%, 90%, 95% or 100% of the electrodes.

The second means may be arranged and adapted in the first mode of operation to generate an axial electric field which has a substantially constant electric field strength along at least a portion of the axial length of the ion trap at any point in time.

The second means is preferably arranged and adapted in the first mode of operation to generate an axial electric field which has a substantially constant electric field strength along at least 1%, 5%, 10%, 20%, 30%, 40%, 50%, 60%, 70%, 80%, 90%, 95% or 100% of the axial length of the ion trap at any point in time.

The second means is preferably arranged and adapted in the first mode of operation to generate an axial electric field which has an electric field strength which varies with time.

The second means is arranged and adapted in the first mode of operation to generate an axial electric field which has an electric field strength which varies by at least 1%, 5%, 10%, 20%, 30%, 40%, 50%, 60%, 70%, 80%, 90%, 95% or 100% with time.

The second means is preferably arranged and adapted in the first mode of operation to generate an axial electric field which changes direction with time.

The second means is preferably arranged and adapted to generate an axial electric field which has an offset which changes with time.

The second means is preferably arranged and adapted to vary the time varying substantially homogeneous axial electric field with or at a first frequency $f_1$, wherein $f_1$ is selected from the group consisting of: (i)<5 kHz; (ii) 5-10 kHz; (iii) 10-15 kHz; (iv) 15-20 kHz; (v) 20-25 kHz; (vi) 25-30 kHz; (vii) 30-35 kHz; (viii) 35-40 kHz; (ix) 40-45 kHz; (x) 45-50 kHz; (xi) 50-55 kHz; (xii) 55-60 kHz; (xiii) 60-65 kHz; (xiv) 65-70 kHz; (xv) 70-75 kHz; (xvi) 75-80 kHz; (xvii) 80-85 kHz; (xviii) 85-90 kHz; (xix) 90-95 kHz; (xx) 95-100 kHz; and (xxi)>100 kHz.

The first frequency $f_1$ is preferably greater than the resonance or fundamental harmonic frequency of at least 5%, 10%, 15%, 20%, 25%, 30%, 35%, 40%, 45%, 50%, 55%, 60%, 65%, 70%, 75%, 80%, 85%, 90%, 95% or 100% of the ions located within an ion trapping region within the ion trap.

The first frequency $f_1$ is preferably at least 5%, 10%, 15%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, 200%, 250%, 300%, 350%, 400%, 450% or 500% greater than the resonance or fundamental harmonic frequency of at least 5%, 10%, 15%, 20%, 25%, 30%, 35%, 40%, 45%, 50%, 55%, 60%, 65%, 70%, 75%, 80%, 85%, 90%, 95% or 100% of the ions located within an ion trapping region within the ion trap.

The ion trap comprises ejection means arranged and adapted in a mode of operation to eject at least some ions from a trapping region of the ion trap in a substantially non-resonant manner whilst other ions are arranged to remain substantially trapped within the trapping region of the ion trap.

The ejection means is preferably arranged and adapted to alter and/or vary and/or scan the amplitude of a time varying substantially homogeneous axial electric field.

The ejection means is preferably arranged and adapted to increase the amplitude of the time varying substantially homogeneous axial electric field.

The ejection means is preferably arranged and adapted to increase the amplitude of a time varying substantially homogeneous axial electric field in a substantially continuous and/or linear and/or progressive and/or regular manner.

The ejection means is preferably arranged and adapted to increase the amplitude of the time varying substantially homogeneous axial electric field in a substantially non-continuous and/or non-linear and/or non-progressive and/or irregular manner.

The ejection means is preferably arranged and adapted to alter and/or vary and/or scan the frequency of oscillation or modulation of the time varying substantially homogeneous axial electric field.

The ejection means is preferably arranged and adapted to decrease the frequency of oscillation or modulation of the time varying substantially homogeneous axial electric field.

The ejection means is preferably arranged and adapted to decrease the frequency of oscillation or modulation of the time varying substantially homogeneous axial electric field in a substantially continuous and/or linear and/or progressive and/or regular manner.

The ejection means may preferably be arranged and adapted to decrease the frequency of oscillation or modulation of the time varying substantially homogeneous axial electric field in a substantially non-continuous and/or non-linear and/or non-progressive and/or irregular manner.

The ion trap preferably comprises ejection means arranged and adapted to mass or mass to charge ratio selectively eject ions from the ion trap.

The ejection means is preferably arranged and adapted in the first mode of operation to cause substantially all ions having a mass to charge ratio below a first mass to charge ratio cut-off to be ejected from an ion trapping region of the ion trap.

The ejection means is preferably arranged and adapted in the first mode of operation to cause substantially all ions having a mass to charge ratio above a first mass to charge ratio cut-off to remain or be retained or confined within an ion trapping region of the ion trap.

The first mass to charge ratio cut-off preferably falls within a range selected from the group consisting of: (i)<100; (ii) 100-200; (iii) 200-300; (iv) 300-400; (v) 400-500; (vi) 500-600; (vii) 600-700; (viii) 700-800; (ix) 800-900; (x) 900-1000; (xi) 1000-1100; (xii) 1100-1200; (xiii) 1200-1300; (xiv) 1300-1400; (xv) 1400-1500; (xvi) 1500-1600; (xvii) 1600-1700; (xviii) 1700-1800; (xix) 1800-1900; (xx) 1900-2000; and (xxi)>2000.

The ejection means is preferably arranged and adapted to increase the first mass to charge ratio cut-off. The ejection means is preferably arranged and adapted to increase the first mass to charge ratio cut-off in a substantially continuous and/or linear and/or progressive and/or regular manner. Alternatively, the ejection means may be arranged and adapted to increase the first mass to charge ratio cut-off in a substantially non-continuous and/or non-linear and/or non-progressive and/or irregular manner.

The ejection means is preferably arranged and adapted in the first mode of operation to eject ions substantially axially from the ion trap.

Ions are preferably arranged to be trapped or axially confined within an ion trapping region within the ion trap, the ion trapping region having a length l, wherein l is selected from the group consisting of: (i)<20 mm; (ii) 20-40 mm; (iii) 40-60 mm; (iv) 60-80 mm; (v) 80-100 mm; (vi) 100-120 mm; (vii) 120-140 mm; (viii) 140-160 mm; (ix) 160-180 mm; (x) 180-200 mm; and (xi)>200 mm.

The ion trap preferably comprises a linear ion trap.

The plurality of electrodes may have a cross-section selected from the group consisting of: (i) approximately or substantially circular; (ii) approximately or substantially hyperbolic; (iii) approximately or substantially arcuate or part-circular; and (iv) approximately or substantially rectangular or square.

The ion trap preferably comprises a multipole rod set ion trap.

The ion trap preferably comprises a quadrupole, hexapole, octapole or higher order multipole rod set. A radius inscribed by the multipole rod set ion trap is preferably selected from the group consisting of: (i)<1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi)>10 mm.

The ion trap may be segmented axially or comprise a plurality of axial segments.

The ion trap preferably comprises x axial segments, wherein x is selected from the group consisting of: (i)<10; (ii) 10-20; (iii) 20-30; (iv) 30-40; (v) 40-50; (vi) 50-60; (vii) 60-70; (viii) 70-80; (ix) 80-90; (x) 90-100; and (xi)>100. Each axial segment preferably comprises 1, 2, 3, 4, 5, 6, 7, 8, 9, 10, 11, 12, 13, 14, 15, 16, 17, 18, 19, 20 or >20 electrodes.

The axial length of at least 1%, 5%, 10%, 20%, 30%, 40%, 50%, 60%, 70%, 80%, 90%, 95% or 100% of the axial segments is selected from the group consisting of: (i)<1 mm;

(ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi)>10 mm.

The spacing between at least 1%, 5%, 10%, 20%, 30%, 40%, 50%, 60%, 70%, 80%, 90%, 95% or 100% of the axial segments is preferably selected from the group consisting of: (i)<1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; and (xi)>10 mm.

The ion trap preferably comprises a plurality of non-conducting, insulating or ceramic rods, projections or devices.

The ion trap preferably comprises 1, 2, 3, 4, 5, 6, 7, 8, 9, 10, 11, 12, 13, 14, 15, 16, 17, 18, 19, 20 or >20 rods, projections or devices.

The plurality of non-conducting, insulating or ceramic rods, projections or devices may further comprise one or more resistive or conducting coatings, layers, electrodes, films or surfaces disposed on, around, adjacent, over or in close proximity to the rods, projections of devices.

The ion trap preferably comprises a plurality of electrodes having apertures wherein ions are transmitted, in use, through the apertures.

Preferably, at least 1%, 5%, 10%, 20%, 30%, 40%, 50%, 60%, 70%, 80%, 90%, 95% or 100% of the electrodes have apertures which are substantially the same size or which have substantially the same area.

According to an embodiment at least 1%, 5%, 10%, 20%, 30%, 40%, 50%, 60%, 70%, 80%, 90%, 95% or 100% of the electrodes have apertures which become progressively larger and/or smaller in size or in area in a direction along the axis of the ion trap.

According to an embodiment at least 1%, 5%, 10%, 20%, 30%, 40%, 50%, 60%, 70%, 80%, 90%, 95% or 100% of the electrodes have apertures having internal diameters or dimensions selected from the group consisting of: (i)≤1.0 mm; (ii)≤2.0 mm; (iii)≤3.0 mm; (iv)≤4.0 mm; (v)≤5.0 mm; (vi)≤6.0 mm; (vii)≤7.0 mm; (viii)≤8.0 mm; (ix)≤9.0 mm; (x)≤10.0 mm; and (xi)>10.0 mm.

The ion trap may comprise a plurality of plate or mesh electrodes and wherein at least some of the electrodes are arranged generally in the plane in which ions travel in use or are arranged generally orthogonal to the plane in which ions travel in use.

The ion trap may comprise a plurality of plate or mesh electrodes and wherein at least 50%, 55%, 60%, 65%, 70%, 75%, 80%, 85%, 90%, 95% or 100% of the electrodes are arranged generally in the plane in which ions travel in use or are arranged generally orthogonal to the plane in which ions travel in use.

The ion trap preferably comprises at least 2, 3, 4, 5, 6, 7, 8, 9, 10, 11, 12, 13, 14, 15, 16, 17, 18, 19, 20 or >20 plate or mesh electrodes.

The plate or mesh electrodes preferably have a thickness selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm.

The plate or mesh electrodes are preferably spaced apart from one another by a distance selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm.

The plate or mesh electrodes are preferably supplied with an AC or RF voltage. Adjacent plate or mesh electrodes are preferably supplied with an opposite phase of the AC or RF voltage.

The AC or RF voltage preferably has a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv)>10.0 MHz.

The amplitude of the AC or RF voltage is preferably selected from the group consisting of: (i)<50V peak to peak; (ii) 50-100V peak to peak; (iii) 100-150V peak to peak; (iv) 150-200V peak to peak; (v) 200-250V peak to peak; (vi) 250-300V peak to peak; (vii) 300-350V peak to peak; (viii) 350-400V peak to peak; (ix) 400-450V peak to peak; (x) 450-500V peak to peak; and (xi)>500V peak to peak.

The ion trap preferably further comprises a first outer plate electrode arranged on a first side of the ion trap and a second outer plate electrode arranged on a second side of the ion trap.

The ion trap preferably further comprises biasing means to bias the first outer plate electrode and/or the second outer plate electrode at a bias DC voltage with respect to the mean voltage of the plate or mesh electrodes to which an AC or RF voltage is applied. The biasing means is preferably arranged and adapted to bias the first outer plate electrode and/or the second outer plate electrode at a voltage selected from the group consisting of: (i) less than −10V; (ii)−9 to −8V; (iii)−8 to −7V; (iv)−7 to −6V; (v)−6 to −5V; (vi)−5 to −4V; (vii)−4 to −3V; (viii)−3 to −2V; (ix)−2 to −1V; (x)−1 to 0V; (xi) 0 to 1V; (xii) 1 to 2V; (xiii) 2 to 3V; (xiv) 3 to 4V; (xv) 4 to 5V; (xvi) 5 to 6V; (xvii) 6 to 7V; (xviii) 7 to 8V; (xix) 8 to 9V; (xx) 9 to 10V; and (xxi) more than 10V.

The first outer plate electrode and/or the second outer plate electrode may be supplied in use with a DC only voltage. Alternatively, the first outer plate electrode and/or the second outer plate electrode may be supplied in use with an AC or RF only voltage. According to another embodiment the first outer plate electrode and/or the second outer plate electrode may be supplied in use with a DC and an AC or RF voltage.

The ion trap may further comprise one or more insulator layers interspersed, arranged, interleaved or deposited between the plurality of plate or mesh electrodes.

The ion trap may comprise a substantially curved or non-linear ion guiding or ion trapping region.

The ion trap may comprise a plurality of axial segments. For example, the ion trap may comprise at least 5, 10, 15, 20, 25, 30, 35, 40, 45, 50, 55, 60, 65, 70, 75, 80, 85, 90, 95 or 100 axial segments.

The ion trap may have a substantially circular, oval, square, rectangular, regular or irregular cross-section.

According to an embodiment the ion trap may have an ion guiding region which varies in size and/or shape and/or width and/or height and/or length along at least a portion of the ion guiding region. The ion trap preferably comprises 1, 2, 3, 4, 5, 6, 7, 8, 9, 10 or >10 electrodes. According to another embodiment the ion trap comprises at least: (i) 10-20 electrodes; (ii) 20-30 electrodes; (iii) 30-40 electrodes; (iv) 40-50 electrodes; (v) 50-60 electrodes; (vi) 60-70 electrodes; (vii) 70-80 electrodes; (viii) 80-90 electrodes; (ix) 90-100 electrodes; (x) 100-110 electrodes; (xi) 110-120 electrodes; (xii) 120-130 electrodes; (xiii) 130-140 electrodes; (xiv) 140-150 electrodes; or (xv)>150 electrodes.

The ion trap preferably has a length selected from the group consisting of: (i)<20 mm; (ii) 20-40 mm; (iii) 40-60 mm; (iv) 60-80 mm; (v) 80-100 mm; (vi) 100-120 mm; (vii) 120-140 mm; (viii) 140-160 mm; (ix) 160-180 mm; (x) 180-200 mm; and (xi)>200 mm.

According to an embodiment there is provided means arranged and adapted to maintain in a mode of operation the ion trap at a pressure selected from the group consisting of: (i)<$1.0\times10^{-1}$ mbar; (ii)<$1.0\times10^{-2}$ mbar; (iii)<$1.0\times10^{-3}$ mbar; (iv)<$1.0\times10^{-4}$ mbar; (v)<$1.0\times10^{-5}$ mbar; (vi)<$1.0\times10^{-6}$ mbar; (vii)<$1.0\times10^{-7}$ mbar; (viii)<$1.0\times10^{-8}$ mbar; (ix) <$1.0\times10^{-9}$ mbar; (x)<$1.0\times10^{-10}$ mbar; (xi)<$1.0\times10^{-11}$ mbar; and (xii)<$1.0\times10^{-12}$ mbar.

According to an embodiment there is provided means arranged and adapted to maintain in a mode of operation the ion trap at a pressure selected from the group consisting of: (i)>$1.0\times10^{-3}$ mbar; (ii)>$1.0\times10^{-2}$ mbar; (iii)>$1.0\times10^{-1}$ mbar; (iv)>1 mbar; (v)>10 mbar; (vi)>100 mbar; (vii)>$5.0\times10^{-3}$ mbar; (viii)>$5.0\times10^{-2}$ mbar; (ix) $10^{-3}-10^{-2}$ mbar; and (x) $10^{-4}-10^{-1}$ mbar.

In a mode of operation ions may be trapped but are not substantially fragmented within the ion trap. According to another embodiment ions may be arranged and adapted to collisionally cool or substantially thermalise ions within at least a portion of the ion trap in a mode of operation.

Means may be provided which are arranged and adapted to collisionally cool or thermalise ions within the ion trap is arranged to collisionally cool or to substantially thermalise ions prior to and/or subsequent to ions being ejected from the ion trap.

The ion trap may further comprise fragmentation means arranged and adapted to substantially fragment ions within the ion trap. The fragmentation means is preferably arranged and adapted to fragment ions by Collisional Induced Dissociation ("CID") or by Surface Induced Dissociation ("SID").

The ion trap is preferably arranged and adapted in a mode of operation to resonantly and/or mass selectively eject ions from the ion trap.

The ion trap may be arranged and adapted to eject ions axially and/or radially from the ion trap.

According to an embodiment the ion trap may be arranged and adapted to adjust the frequency and/or amplitude of an AC or RF voltage applied to the plurality of electrodes in order to eject ions by mass selective instability. The ion trap may be arranged and adapted to superimpose an AC or RF supplementary waveform or voltage to the plurality of electrodes in order to eject ions by resonance ejection. The ion trap may be arranged and adapted to apply a DC bias voltage to the plurality of electrodes in order to eject ions.

In a mode of operation the ion trap may be arranged to transmit ions or store ions without the ions being mass selectively and/or non-resonantly ejected from the ion trap.

In a mode of operation the ion trap may be arranged to mass filter or mass analyse ions.

In a mode of operation the ion trap may be arranged to act as a collision or fragmentation cell without ions being mass selectively and/or non-resonantly ejected from the ion trap.

The ion trap may comprise means arranged and adapted to store or trap ions within a portion of the ion trap in a mode of operation at one or more positions which are closest to the entrance and/or centre and/or exit of the ion trap.

According to an embodiment the ion trap further comprises means arranged and adapted to trap ions within the ion trap in a mode of operation and to progressively move the ions towards the entrance and/or centre and/or exit of the ion trap.

The ion trap may further comprise means arranged and adapted to apply one or more transient DC voltages or one or more transient DC voltage waveforms to the plurality of electrodes initially at a first axial position, wherein the one or more transient DC voltages or one or more transient DC voltage waveforms are then subsequently provided at second, then third different axial positions along the ion trap.

The ion trap may further comprise means arranged and adapted to apply, move or translate one or more transient DC voltages or one or more transient DC voltage waveforms from one end of the ion trap to another end of the ion trap in order to urge ions along at least a portion of the axial length of the ion trap. The one or more transient DC voltages may create: (i) a potential hill or barrier; (ii) a potential well; (iii) multiple potential hills or barriers; (iv) multiple potential wells; (v) a combination of a potential hill or barrier and a potential well; or (vi) a combination of multiple potential hills or barriers and multiple potential wells.

The one or more transient DC voltage waveforms may comprise a repeating waveform or square wave.

The ion trap may further comprise means arranged to apply one or more trapping electrostatic or DC potentials at a first end and/or a second end of the ion trap.

The ion trap may further comprise means arranged to apply one or more trapping electrostatic potentials along the axial length of the ion trap.

According to an embodiment the mass spectrometer may further comprise one or more further ion guides, ion guiding regions, ion traps or ion trapping regions arranged upstream and/or downstream of the ion trap. The one or more further ion guides, ion guiding regions, ion traps or ion trapping regions may be arranged and adapted to collisionally cool or to substantially thermalise ions within the one or more further ion guides, ion guiding regions, ion traps or ion trapping regions. The one or more further ion guides, ion guiding regions, ion traps or ion trapping regions may be arranged and adapted to collisionally cool or to substantially thermalise ions within the one or more further ion guides, ion guiding regions, ion traps or ion trapping regions prior to and/or subsequent to ions being introduced into the ion trap.

The mass spectrometer may further comprise means arranged and adapted to introduce, axially inject or eject, radially inject or eject, transmit or pulse ions from the one or more further ion guides, ion guiding regions, ion traps or ion trapping regions into the ion trap.

According to an embodiment the mass spectrometer may further comprise means arranged and adapted to substantially fragment ions within the one or more further ion guides, ion guiding regions, ion traps or ion trapping regions.

The mass spectrometer may further comprise means arranged and adapted to introduce, axially inject or eject, radially inject or eject, transmit or pulse ions into the ion trap.

The ion trap may comprise a linear mass or mass to charge ratio selective ion trap comprising means arranged and adapted to mass or mass to charge ratio selectively eject ions from the ion trap in a substantially non-resonant or resonant manner whilst other ions remain trapped within the ion trap.

According to alternative embodiments the ion trap may be selected from the group consisting of: (i) a 3D quadrupole field or Paul ion trap; (ii) a 2D or linear quadrupole ion trap; or (iii) a magnetic or Penning ion trap.

The mass spectrometer preferably further comprises an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

The ion source may comprise a continuous or pulsed ion source.

The mass spectrometer may further comprise a collision cell.

According to an embodiment the mass spectrometer may further comprise a second mass or mass to charge ratio selective ion trap, a second mass filter/analyser or mass spectrometer arranged downstream of the second mass or mass to charge ratio selective ion trap and second control means arranged and adapted: (i) to cause ions to be selectively ejected or released from the second ion trap according to their mass or mass to charge ratio; and (ii) to scan the second mass filter/analyser or mass spectrometer in a substantially synchronised manner with the selective ejection or release of ions from the second ion trap.

The second mass or mass to charge ratio selective ion trap preferably comprises an ion trap as described above. Similarly, the second mass filter/analyser or mass spectrometer preferably comprises a mass scanning mass filter/analyser or mass spectrometer such as a quadrupole rod set mass filter/analyser or mass spectrometer or a magnetic sector mass filter/analyser or mass spectrometer.

According to another aspect of the present invention there is provided a method of mass spectrometry comprising:
providing a mass or mass to charge ratio selective ion trap;
providing a first mass filter/analyser or mass spectrometer downstream of the mass or mass to charge ratio selective ion trap;
causing ions to be selectively ejected or released from the ion trap according to their mass or mass to charge ratio; and
scanning the first mass filter/analyser or mass spectrometer in a substantially synchronised manner with the selective ejection or release of ions from the ion trap.

According to another aspect of the present invention there is provided a mass spectrometer comprising:
an ion mobility selective ion trap comprising a plurality of electrodes;
a first mass filter/analyser or mass spectrometer arranged downstream of the ion mobility selective ion trap; and
control means arranged and adapted:

(i) to cause ions to be selectively ejected or released from the ion trap according to their ion mobility; and
(ii) to scan the first mass filter/analyser or mass spectrometer in a substantially synchronised manner with the selective ejection or release of ions from the ion trap.

According to another aspect of the present invention there is provided a method of mass spectrometry comprising:
providing an ion mobility selective ion trap comprising a plurality of electrodes;
providing a first mass filter/analyser or mass spectrometer downstream of the ion mobility selective ion trap;
causing ions to be selectively ejected or released from the ion trap according to their ion mobility; and
scanning the first mass filter/analyser or mass spectrometer in a substantially synchronised manner with the selective ejection or release of ions from the ion trap.

According to an aspect of the present invention there is provided a mass spectrometer device including:
a mass selective or ion mobility selective ion trap;
a mass scanning mass spectrometer located downstream of the ion trap so that ions ejected from the ion trap are directed into the mass scanning mass spectrometer; and
control means for: (i) sequentially and selectively ejecting ions from the ion trap according to the mass to charge ratio or the ion mobility of the ions; (ii) scanning the mass of the ions transmitted by the mass scanning mass spectrometer; and (iii) synchronising (i) and (ii) so that the mass of at least some of the ions directed into the mass scanning mass spectrometer corresponds to the mass of the ions transmitted by the mass scanning mass spectrometer.

According to an aspect of the present invention there is provided a method of performing mass spectrometry including:
sequentially and selectively ejecting ions from a mass selective or ion mobility selective ion trap according to the mass to charge ratio or the ion mobility of the ions;
directing the ejected ions to a mass scanning mass spectrometer; and
scanning the mass of the ions transmitted by the mass scanning mass spectrometer;
in which the ejection of the ions from the ion trap and the scanning of the mass scanning mass spectrometer are synchronised so that the mass of at least some of the ions directed into the mass scanning mass spectrometer corresponds to the mass of the ions transmitted by the mass scanning mass spectrometer.

The preferred embodiment enables a significant enhancement in the duty cycle of a scanning mass filter/analyser such as a quadrupole rod set mass filter/analyser to be obtained thereby significantly improving the sensitivity of such mass filters/analysers.

The term "mass scanning mass spectrometer" should be understood as meaning a mass filter/analyser or mass spectrometer which is configured to allow only ions having a particular or selected mass or mass to charge ratio to be onwardly transmitted at any particular instance in time. The mass to charge ratio transmission window of the mass filter/analyser or mass spectrometer progressively varies as the mass filter/analyser is being scanned. As a result onwardly transmitted by the mass filter/analyser the mass or mass to charge ratio of ions which are permitted to pass through the mass filter/analyser progressively varies with time.

Scanning mass filters/analysers or mass spectrometers may be contrasted with, for example, a Time of Flight mass analyser where ions having a wide range of mass to charge ratios are simultaneously pulsed into a drift or time of flight region. The ions then become temporally separated and the mass to charge ratio of the ions is determined by measuring the flight time of the ions through the drift or time of flight region before the ions reach an ion detector arranged at the end of the drift or time of flight region.

According to the preferred embodiment the mass or mass to charge ratio scanning mass filter/analyser or mass spectrometer which is coupled to the ion trap comprises a quadrupole rod set mass filter/analyser or mass spectrometer.

According to an embodiment the mass selective ion trap which is preferably arranged upstream of the mass filter/analyser comprises a gas cell. A supply of ions in a body of gas is preferably provided to the gas cell. A means for generating a pondermotive ion trapping potential is preferably provided. The pondermotive ion trapping potential preferably causes ions to be radially confined within the ion trap. In addition, a means for generating further potentials to provide an effective axial potential which prevents ions from being extracted from an extraction region at one end of the ion trap is preferably provided.

The mass selective ion trap is preferably configured so that the characteristics of the effective potential which prevent ions from being extracted from the extraction region are caused, at least in part, by the generation of pondermotive ion trapping potential.

The mass selective ion trap preferably further comprises an ion extraction means for selectively extracting ions having a predetermined mass to charge ratio or ion mobility from the extraction region of the ion trap.

The preferred ion trap may be operated either as a mass or mass to charge ratio selective ion trap or as an ion mobility selective device.

A particular advantage of an ion trap according to the preferred embodiment is that the ion trap can selectively emit ions on a timescale commensurate with the timescale on which the mass filter/analyser or mass spectrometer arranged downstream of the ion trap performs a scan over a mass range. This timescale may be of the order of hundreds of milliseconds.

According to another less preferred embodiment the ion trap may comprise an ion mobility selective device. Ions may be entrained in a laminar flow of a carrier gas. The ions may then preferably be trapped in a barrier region in which an electrical field is applied across the laminar flow. An advantage of this form of ion mobility selective ion trap is that it can selectively emit ions on a timescale commensurate with the timescale on which a mass filter/analyser or mass spectrometer arranged downstream of the ion trap performs a scan over a mass range. The timescale may be of the order of hundreds of milliseconds.

According to other embodiments the mass selective ion trap may comprise a Paul ion trap, a 3D quadrupole field ion trap, a magnetic ("Penning") ion trap or a linear quadrupole ion trap.

The preferred ion trap preferably enhances the sensitivity of a mass scanning mass filter/analyser by storing ions and then preferably supplying substantially only those ions to the mass scanning mass filter/analyser which correspond generally with the mass to charge ratio transmission window of the mass filter/analyser will be onwardly transmitted by the mass filter/analyser at any given time in the mass scanning cycle of the mass filter/analyser.

For maximum sensitivity, ions are preferably ejected from the mass selective ion trap such that they arrive at the mass scanning mass filter/analyser when ions having such mass to charge ratios are being scanned by the mass selective mass spectrometer and not at other times. If the resolution of the mass selective ion trap is equal to or better than the resolution of the mass filter/analyser then it is apparent that the mass filter/analyser is largely superfluous. However, the preferred embodiment is particularly advantageous when a mass selective ion trap is used which has a lower resolution than that of the mass filter/analyser. According to an embodiment the mass or mass to charge ratio resolution of the mass filter/analyser may be ×5 to ×15 times greater than the mass resolution of the mass selective ion trap. Preferably, the mass resolution of the mass filter/analyser may be ×10 that of the mass selective ion trap. Mass resolution may be defined as $M/\Delta M$, wherein M is the mass or mass to charge ratio of an ion and $\Delta M$ is the minimum number of mass units that an ion can differ from mass M and still be resolved from ions of mass M.

An ion accumulation trap or stage may be provided upstream of the mass selective or ion mobility selective ion trap.

According to an embodiment a mass spectrometer may be provided comprising two mass selective ion traps and/or two corresponding mass filters/analysers. A collision, fragmentation or reaction cell may also be provided so that a variant of a triple quadrupole mass spectrometer may be provided.

According to an embodiment of the present invention a method of mass spectrometry is provided wherein ions are sequentially and selectively ejected from a mass selective or ion mobility selective ion trap. The ejected ions are preferably passed or directed to a mass scanning mass filter/analyser or mass spectrometer which preferably comprises a quadrupole rod set mass filter/analyser. The mass or mass to charge ratio of the ions transmitted by the mass scanning mass filter/analyser is preferably scanned. The ejection of the ions from the ion trap and the scanning of the mass scanning mass filter/analyser is preferably synchronised so that the mass or mass to charge ratio of at least some of the ions directed into or passed to the mass scanning mass filter/analyser substantially corresponds to the instantaneous mass to charge ratio transmission window of the mass scanning mass filter/analyser.

A method of selectively extracting ions is also disclosed which preferably comprises providing a supply of ions in a body of gas. The method preferably further comprises generating a ponderomotive ion trapping potential to confine ions radially. Further potentials are preferably generated to provide an effective potential which prevents ions from being extracted from an extraction region. The ions are preferably trapped in the effective potential. Ions are preferably selectively extracted which have a predetermined mass to charge ratio or ion mobility from the extraction region. The characteristics of the effective potential which prevent ions from being extracted from the extraction region are preferably caused, at least in part, by the generation of the ponderomotive ion trapping potential.

The preferred mass selective ion trap preferably causes a pondermotive ion trapping potential to be generated generally along an axis. Further potentials are preferably generated to provide an effective potential which: (a) preferably causes spatial separation of ions having different mass to charge ratios and/or ion mobilities; and/or (b) contains one or more potential barriers the effective magnitude of which is preferably dependent upon the mass or mass to charge ratio of an ion passing through the device. The ions are preferably trapped in the effective potential. The method preferably further comprises selectively extracting ions of a predetermined mass to charge ratio or ion mobility.

A method of selectively extracting ions is disclosed comprising the steps of: (i) providing a supply of ions in a body of gas in an ion extraction volume, the ion extraction volume defining an ion extraction pathway; (ii) generating a pondermotive ion trapping potential generally along a first axis; (iii) generating an electrostatic ion trapping potential well generally along a second axis which is preferably orthogonal to the first axis. Steps (i), (ii) and (iii) are preferably performed so as to provide an effective potential which causes spatial separation of ions having differing mass to charge ratios and/or ions having different ion mobilities. A plurality of spatially separate populations of ions are preferably produced each having different mass to charge ratios and/or a plurality of spatially separate populations of ions of different ion mobilities. The method preferably further comprises selectively extracting a population of ions.

The effective potential well within a preferred ion trap is preferably created by the combination of an RF potential and an electrostatic potential and is preferably dependent upon the charge on an ion in the potential in a way that permits spatial separation of ions of different mass to charge ratios e.g. ions of similar mass but differing charge. The preferred ion trap exploits this phenomenon to provide selective extraction of ions.

According to a less preferred embodiment since the effective potential is also dependent upon ion mobility then this may be exploited to provide ion mobility dependent selective extraction of ions.

The preferred ion trap is not dependent upon space charge effects to achieve spatial separation and space charge effects may be reduced through appropriate design of the ion trapping environment.

The preferred embodiment provides a way of separating ions in a predictive manner and enables efficient coupling to further stages such as mass spectrometer stages. Methods of ion separation, storage or trapping and fragmentation are also disclosed.

The ions in the preferred ion trap may be entrained in a flow of gas. The pondermotive ion trapping potential and the electrostatic ion trapping potential are preferably generated generally along single axes which are preferably orthogonal to the direction of the flow of gas.

An electrostatic or DC ion trapping potential well may be generated by applying potentials to at least one pair of preferably spaced apart electrodes. The body of gas and ions preferably passes between the two electrodes.

The pondermotive or RF ion trapping potential is preferably generated by applying an AC or RF voltage to a set of electrodes such as a multipole rod set or a ring set. DC electrostatic potentials may also preferably be applied to the RF electrodes in order to assist in the generation of the electrostatic ion trapping potential well.

A population of ions may be extracted from a predetermined spatial location within the preferred ion trap. Selective extraction of a population of ions may be achieved by causing a selected population of ions to move to a predetermined spatial location. A population of ions may then be extracted from the predetermined spatial location. A selected population of ions may be caused to move to the predetermined spatial location by varying the effective potential. The effective potential may be varied by varying the pondermotive or RF ion trapping potential and/or the electrostatic or DC ion trapping potential well.

According to a less preferred embodiment the effective potential may be varied by varying the pressure of the body of gas.

A population of ions may be extracted from a predetermined spatial location by providing an ion barrier across the body of gas. The ion barrier may have an aperture located therein. Ions are preferably extracted through the aperture. Selected populations of ions can be extracted by tuning the effective potential so that the spatial position occupied by a population of ions is adjusted to coincide with the predetermined spatial location from which ions can be extracted through the aperture.

A drift potential may be applied along the body of gas.

According to an embodiment a method of selectively extracting ions may be used wherein a supply of ions in a body of gas in an ion extraction volume is provided. The ion extraction volume preferably defines an ion extraction pathway. An electrode set to which an AC or RF voltage is supplied is preferably provided. An oscillatory RF potential is preferably provided to the RF electrode set to: (a) generate a ponderomotive ion trapping potential generally along at least one axis which is preferably transverse to the ion extraction pathway; and (b) generate an effective potential along the ion extraction pathway. The effective potential along the ion extraction pathway preferably contains at least one potential barrier. The magnitude of the potential barrier is preferably dependent on the mass to charge ratio of an ion in the supply of ions and is preferably substantially independent of the position of the ion along the transverse axis. The effective potential along the ion extraction pathway is preferably generated, at least in part, by the oscillatory RF potential applied to the RF electrode set. The at least one potential barrier is preferably caused by a periodicity in the oscillatory RF potential applied to the RF electrode set. The effective potential is preferably varied so as to allow ions of a predetermined mass to charge ratio or ion mobility to be selectively extracted.

In this way a flexible, sensitive and accurate way of trapping and extracting ions is preferably provided. High duty cycles approaching or actually achieving 100% duty cycle across the entire mass range may be obtained. An additional advantage of the preferred ion trap is that bunching of ions into intense packets may be achieved thereby lessening noise in ADC systems.

The RF electrode set preferably comprises subsets of RF electrodes disposed along the ion extraction pathway. The at least one potential barrier along the ion extraction pathway is preferably caused by a periodicity in the oscillatory RF potential applied to subsets of RF electrodes disposed along the ion extraction pathway.

The effective potential may also comprise an additional drift potential which may preferably be applied along the ion extraction pathway. Ions may be selectively extracted by varying the magnitude of the drift potential. Alternatively, or additionally, ions may be selectively extracted by varying the magnitude of the oscillatory RF potential.

The ions are preferably entrained in a flow of gas and the ponderomotive ion trapping potential is preferably generated generally along at least one axis which is preferably orthogonal to the direction of the flow of gas.

The method may further comprise the step of generating an electrostatic ion trapping potential well generally along an axis which is orthogonal to an axis along which the ponderomotive ion trapping potential is generated, and orthogonal to the ion extraction pathway. The electrostatic ion trapping potential well may be generated by applying potentials to at least one pair of electrodes, the at least one pair of electrodes being spaced apart across the body of gas. In these embodiments, DC electrostatic potentials may be applied to the RF electrode set to assist in the generation of the electrostatic ion trapping potential well.

In an alternative embodiment, a pondermotive ion trapping potential may be generated generally along two axes which are mutually orthogonal and also which are orthogonal to the ion extraction pathway. In this instance an expanded RF electrode set may be employed, preferably having additional subsets of RF electrodes disposed along the ion extraction pathway. Advantageously, the RF electrodes in the additional subsets may be thinner than the RF electrodes in the other subsets of RF electrodes.

According to an embodiment there is provided an ion extraction device. The ion extraction device preferably comprises a gas cell in which a supply of ions in a body of gas can be located. Means for generating a ponderomotive ion trapping potential generally along an axis is provided. Means for generating further potentials to provide an effective potential which prevents ions from being extracted from an extraction region is also preferably provided. The device is preferably configured so that the characteristics of the effective potential which prevent ions from being extracted from the extraction region are caused, at least in part, by the generation of the ponderomotive ion trapping potential. Ion extraction means for selectively extracting ions having a predetermined mass to charge ratio or ion mobility from the extraction region may be provided.

According to an embodiment there is provided an ion extraction device comprising a gas cell in which a supply of ions in a body of gas is provided in use. The gas cell preferably has an ion extraction volume defining an ion extraction pathway. Means for generating a ponderomotive ion trapping potential is preferably provided. The pondermotive potential is preferably generated across the gas cell. Means for generating an electrostatic or DC ion trapping potential well is preferably provided. The electrostatic or DC potential well is preferably generated across the gas cell generally along a single axis which is preferably orthogonal to the single axis along which the pondermotive potential is generated. An ion extraction means for spatially selective extraction of populations of ions located at a predetermined spatial location is also preferably provided.

The ion extraction device may be operated in various modes including an ion separation, ion storage or ion fragmentation mode of operation.

At least a portion of the gas cell may comprise a gas flow conduit through which ions entrained in a flow of gas are preferably transported. The conduit having a direction of gas flow. The device may further comprise gas flow means for providing the flow of gas. Means for generating a pondermotive or RF ion trapping potential may generate DC potential across the direction of flow. Similarly, means for generating an electrostatic or DC ion trapping potential well may generate a potential well also across the direction of flow.

The means for generating a ponderomotive ion trapping potential preferably comprises providing an RF electrode set. The RF electrode set may comprise at least one pair of RF electrodes. The electrodes in each pair of RF electrodes are preferably spaced apart across the gas cell. In some embodiments having a single pair of RF electrode stacks, RF electrodes in the RF electrode stacks may extend along substantially the entire length of the gas cell. In other embodiments having a single pair of RF electrode stacks, the RF electrodes in each stack may be stacked along the length of the gas cell.

Alternatively, the RF electrode set may comprise a series of pairs of RF electrode stacks spaced apart across the gas cell. The electrodes in each stack may be stacked in a direction orthogonal to a longitudinal axis of the gas cell.

The means for generating an electrostatic ion trapping potential well may comprise at least one pair of electrodes. The electrodes in the at least one pair of electrodes are preferably spaced apart across the gas cell. The means for generating an electrostatic ion trapping potential well preferably comprises a series of pairs of electrodes disposed along the gas cell. Alternatively, the means for generating an electrostatic ion trapping potential well may comprise a single pair of electrodes spaced apart across the gas cell. The single pair of electrodes may be inclined with respect to the direction of flow. Potentials may be applied to the series of pairs of electrodes so as to apply a drift field along at least a portion of the gas cell.

In another embodiment, the means for generating a ponderomotive ion trapping potential may comprise an RF electrode set, the means for generating an electrostatic ion trapping potential well comprises a series of pairs of electrodes disposed along the gas cell, and the device comprises a plurality of segmented RF electrode/electrode units, in which each unit comprises a coplanar arrangement of two opposed RF electrodes and two opposed electrodes.

DC electrostatic potentials may be applied to the means for generating a pondermotive ion trapping potential so as to assist in the generation of the electrostatic ion trapping potential well.

The ion extraction means may comprise an ion barrier disposed across the gas flow conduit having an aperture formed therein. The ion barrier preferably prevents ions from crossing the barrier and hence leaving the ion extraction device. The ion barrier may comprise a physical barrier, such as an end cap, and/or may comprise means for applying an ion retarding electric field. The ion extraction device may further comprise means for applying an extraction field to extract ions through the aperture.

The ion extraction means may comprise an inwardly extending tube formed of a leaky dielectric material which is in communication with the aperture.

At least one of the means for generating a pondermotive ion trapping potential, the means for generating an electrostatic ion trapping potential well, and the pressure of the body of gas may be variable so as to cause a selected population of ions to move to a predetermined spatial location.

The ion extraction device may be used as a gas collision cell.

According to another embodiment there is provided an ion extraction device comprising a gas cell in which a supply of ions in a body of gas is located in use. The gas cell preferably has an ion extraction volume defining an ion extraction pathway. Ion guidance means comprising an RF electrode set is preferably provided. Means for applying an oscillatory RF potential to the RF electrode set so as to: (a) generate a ponderomotive ion trapping potential generally along at least one axis which is transverse to the ion extraction pathway; and (b) generate, at least in part, an effective potential along the ion extraction pathway is preferably provided. The effective potential along the ion extract pathway preferably contains at least one potential barrier the magnitude of which is dependent on the mass to charge ratio of an ion in the supply of ions and substantially independent of the position of the ion along the transverse axis; in which the at least one potential barrier is caused by a periodicity in the oscillatory RF potential applied to the RF electrode set. Means for varying the effective potential so as to allow ions of a predetermined mass to charge ratio or ion mobility to be selectively extracted from the device is also preferably provided.

Preferably, the ion guiding means further comprises means for generating an electrostatic ion trapping potential well generally along an axis which is orthogonal to an axis along which the ponderomotive ion trapping potential is generated and orthogonal to the ion extraction pathway. The means for generating an electrostatic ion trapping potential well may comprise at least one pair of electrodes, the electrodes in the at least one pair of electrodes being spaced apart across the gas cell. The means for generating an electrostatic ion trapping potential well may comprise a series of pairs of electrodes disposed along the gas cell. Potentials may be applied to the series of pairs of electrodes so as to apply a drift field along the ion extraction pathway.

DC electrostatic potentials may be applied to the RF electrode set so as to assist in the generation of the electrostatic ion trapping potential well.

Advantageously, the ion extraction volume comprises a cuboid having a width, height and length and a rectangular cross section, wherein the width is different from the height. The pondermotive ion trapping potential is preferably generated generally along an axis corresponding to the width of the cuboid. The ratio of the width to the height of the cuboid is preferably at least 1:1.5, further preferably greater than 1:1.7.

The device may comprise an entrance end plate at one end of the device having at least one ion inlet. The device may comprise an exit end plate at the other end of the device having at least one ion exit. A drift potential may be applied along the ion extraction pathway by way of applying voltages to the end plates.

Preferred devices may be cascaded together to produce arrays of devices in x, y or z directions, or in combinations of directions. Ions can be transferred between adjacent devices by using electrodes with slots, holes, meshes or other apertures. These electrodes may preferably be common to the adjacent devices.

The RF electrode set may comprise at least one pair of RF electrode stacks wherein the stacks in each pair of RF electrode stacks are spaced apart across the gas cell and the RF electrodes in each stack are stacked along the ion extraction pathway.

The means for applying an oscillatory RF potential may apply oscillatory RF potential of a common phase to a plurality of adjacent RF electrodes in a subset of RF electrodes. Accordingly, the periodicity in the oscillatory RF potential is established between groups of RF electrodes in the subsets. In this instance, it may be desirable to also apply an ion trapping oscillatory RF potential to RF electrodes in each pair of RF electrode stacks, wherein the phases of the ion trapping oscillatory RF potential applied to adjacent RF electrodes are opposed. This ion trapping oscillatory RF potential acts to confine high mass ions, which otherwise might have a tendency to strike the electrodes of the devices, by providing a strong potential barrier towards the sides of the device whilst not significantly affecting the effective potential along the main device axis. Preferably, the ion trapping oscillatory RF potential is applied 90° out of phase with the oscillatory RF potential applied to each subset of RF electrodes; this improves ion trapping, and reduces the peak voltages imposed on the RF electrodes.

Ion travelling wave devices may be used. Means for applying a travelling axial field may be provided having a periodicity that when averaged over time overcomes the barrier in a similar manner to a DC axial field when generated by a potential divider between adjacent electrodes.

According to an embodiment an ion extraction devices may be provided comprising ion supply means for generating a supply of ions to the gas cell. Ions may be created using a suitable ionisation technique such as Electrospray ionisation, MALDI (Matrix Assisted Laser Desorption Ionisation), Electron Impact, Chemical Ionisation, Fast Atom Bombardment, Field Ionisation, Field Desorption and soft ionisation techniques employing vacuum ultraviolet or soft x-ray radiation produced by a convenient light source such as a laser. Generally, the ions are generated externally of the gas cell, but in principle might be generated inside the gas cell.

According to another embodiment a tandem ion separation device may be provided comprising a first ion extraction device coupled to an ion separation stage. An upstream ion extraction device may be provided which operates as an ion mobility separator, and a downstream ion extraction device may be provided which separates ions according to their mass to charge ratio. The upstream ion extraction device can then operate at relatively high pressures. Alternatively, the ion separation stage may comprise mass spectrometry means. The mass spectrometry means may comprise a multipole mass spectrometer. In this instance, the mass spectrometry means may operate as a mass filter, and the first ion extraction device may operate as an ion mobility separator. The ion separation stage may supply ions to the first ion extraction device.

According to an embodiment there is provided a mass spectrometer device comprising: a mass selective or ion mobility selective ion trap; and a mass scanning mass spectrometer located downstream of the ion trap so that the ions ejected from the ion trap are directed into the mass scanning mass spectrometer. Control means are preferably provided for: (i) sequentially and selectively ejecting ions from the ion trap according to the mass to charge ratio or the ion mobility of the ions; (ii) scanning the mass of the ions transmitted by the mass scanning mass spectrometer; and (iii) synchronising (i) and (ii) so that the mass of at least some of the ions directed into the mass scanning mass spectrometer corresponds to the mass of the ions transmitted by the mass scanning mass spectrometer thereby enhancing the sensitivity of the mass scanning mass spectrometer.

In this way, enhancements in duty cycle can be obtained. The duty cycle may be enhanced compared to a system utilising an identical mass scanning mass spectrometer without a mass selective or ion mobility selective ion trap.

The scanning speed of the preferred ion trap and the scanning speed of the mass scanning mass filter/analyser or mass spectrometer are preferably matched. In practice, this may mean employing an ion trap having a scanning speed slow enough to match the scanning speed of the mass scanning mass spectrometer.

Preferably the mass resolution of the mass scanning mass spectrometer is greater than the mass resolution of the ions ejected from the ion trap by a multiplicative factor in the range 2 to 250, preferably 5 to 15, further preferably about 10. Mass resolution is defined as $M/\Delta M$, where M is the mass of an ion and $\Delta M$ is the minimum number of mass units that an ion can differ from mass M and still be resolved from ions of mass M. It should be noted that the mass resolution $M/\Delta M$ for a quadrupole mass spectrometer generally varies as a function of M. Also, it is possible for the mass resolution of the ion trap to vary as a function of M. Therefore, the multiplicative factor may vary as a function of M. The ranges of the multiplicative factor discussed above may be referenced to an ion of mass 100 amu. Advantageously, an ion accumulation trap is provided upstream of the mass selective or ion mobility selective ion trap.

BRIEF DESCRIPTIONS OF THE DRAWINGS

Various embodiments of the present invention will now be described, by way of example only, and with reference to the accompanying drawings in which:

FIG. 11 shows a perspective view and side view of an embodiment of an ion extraction device;

FIG. 20A shows a cross-sectional view of a preferred ion trap in the xz plane, FIG. 20B shows a side view, FIG. 20C shows a rear end view and FIG. 20D shows a front end view of a preferred ion extraction device;

Figure 25A:
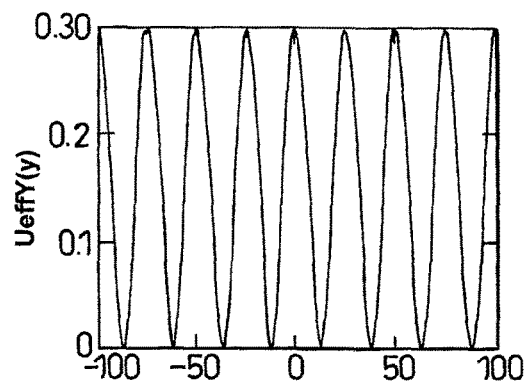
Figure 25B:
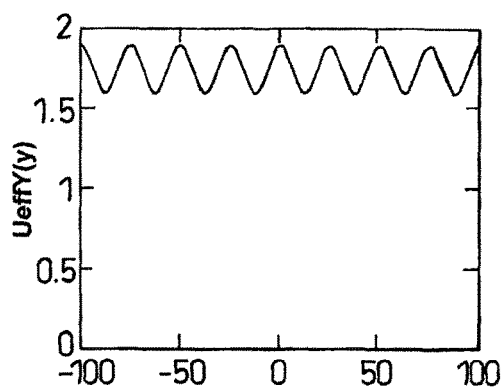
Figure 25C:
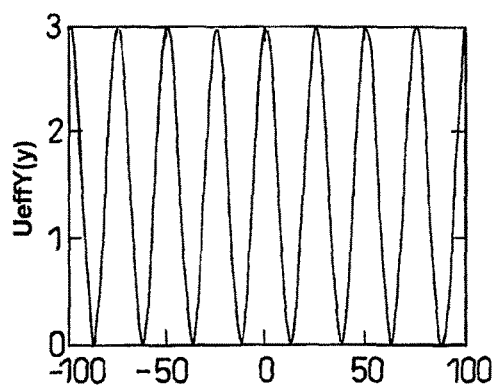
Figure 25D:
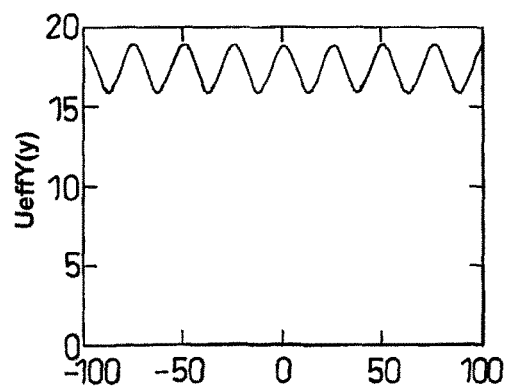
Figure 26:
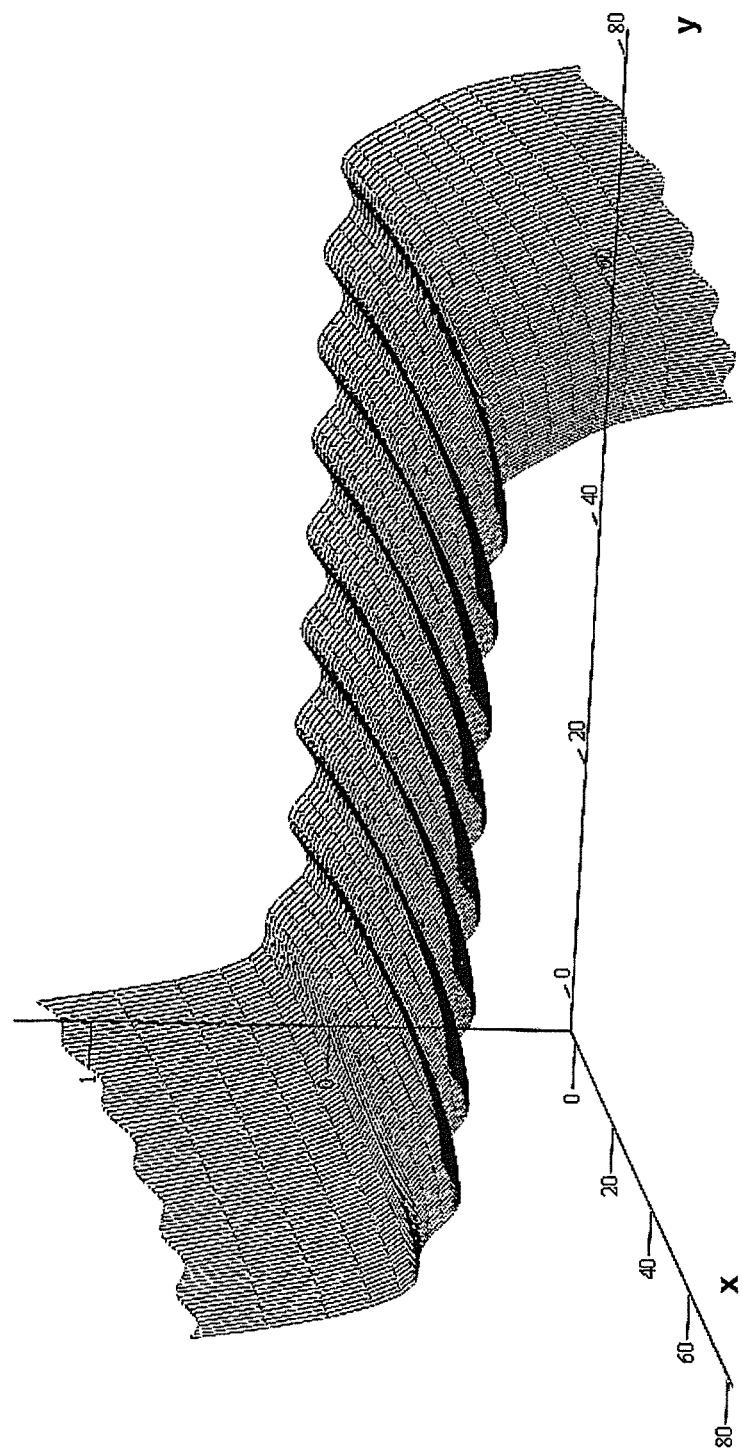
Figure 27:
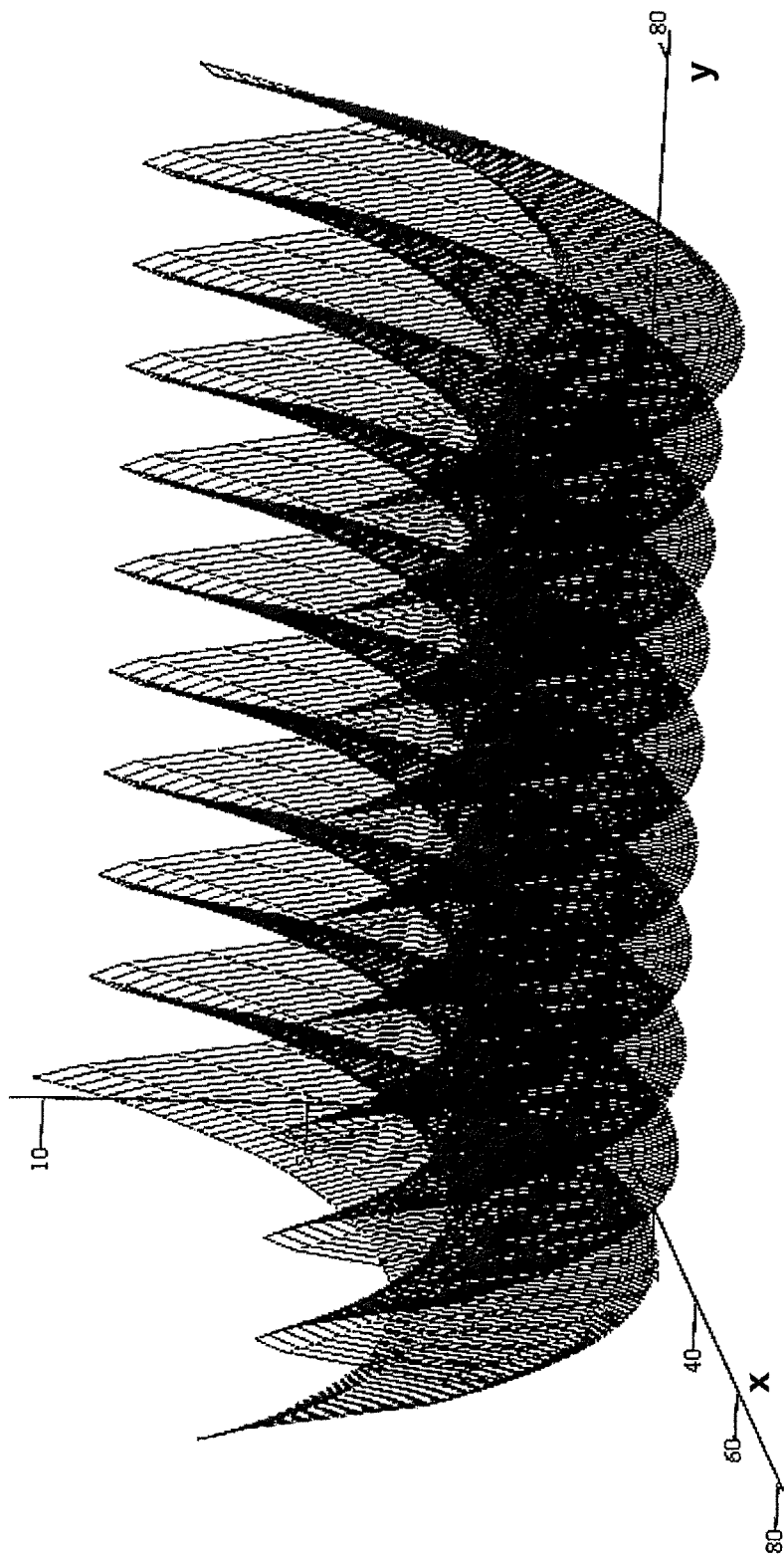
Figure 28:
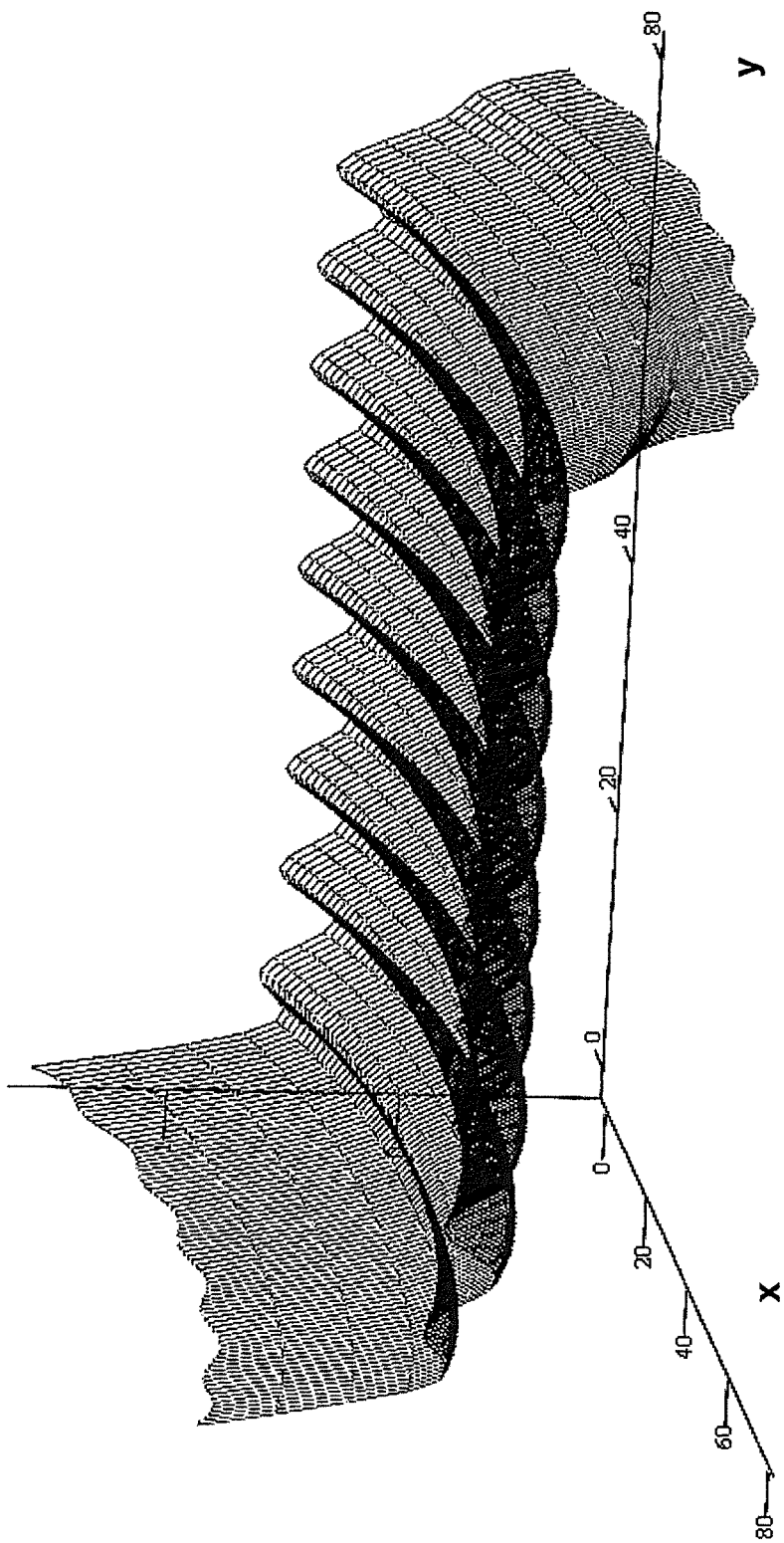
Figure 29:
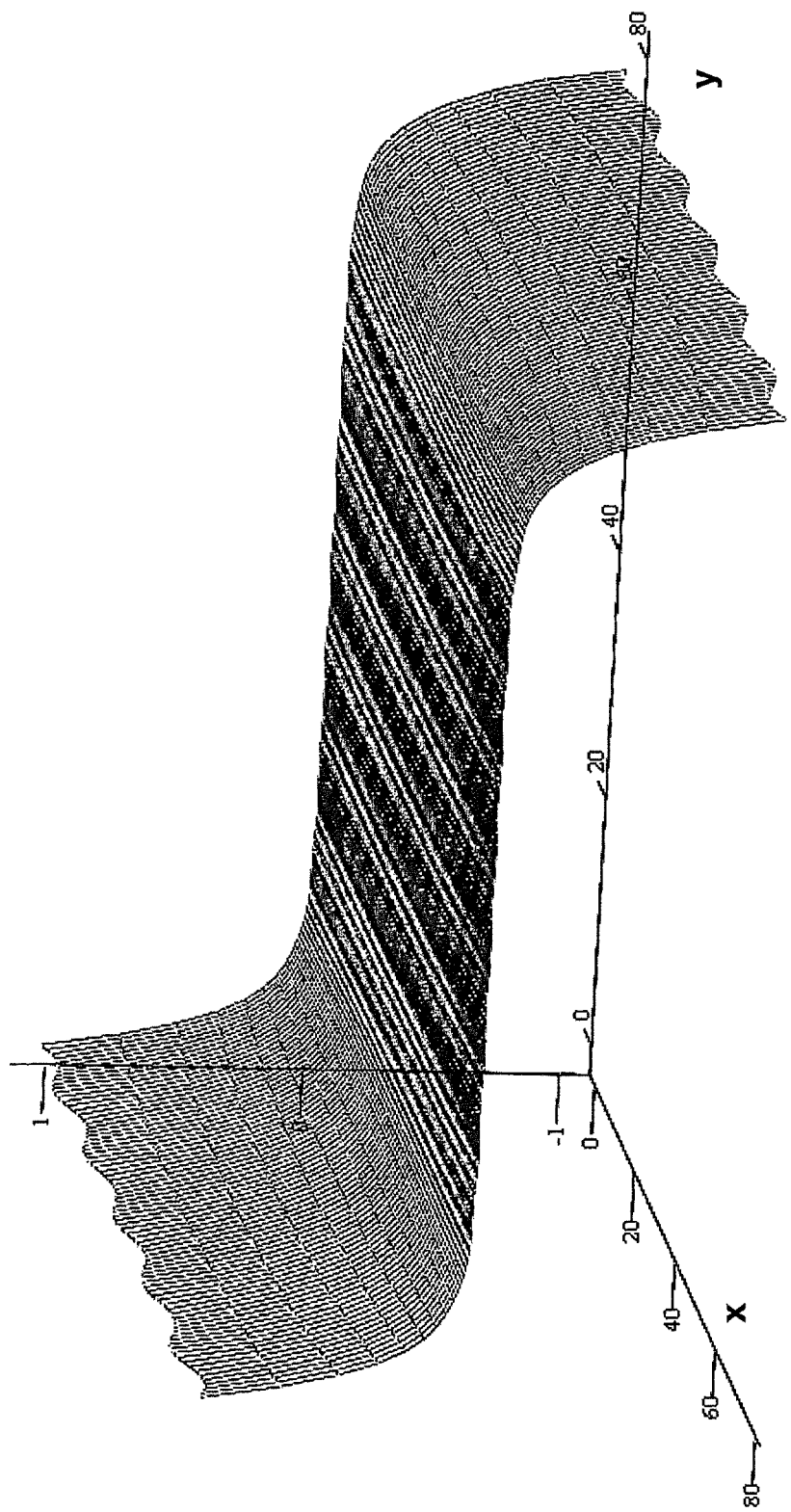
Figure 30:
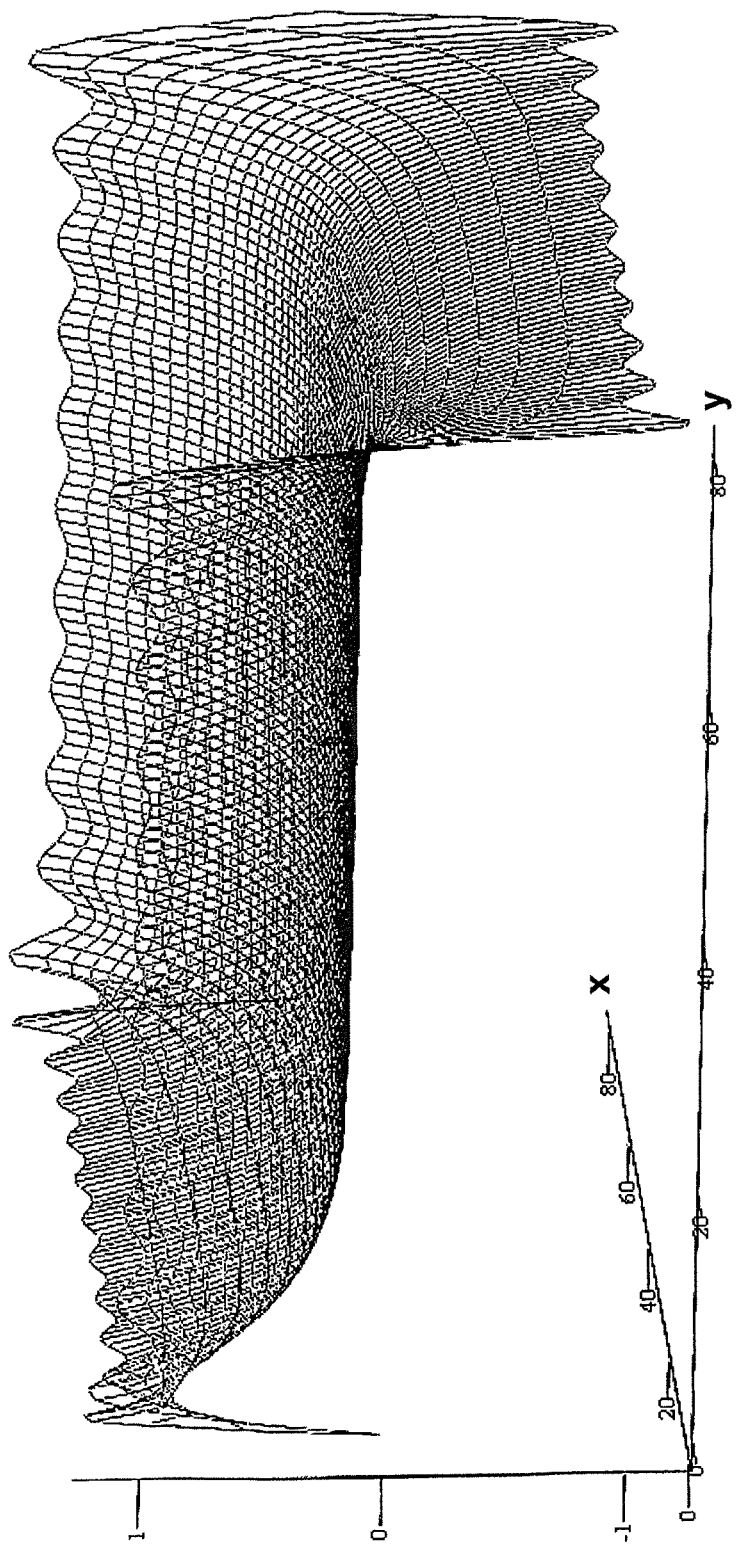
Figure 31:
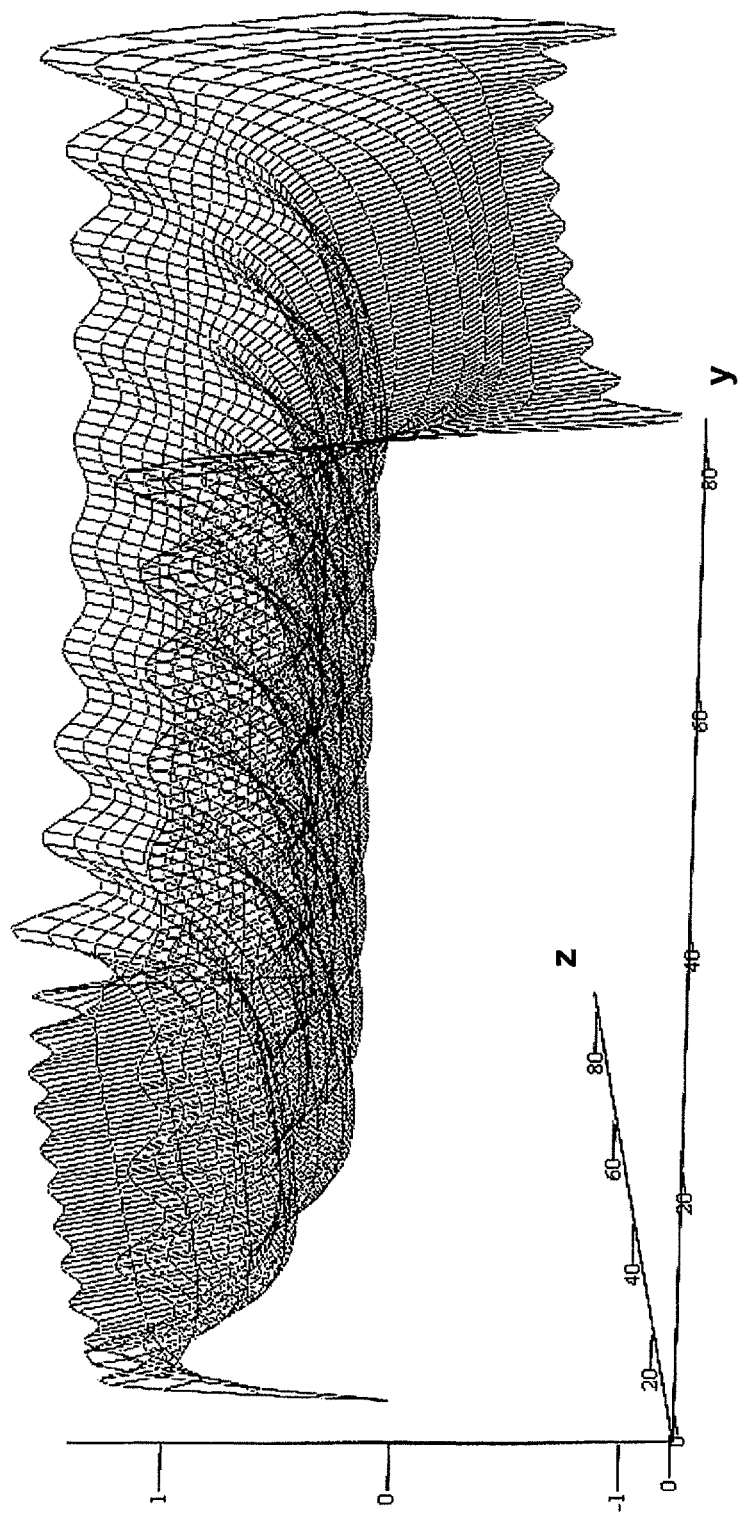
Figure 32:
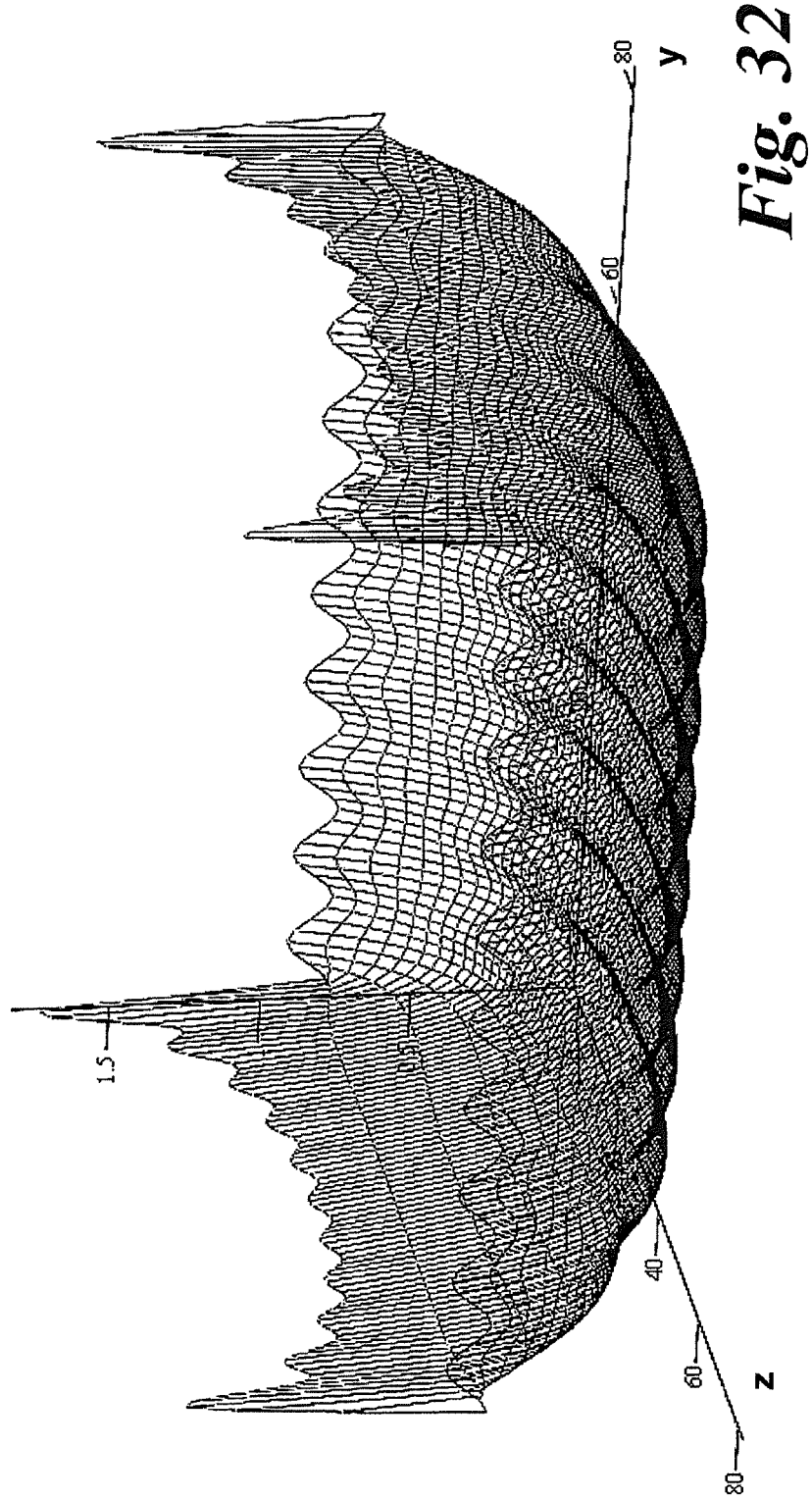
Figure 33A:
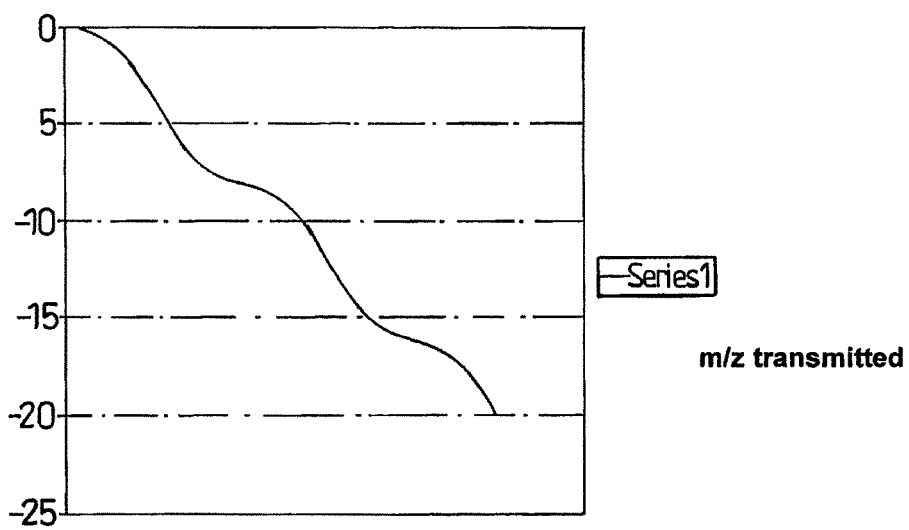
Figure 33B:
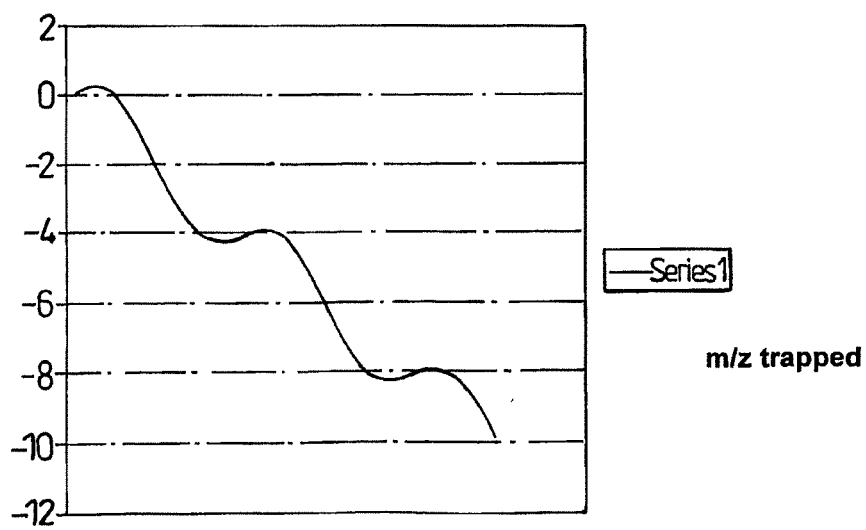
Figure 34:
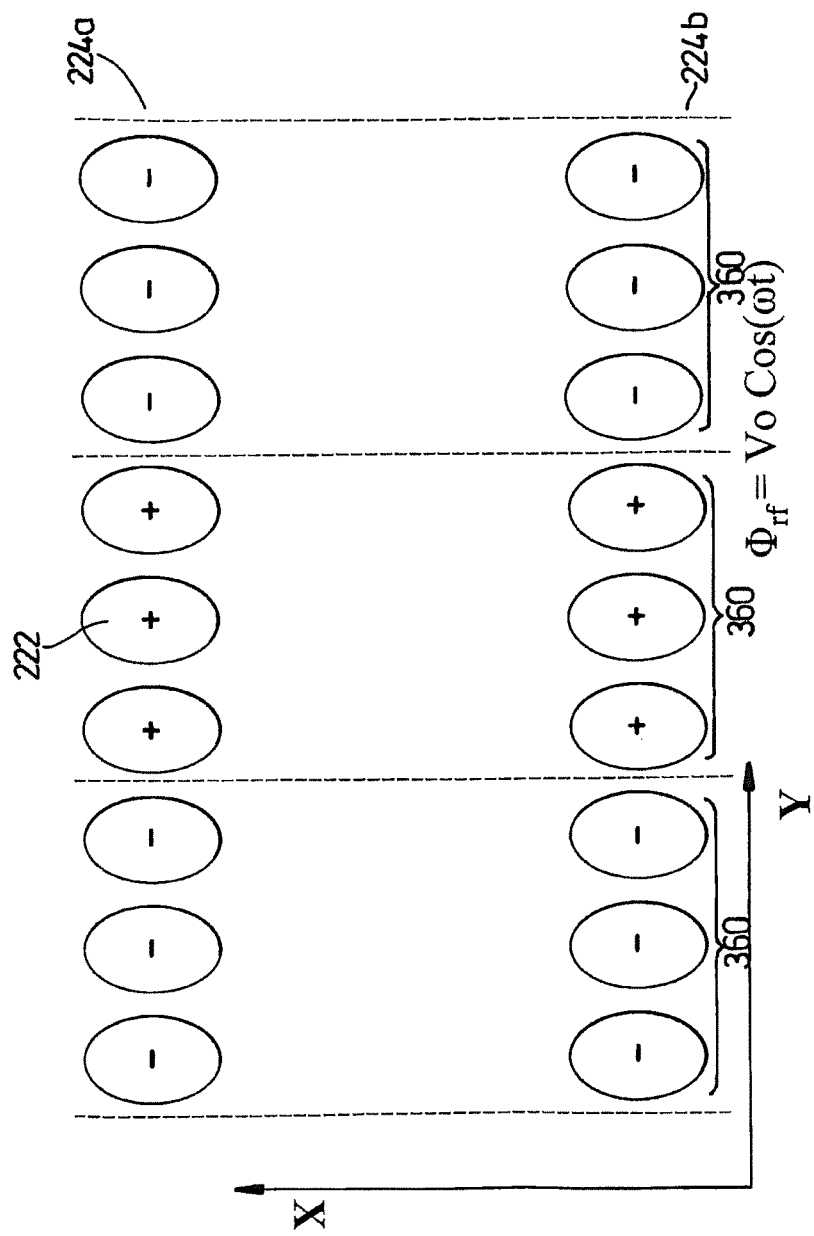
Figure 36A:
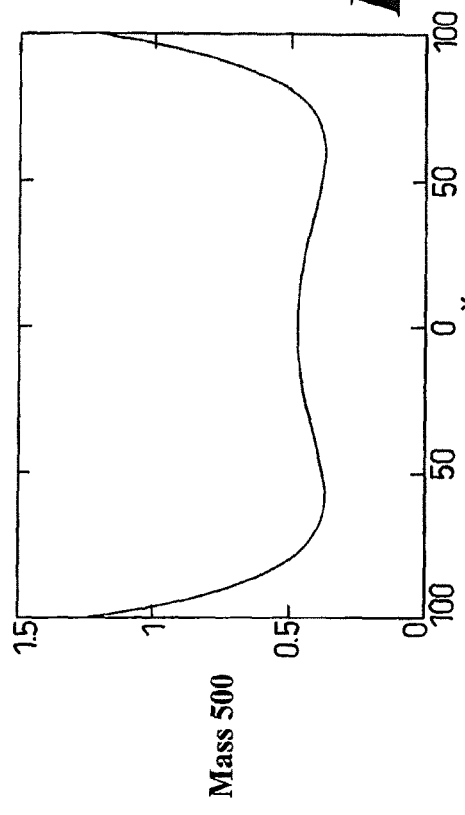
Figure 36B:
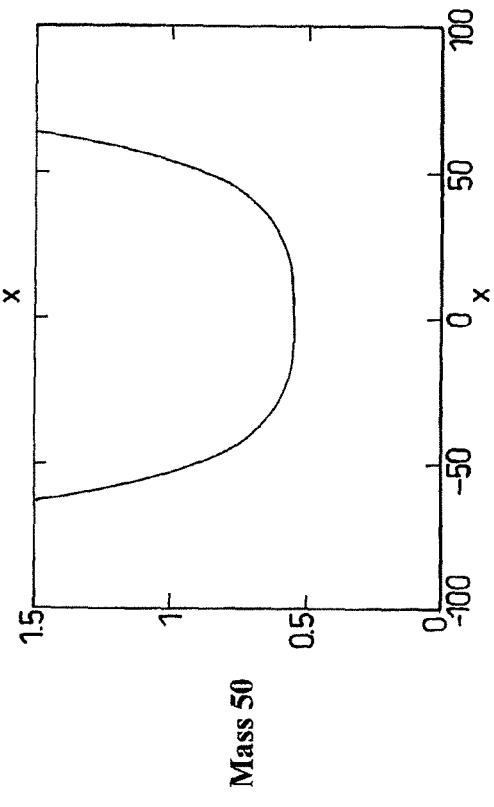
Figure 35:
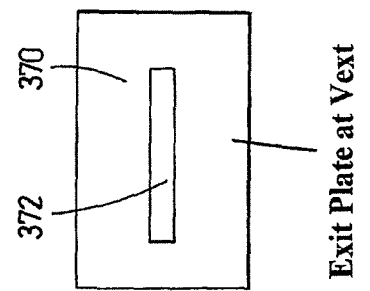
Figure 38:
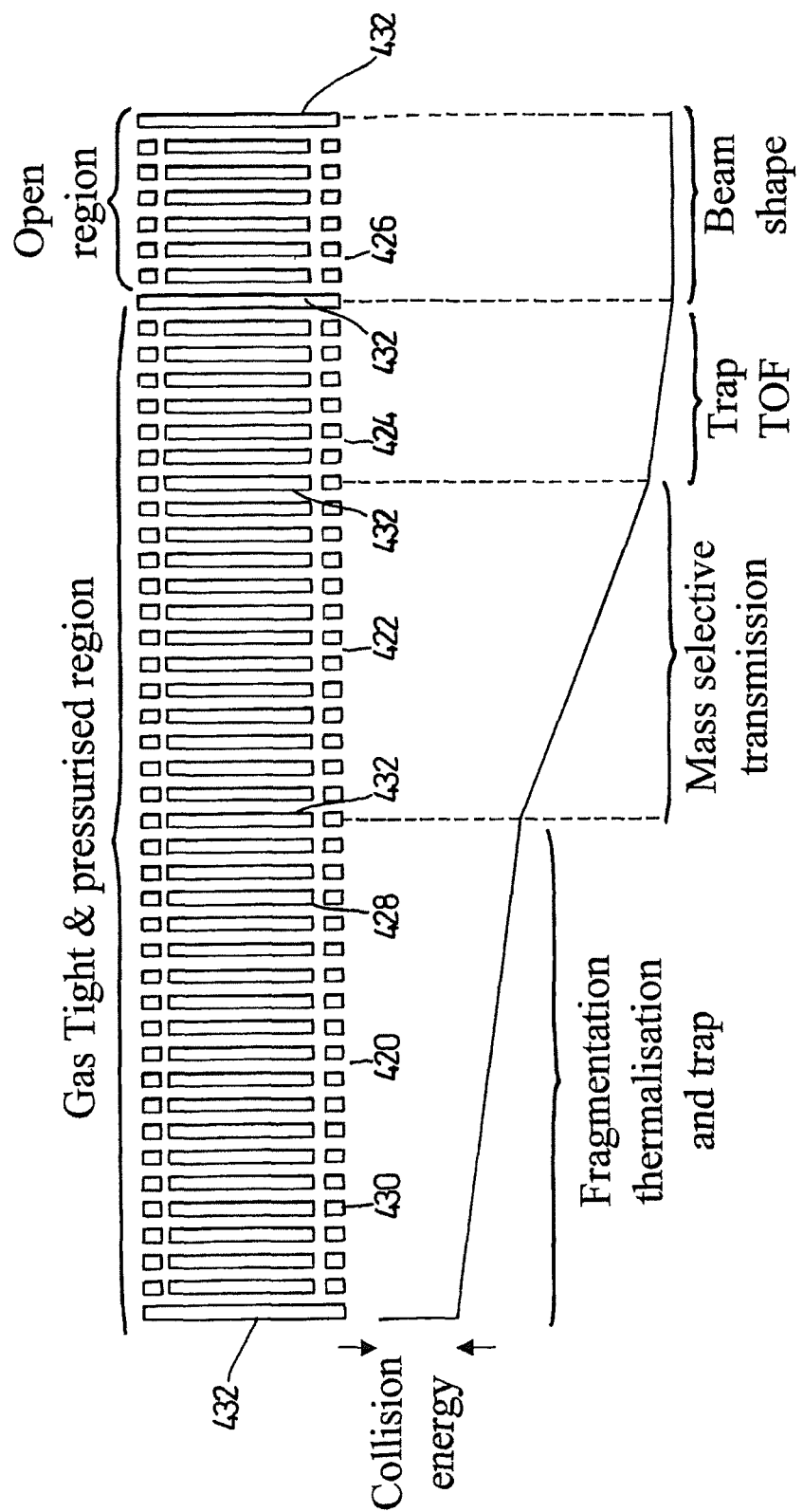
Figure 39:
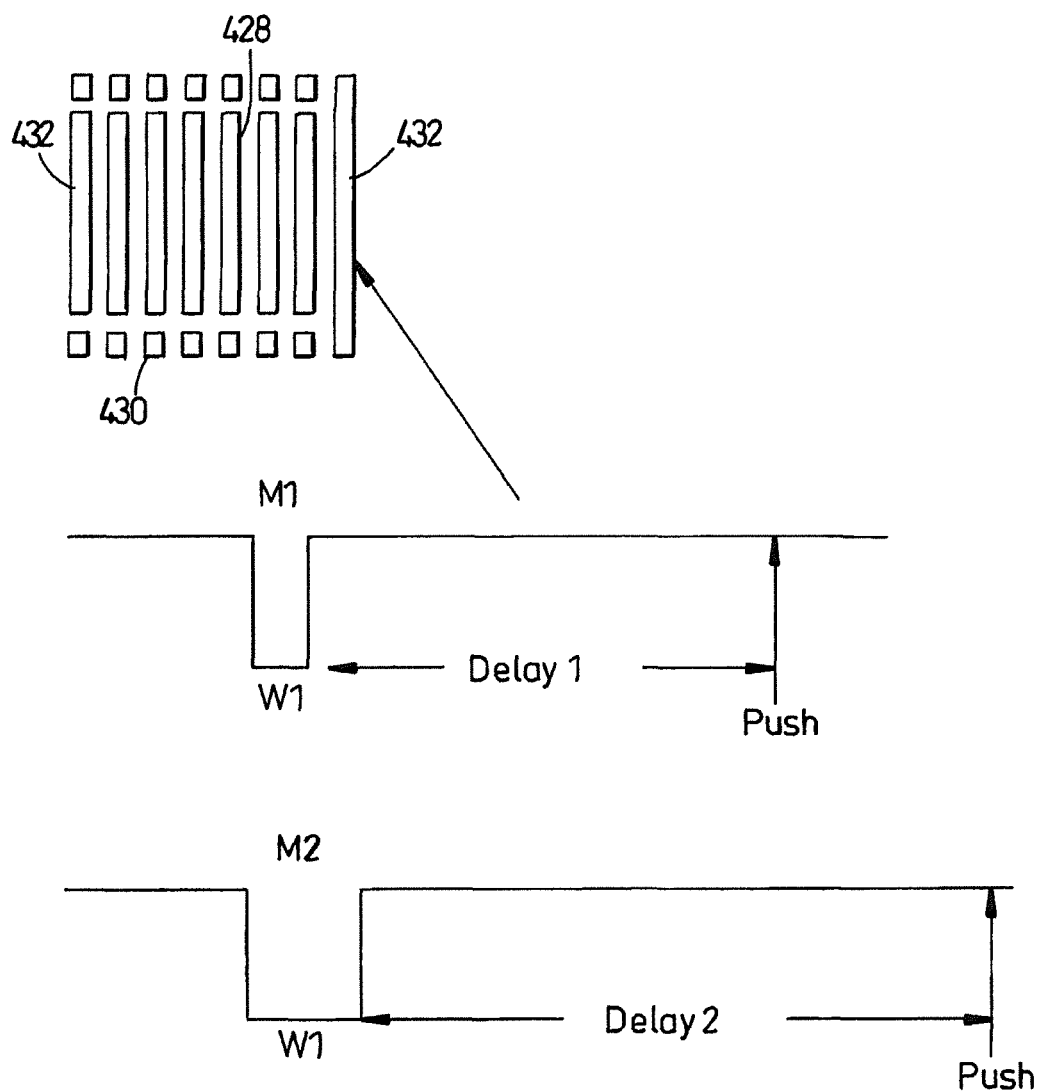
Figure 40:
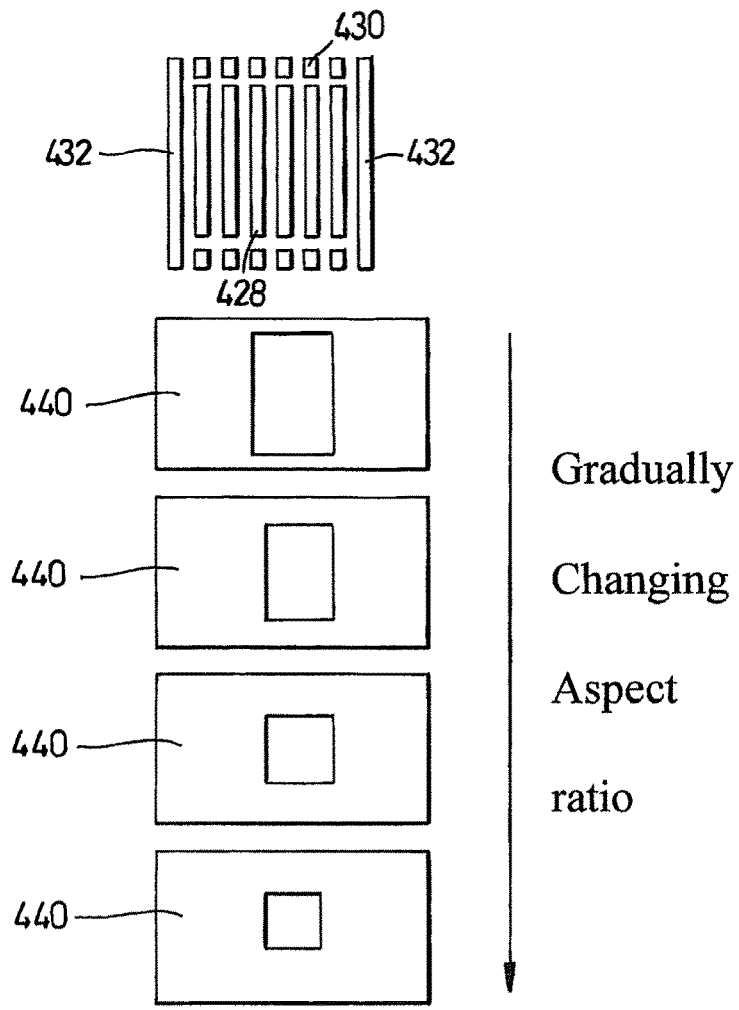
Figure 42:
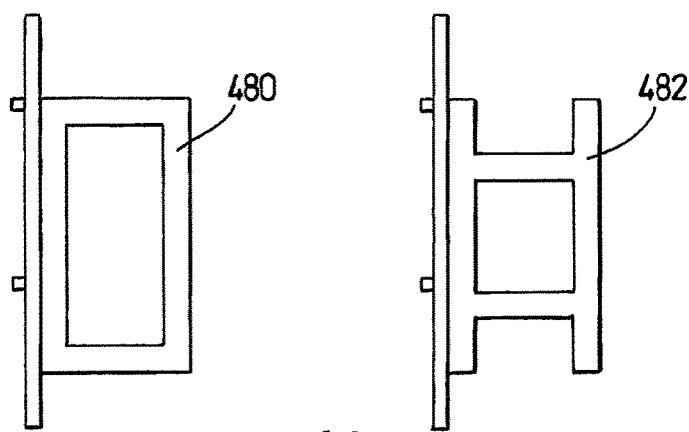
Figure 41:
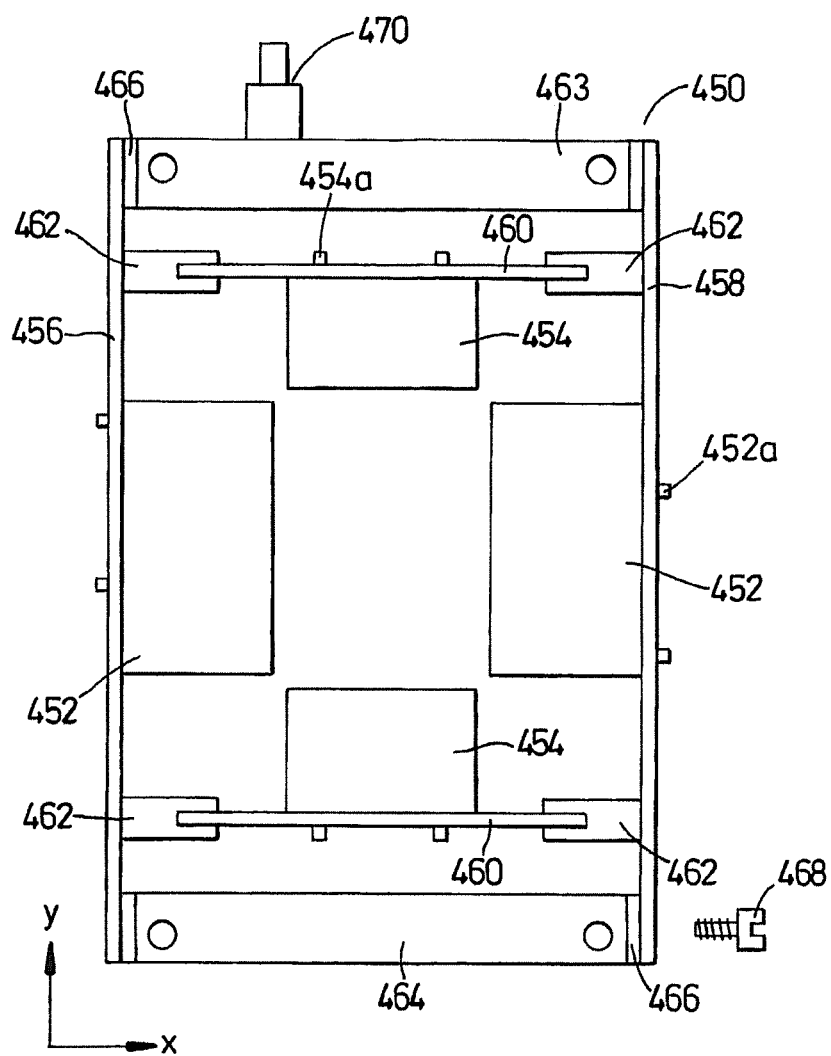
Figure 43:
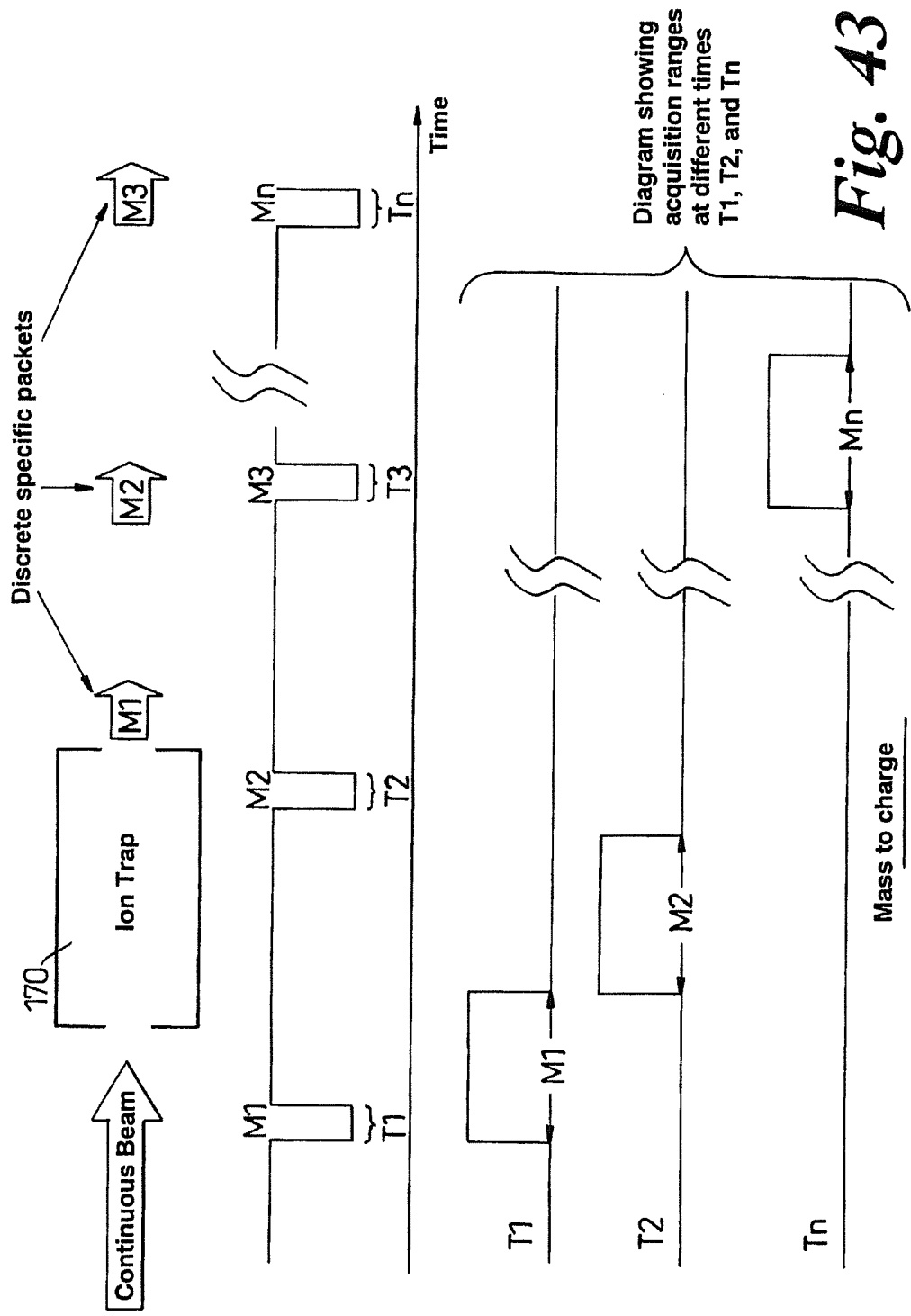
Figure 44:
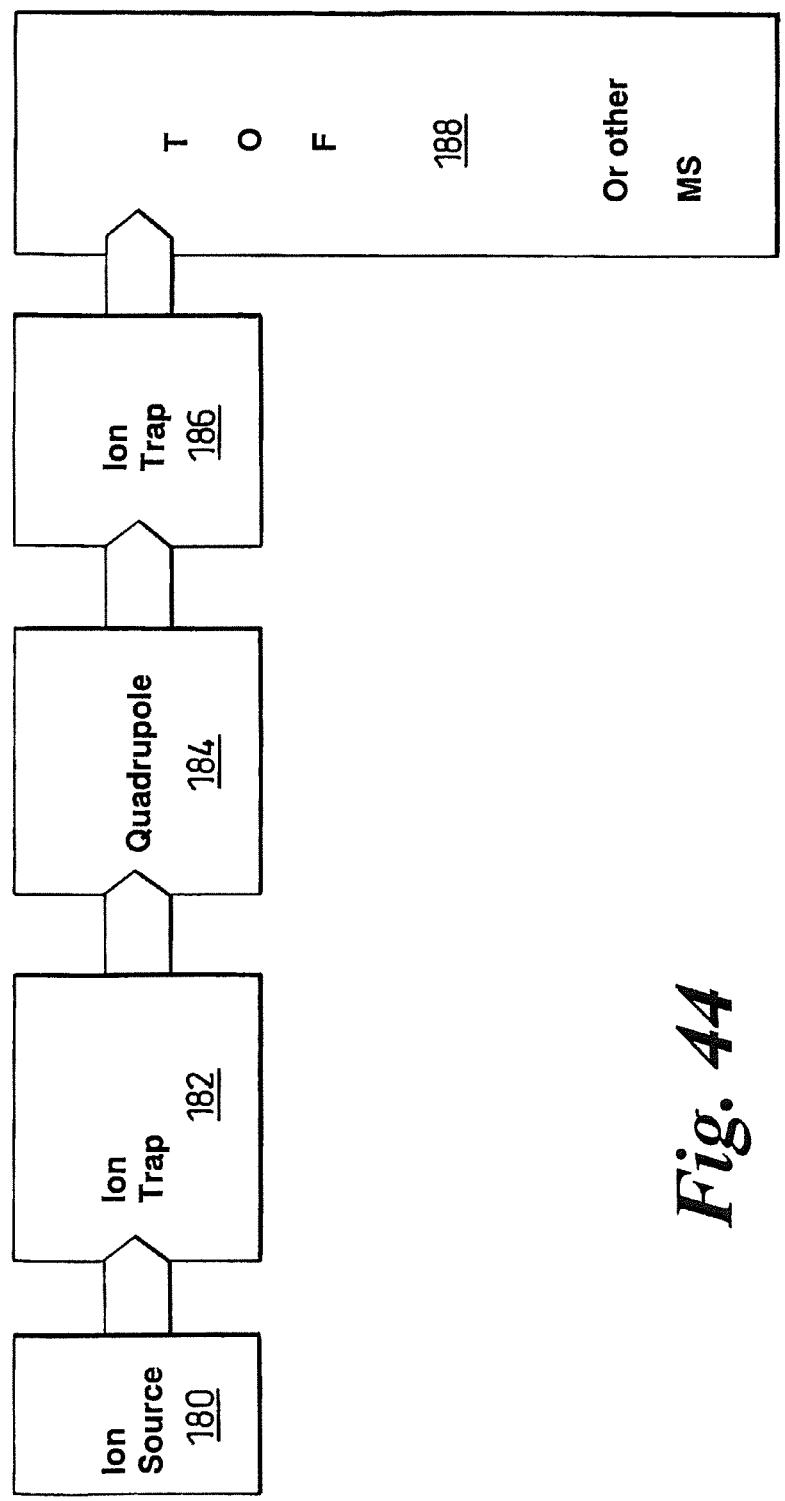
Figure 45:
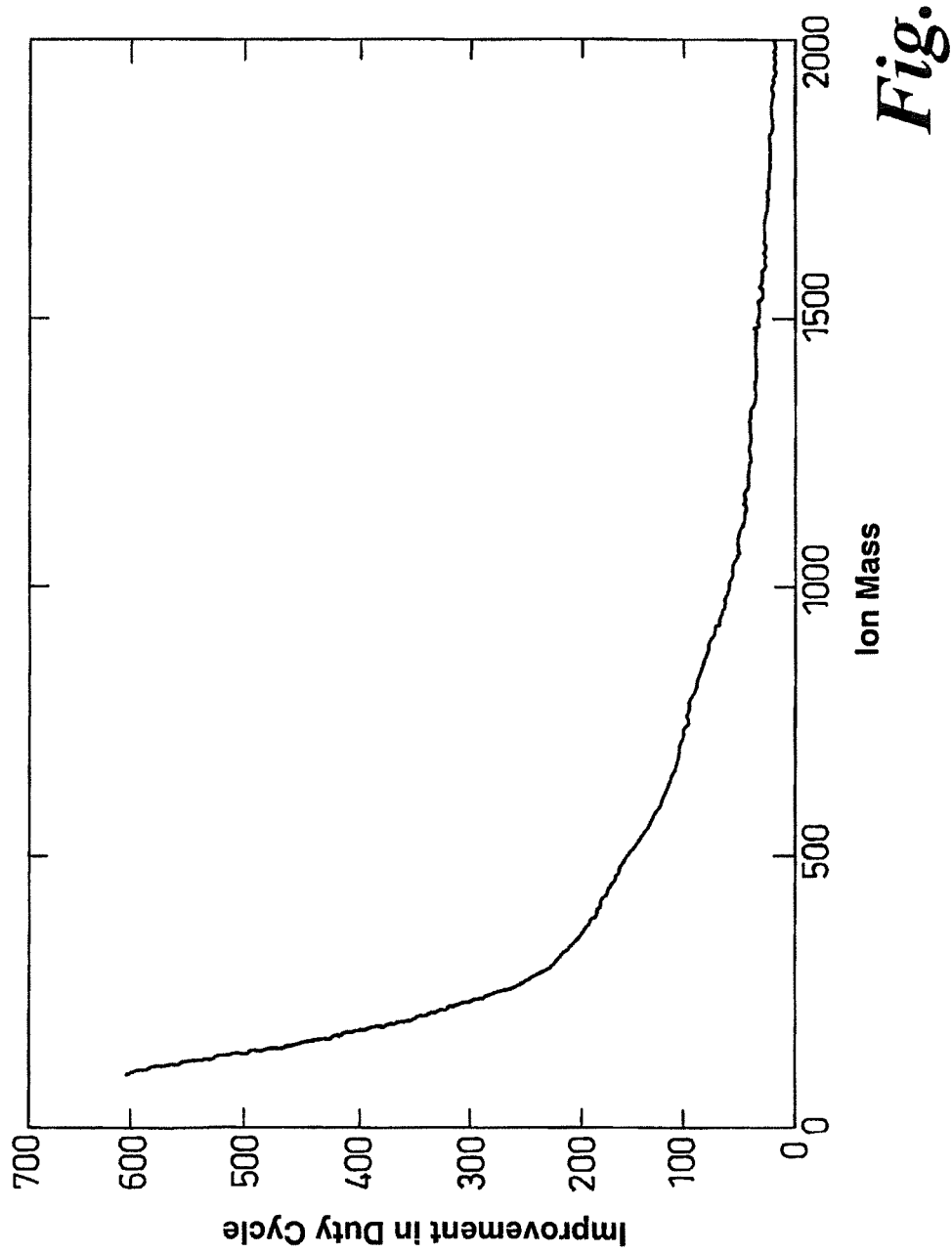

FIG. 25A shows the effective potential in a preferred ion extraction device in the y or axial direction for an ion of mass to charge ratio=2000 at the centre of the device, FIG. 25B shows the effective potential for an ion of mass to charge ratio=2000 at an RF electrode, FIG. 25C shows the effective potential for an ion of mass to charge ratio=200 at the centre of the device and FIG. 25D shows the effective potential for an ion of mass to charge ratio=200 at an RF electrode;

FIG. 26 shows potential in the xy plane (z=0) with V0=200V and mass to charge ratio=2000;

FIG. 27 shows potential in the xy plane (z=0) with V0=200V and mass to charge ratio=50;

FIG. 28 shows potential in the xy plane (z=0) with V0=50V and mass to charge ratio=50;

FIG. 29 shows potential in the xy plane (z=0) with V0=50V and mass to charge ratio=2000;

FIG. 30 shows potential in the xy plane (x=0) with V0=50V and mass to charge ratio=50;

FIG. 31 shows potential in the yz plane (x=0) with V0=50V and mass to charge ratio=50;

FIG. 32 shows potential in the yz plane (x=0) with V0=50V, mass to charge ratio=200, Vent=Vext=1V;

FIG. 33A shows the effective potential in the y direction with an applied drift field for an ion of relatively high mass to charge ratio and FIG. 33B shows the effective potential in the y-direction with an applied drift field for an ion of relatively low mass to charge ratio;

FIG. 34 shows a plan view of RF electrodes in an ion extraction device of the invention showing the connection of groups of electrodes to common phases of an RF potential;

FIG. 35 shows an exit plate;

FIG. 36A shows the effective potential in the x direction for an ion of mass to charge ratio=500 and FIG. 36B shows the effective potential in the x-direction for an ion of mass to charge ratio=50;

FIGS. 37A-E show various electrode structures suitable for use as end plates of the preferred ion trap;

FIG. 38 shows a multi-stage ion trap according to a preferred embodiment and an associated DC potential energy diagram;

FIG. 39 shows a trap-TOF stage and pulsed extraction scheme for a preferred ion trap;

FIG. 40 shows a beam shaper section of a preferred ion trap;

FIG. 41 shows an end view of a partly constructed ion trap according to a preferred embodiment;

FIG. 42 shows hollowed out RF plates according to an embodiment of the present invention;

FIG. 43 shows a preferred ion trap receiving a continuous beam of ions;

FIG. 44 shows a preferred arrangement wherein a quadrupole mass filter/analyser is provided between two preferred ion traps and a further mass analyser such as a Time of Flight mass analyser is provided; and FIG. 45 shows the improvement in duty cycle as a function of ion mass for a scanning mass filter/analyser or mass spectrometer coupled to an ion trap according to the preferred embodiment of the present invention compared to the same mass filter/analyser or mass spectrometer without an upstream ion trap.

DETAILED DISCUSSION OF THE PREFERRED EMBODIMENTS

Figure 1:
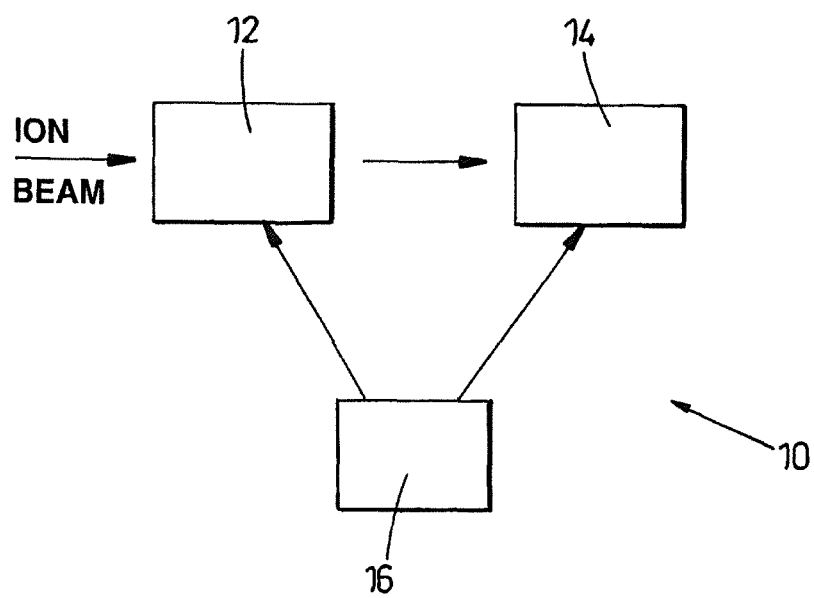
FIG. 1 shows a schematic diagram illustrating the preferred embodiment of the present invention.

A preferred embodiment of the present invention will now be described with reference to FIG. 1. According to the preferred embodiment a mass spectrometer 10 is provided comprising a mass or mass to charge ratio selective ion trap 12 interfaced to and arranged upstream of a mass or mass to charge ratio scanning mass filter/analyser or mass spectrometer 14. The mass or mass to charge ratio scanning mass filter/analyser preferably comprises a quadrupole rod set mass filter/analyser or mass spectrometer although less preferably the mass or mass to charge ratio scanning mass filter/analyser or mass spectrometer may comprise a magnetic sector mass filter/mass analyser or mass spectrometer.

The mass or mass to charge ratio selective ion trap 12 and the mass or mass to charge ratio scanning mass spectrometer 14 are preferably controlled by a control means 16. The control means 16 preferably controls the ejection of the ions from the mass or mass to charge ratio selective ion trap 12 and also preferably controls the scanning of the mass or mass to charge ratio scanning mass filter/analyser or mass spectrometer 14.

According to the preferred embodiment the control means 16 preferably synchronises the ejection or release of ions from the mass or mass to charge ratio selective ion trap 12 so that only ions having a specific or desired mass or mass to charge ratio are passed to the mass scanning mass filter/analyser or mass spectrometer 14 when the mass scanning mass filter/analyser or mass spectrometer 14 is at a point in its scan wherein the mass or mass to charge ratio transmission window of the mass filter/analyser of mass spectrometer 14 substantially corresponds with the mass or mass to charge ratio of ions being released or ejected from the ion trap at that particular instance.

The preferred ion trap 12 may have a relatively limited or low mass or mass to charge ratio resolution. Accordingly, some ions having the specific mass or mass to charge ratio may be ejected from the ion trap 12 a period of time before and/or after ions of the given mass or mass to charge ratio are transmitted by the mass filter/analyser or mass spectrometer 14. However, for significant periods of the scan cycle of the mass filter/analyser or mass spectrometer 14 ions which would not be onwardly transmitted by the mass scanning mass filter/analyser or mass spectrometer 14 are preferably held or otherwise retained within the upstream mass selective ion trap 12.

The control means 16 preferably comprises one or more computers and associated electronics. The control means 16 may comprise a custom built circuit to perform its functions. Alternatively, the mass spectrometer 10 may utilise a commercially available mass scanning mass filter/analyser or mass spectrometer 14 in which instance the control means 16 may comprise a commercially available control system for controlling the scanning of the mass scanning mass filter/analyser or mass spectrometer 14 together with a suitable interface for controlling the ejection of ions from the mass or mass to charge ratio selective ion trap 12 and synchronising this with the scanning of the mass scanning mass filter/analyser or mass spectrometer 14.

For purposes of illustration, a quadrupole mass filter/analyser or mass spectrometer 14 scanning over 1000 Da once every second and starting the scan from mass 0 and scanning up to mass 1000 may be considered. An accumulating ion trap 12 can be considered arranged upstream of the quadrupole mass filter/analyser or mass spectrometer 12. The ion trap 12 can be considered to be arranged to accumulate ions over the first 0.9 s period of the quadrupole scan. The ion trap 12 is then arranged to release the ions during the remaining 0.1 s period.

A mass spectrum over the 1 s scan period will be zero except for the last 10% (900-1000 Da) of the mass scale. The last 10% will, however, have ions that are approximately 10 times more intense than if the mass selective ion trap 12 were not provided. This is because the ion trap 12 stores all the ions and then releases them in an intense burst. The ion current of all species of ions will be ten times more intense during the release period than in a continuous case (as no ions are lost in the ion trap).

If, in accordance with the preferred embodiment, the ion trap 12 is arranged so as to release ions from the ion trap 12 in a mass or mass to charge ratio dependent or selective manner during the course of the 1 s scan with a mass resolution of ten, then synchronising the output of the ion trap 12 with the scanning of the quadrupole mass filter/analyser or mass spectrometer 14 in a linked scan will result in an increase in the sensitivity of the quadrupole mass filter/analyser or mass spectrometer 14 by the same factor. The higher the resolution of the mass or mass to charge ratio dependent or selective ion trap 12 then the greater the enhancement over the continuous (no trap) case.

In the limit of the ion trap 12 being capable of emitting, ejecting or releasing ions with masses with a constant width of 1 Da then the quadrupole will then be 1000 times more sensitive. However, also in the limit the quadrupole mass filter/analyser or mass spectrometer 14 would then be substantially superfluous since the ion trap 12 would then be providing the required resolution and sensitivity.

An advantageous feature of the preferred embodiment is that a relatively low resolution mass or mass to charge ratio selective ion trap 12 can be used to enhance significantly the sensitivity of a relatively high resolution scanning quadrupole mass filter/analyser arranged downstream of the ion trap 12.

Figure 2:
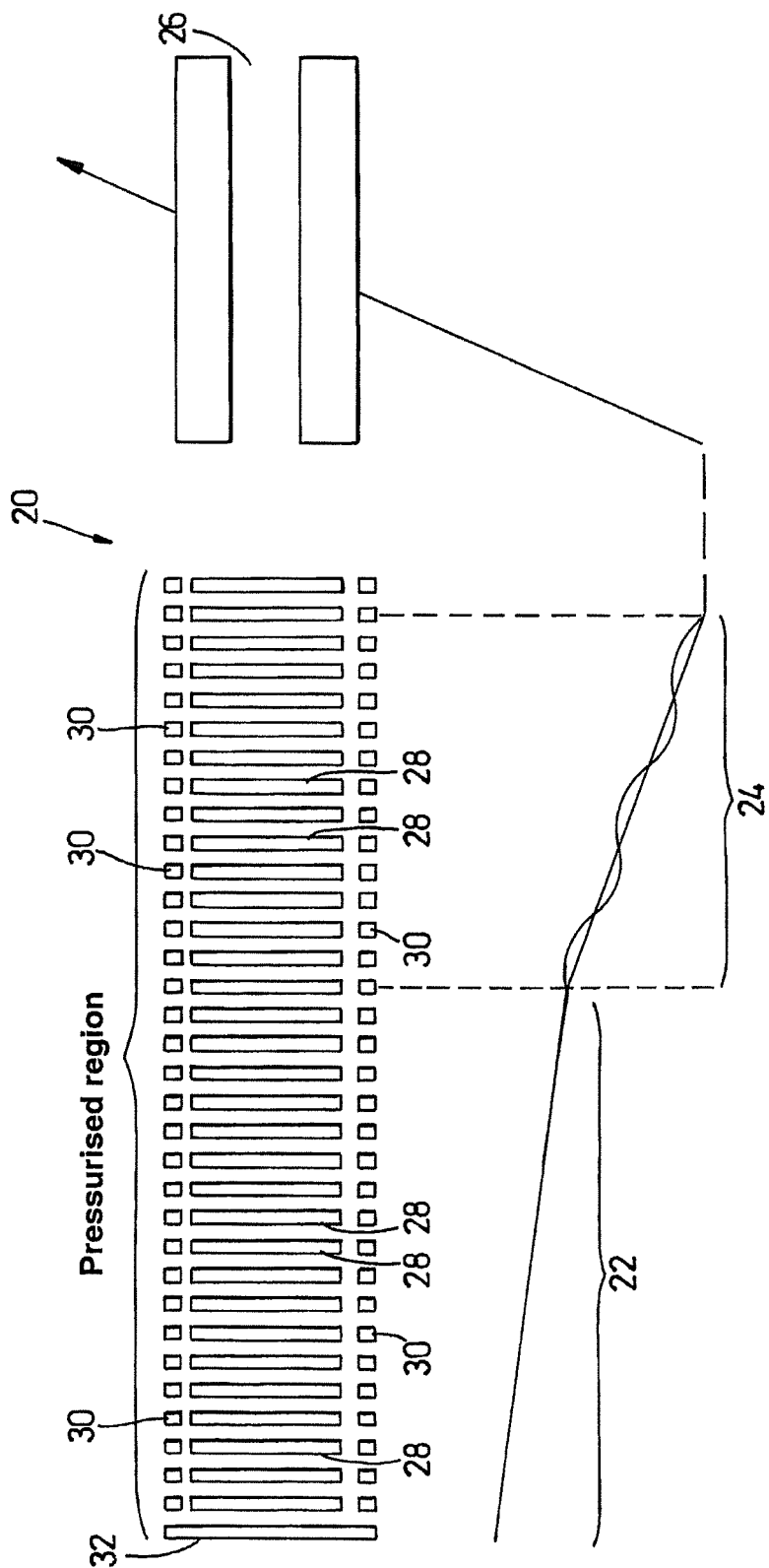
FIG. 2 shows an embodiment of the present invention.

FIG. 2 depicts a multi-stage ion guide or ion trap 20 according to an embodiment of the present invention wherein the ion guide or ion trap 20 comprises a first upstream fragmentation, thermalisation and trapping stage 22 followed by a second downstream mass or mass to charge ratio selective ion transmission stage 24. A quadrupole mass filter/analyser or mass spectrometer 26 is preferably provided or arranged downstream of the multi-stage ion guide or ion trap 20.

The upstream first fragmentation, thermalisation and trapping stage 22 and the downstream second mass selective ion transmission stage 24 of the preferred ion guide or ion trap 20 will be discussed in more detail below. The first fragmentation thermalisation and trapping stage 22 preferably comprises spaced apart stacks of RF electrodes 28 arranged within spaced apart stacks of DC electrodes 30. The first fragmentation, thermalisation and ion trapping stage 22 and the second mass selective ion transmission stage 24 preferably comprise a plurality of segmented RF/DC electrode units. Each RF/DC electrode unit preferably comprises a co-planar arrangement of two opposed RF electrodes 28 and two opposed DC electrodes 30. The ion guide preferably comprises an end plate 32 upstream of the first fragmentation, thermalisation and trapping stage 22.

The first fragmentation, thermalisation and trapping stage 22 is preferably arranged to accumulate ions received from a suitable ion supply stage (not shown) whilst the mass selective ejection preferably occurs in the second mass selective ion transmission stage 24. The operation of the mass selective transmission stage 24 is described in more detail below.

FIG. 2 also shows a DC potential energy profile along the length of the ion guide or ion trap 20 according to a preferred embodiment of the present invention. FIG. 2 shows that a relatively large mass to charge ratio dependent ripple in the effective axial potential or a plurality of periodic pseudo-potential wells are preferably provided or created along the axial length of the mass selective stage 24.

The mass or mass to charge ratio selective release of ions from the mass selective transmission stage 24 of the ion trap is preferably synchronised with the scanning of the quadrupole mass filter/analyser or mass spectrometer 26 which is preferably arranged downstream. This process will be described in more detail with reference to FIG. 3.

Figure 3:
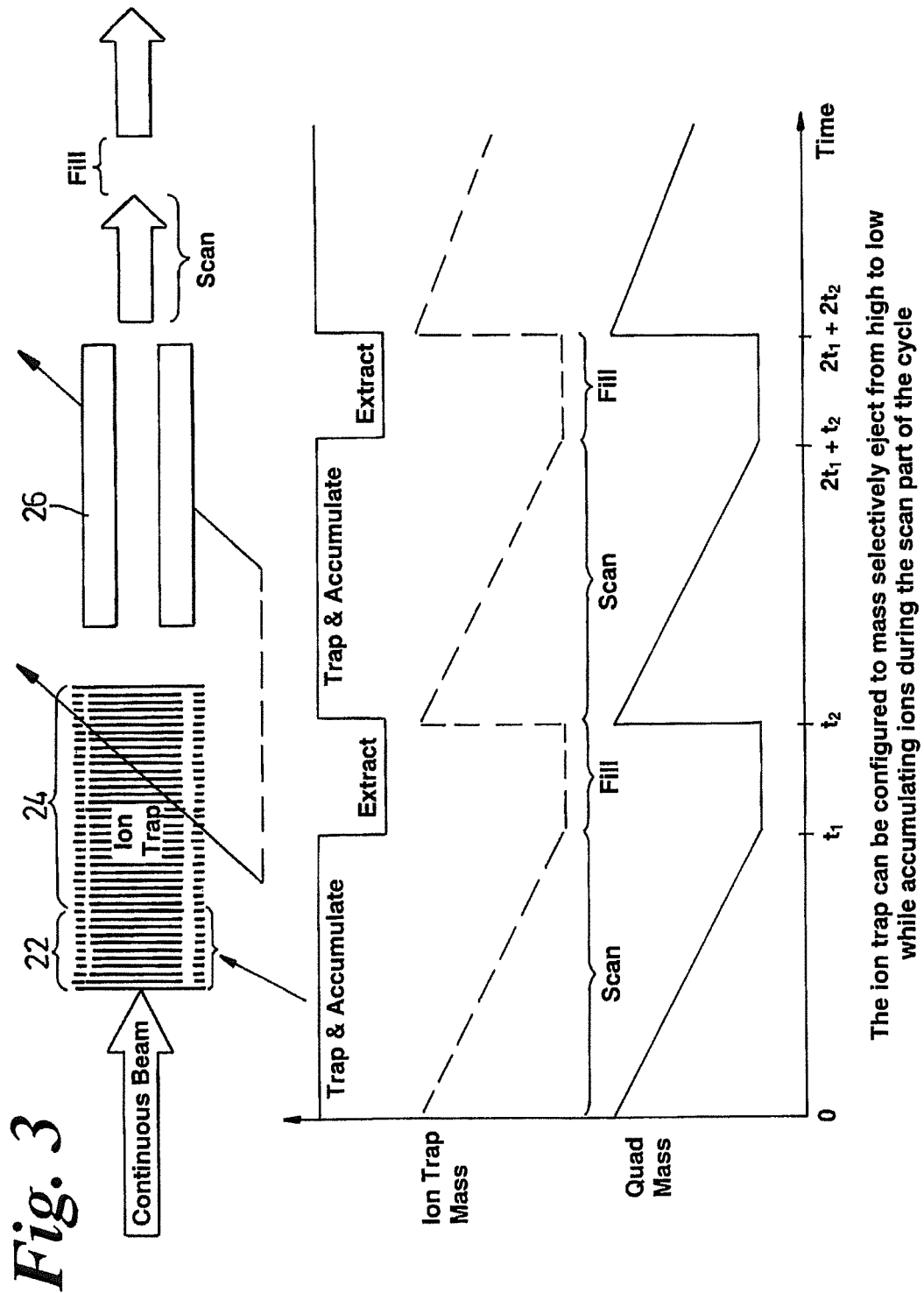
FIG. 3 illustrates the operation of the embodiment shown in FIG. 2.

FIG. 3 shows the ion trapping stage 22 of the ion trap preferably trapping and accumulating ions received from a continuous ion beam source. The ion trapping stage preferably traps and accumulates ions for a period of time from time 0 to time $t_1$. This time period preferably also corresponds to the scan time of the downstream quadrupole mass filter/analyser or mass spectrometer 26.

During the time from time 0 to time $t_1$ the mass or mass to charge ratio of the ions which are mass selectively ejected from the mass selective stage 24 of the ion trap is preferably varied so that the mass or mass to charge ratio of the ions ejected preferably substantially corresponds to the mass or mass to charge ratio transmission window of the quadrupole mass filter/analyser 26 at that particular instance in time.

After a scan cycle of the quadrupole mass filter/analyser or mass spectrometer 26 has been completed, an extraction/fill phase from time $t_1$ to time $t_2$ then preferably occurs. During the time period from time $t_1$ to time $t_2$ time ions are preferably arranged to be ejected from the upstream trapping stage 22 in order to fill the mass selective transmission stage 24 which is preferably arranged downstream of the trapping stage 22.

After the process is complete, another scan cycle of the quadrupole mass filter/analyser or mass spectrometer 26 is preferably performed in synchrony with the mass or mass to charge ratio selective extraction of ions from the mass selective ion transmission stage 24.

The mass selective ion transmission stage 24 is preferably arranged so as to mass selectively eject ions preferably starting with ions having a relatively high mass to charge ratio and to scan down in terms of mass to charge ratio to ions having relatively low mass to charge ratios. According, in any cycle ions having relatively high mass to charge ratios are transmitted prior to ions having relatively low mass to charge ratios.

According to other less preferred embodiments, however, the mass or mass to charge ratio selective ion trap may initially eject ions having relatively low mass or mass to charge ratios and then sweep or scan upwards in mass or mass to charge ratio so as to then eject ions having relatively high mass or mass to charge ratios.

The mass selective ion trap which is preferably provided upstream of the mass or mass to charge ratio scanning mass filter/analyser or mass spectrometer (e.g. quadrupole rod set mass filter/analyser or mass spectrometer or magnetic sector mass filter/analyser or mass spectrometer) can take a number of different forms. An ion trap which is particularly preferred will now be described in more detail with reference to the accompanying figures. The preferred ion trap comprises pairs of plate electrodes with an ion guiding region therebetween. Both plate electrodes are preferably connected to the same phase of an AC or RF voltage supply. A plurality of pairs of plate electrodes are preferably arranged along the length of the preferred ion trap. Preferably, axial adjacent plate electrodes are connected to opposite phases of the AC or RF voltage supply.

The AC or RF voltage applied to the plurality of plate electrodes creating a radial pseudo-potential well which acts to confine ions in one radial direction within the ion trap.

Ions are preferably confined in a second radial direction which is preferably orthogonal to the first radial direction by a DC or electrostatic potential well.

The DC or electrostatic potential well is preferably created by applying DC voltages to a plurality of DC electrodes which run top and bottom along the axial length of the preferred ion trap.

Due to the fact that the ion trap is axially segmented and opposite phase AC or RF voltages are applied to electrodes along the axial length of the ion trap, a plurality of further pseudo-potential wells are preferably created along the axis of the ion trap. The further axial pseudo-potential wells have a periodicity which preferably corresponds with the periodicity of the RF electrodes arranged along the length of the preferred ion trap.

The effective height or depth of the axial pseudo-potential wells is dependent upon the mass to charge ratio of ions passing along the length of the ion trap. By varying the amplitude of the applied AC or RF voltage then the effective amplitude of the axial pseudo-potential wells can also be varied.

According to a preferred embodiments ions may be driven or urged along the axial length of the ion trap by a number of means. Ions may be urged along the length of the ion trap by maintaining a constant DC voltage gradient along the length of the preferred ion trap. Alternatively, one or more transient DC voltages may be applied to the electrodes of the ion trap and the application of the transient DC voltages may be used to urge ions along the length of the preferred ion trap. According to another embodiment ions may be urged along the length of the ion trap by gas flow effects.

The general farm of the effective potential (both from RF and electrostatic sources) in an ion trap can be derived using the adiabatic approximation and is given by:

$$Veff(R_o) = \frac{q^2 E_0^2}{4M\Omega^2} + q\Phi \quad (1)$$

wherein $R_0$ is the slowly varying position of an ion, q is the charge of the ion, $E_0$ is the magnitude of the oscillatory electric field of angular frequency $\Omega$ at position $R_0$ and M is the mass of the ion.

The equation includes the classical electrostatic potential $q\Phi_s$ wherein $\Phi_s$ is a voltage created by DC potentials applied to electrodes in any general system.

It can be seen that the potential due to the oscillatory field is proportional to charge squared whilst the electrostatic potential is proportional to charge. A mass selective ion trap according to the preferred embodiment exploits this relationship in order to separate ions of similar mass but differing charge.

The form of the effective potential from an oscillatory field in a quadrupole, hexapole, or octopole is of the form:

$$V(r) = \frac{n^2 q^2 V_0^2}{4M(R_0\Omega)^2} \cdot r^{(2n-2)} \quad (2)$$

For a ring set we have:

$$V(r, z) = \frac{q^2 V_0^2}{4M(Z_0 \cdot \Omega)^2} \cdot \left[ \frac{I1^2 \cdot (r) \cdot \cos^2 \cdot (z) + I0^2(r) \cdot \sin^2(z)}{I0^2(R_0)} \right] \quad (3)$$

The ion guides above exhibit some degree of cylindrical symmetry and the ion guides exhibit a radial dependence on effective potential with steeper sided potential wells for higher order multipoles and ring sets.

According to the preferred embodiment a linear stacked RF plate ion trap is preferably provided and this enables ions having desired mass or mass to charge ratios and/or ion mobility and/or charge state to be selectively ejected or released.

The ion trap may preferably have a long linear geometry which may preferably allow for operation of the ion trap not to be compromised (or affected) by space charge effects due to its large charge capacity.

An analytical solution to the form of the effective potential at any point in the ion guide or ion trap i.e. a solution to Eqn. 1 for the general geometry chosen is desired. Such a solution can be obtained by solving for the RF and electrostatic elements separately and then adding the two solutions by superposition.

Figure 4:
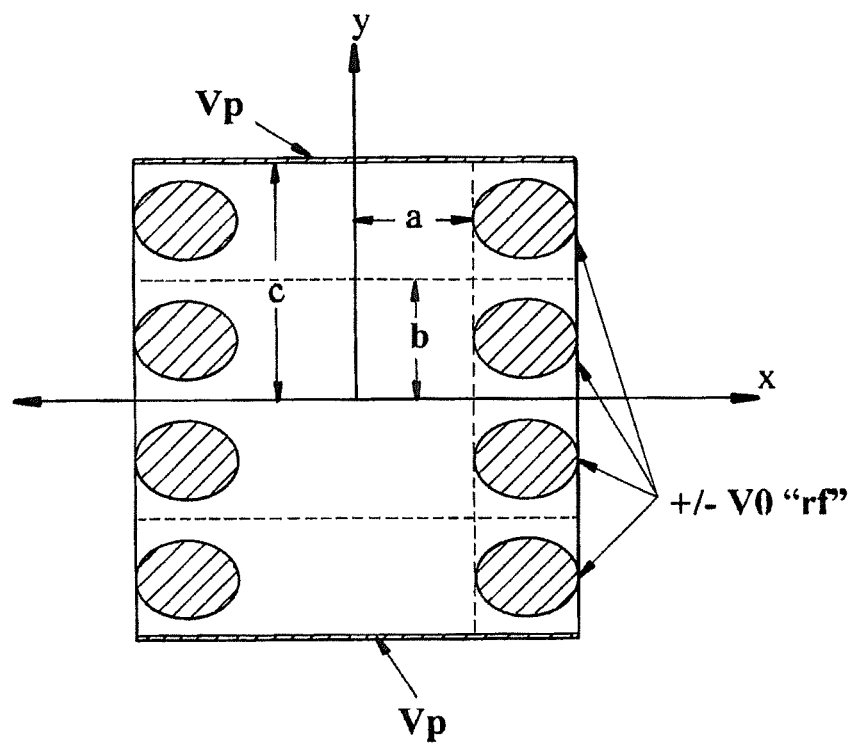
FIG. 4 shows a cross-sectional view of a DC electrode and RF parallel rod set ion trap according to an embodiment.

A general two dimensional solution has been found for an ion guide or ion trap whose form and notation is set out in FIG. 4. The ion guide or ion trap shown in FIG. 4 comprises an RF parallel rod set which comprises of a plurality of RF rods together with a pair of upper and lower DC electrodes. The solution is given by:

$$V_{\text{eff}}(x, y) = \frac{z^2 e \pi^2 V_0^2 \left[ \left( \sinh\left(\pi \frac{x}{b}\right) \sin\left(\pi \frac{y}{b}\right) \right)^2 + \left( \cosh\left(\pi \frac{x}{b}\right) \cos\left(\pi \frac{y}{b}\right) \right)^2 \right]}{\left( \cosh\left(\pi \frac{a}{b}\right) \right)^2 \cdot (4MKm\omega^2 b^2)} + \left( \sum_N \frac{4zV_p \cosh\left(N\pi \frac{y}{2a}\right) \cdot \cos\left(N\pi \frac{x}{2a}\right)}{N\pi \cosh\left(N\pi \frac{c}{2a}\right)} \right)$$

(4)

The ion guide or ion trap involves electrostatic or DC trapping in the y (or vertical) direction and ponderomotive or RF effective potential or pseudo-potential trapping in the x direction.

Due to the nature of Laplace's equation the electrostatic potential well which traps ions in the y-direction is a saddle point which causes ions to move away from the centre of the device in the x-direction. The ponderomotive effective potential well or pseudo-potential well is preferably arranged to be sufficient to overcome this negative dispersion if complete x-y trapping is to be achieved.

FIGS. 5-11 illustrate ion traps according to various slightly different embodiments of the present invention. In addition to trapping ions in the x-y dimension different means may be employed to generate an axial field which may be of varying complexity. The axial field may comprise a linear axial driving field or a more complex polynomial field. The axial field is preferably used to urge ions along the axial length of the preferred ion guide or ion trap.

Various features are shared between the embodiments depicted in FIGS. 5-11 and like numerals are used to depict such common features.

Figure 5A:
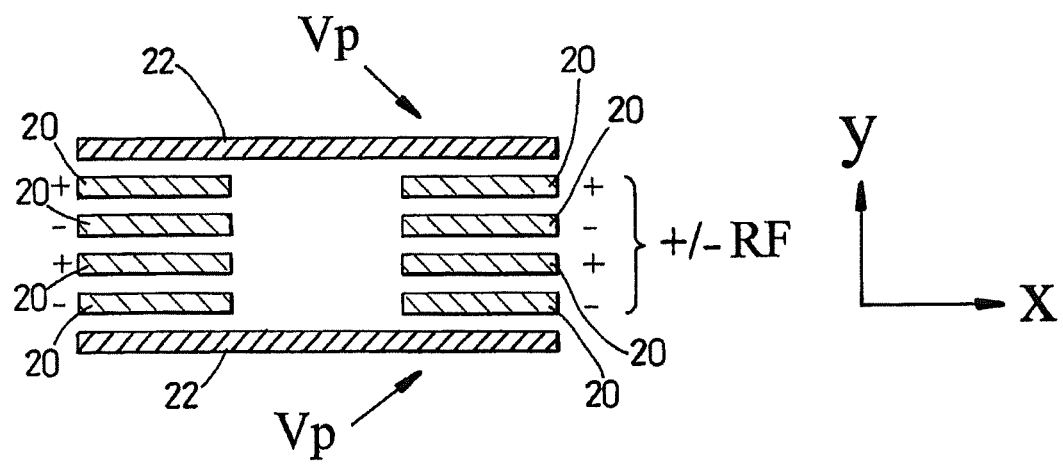
FIG. 5A shows a cross-sectional view in the xy plane of an ion extraction device according to an embodiment of the present invention and FIG. 5B shows an end view of an end plate.

FIG. 5A shows an x-y slice through the centre of an ion trap according to a preferred embodiment of the present invention. The ion trap preferably comprises upper and lower DC only trapping electrodes 22 which are preferably maintained at a DC voltage Vp. The ion trap preferably also comprises RF electrodes 20 which are sandwiched between the upper and lower DC only electrodes 22.

The RF electrodes 20 are preferably arranged in pairs. The two RF electrodes in a pair are preferably separated by an ion guiding or ion trapping region. Opposite plate pairs of the RF electrodes 20 are preferably connected to the same phase of the RF. Vertically adjacent plate pairs are preferably connected to opposite phases of the RF voltage. This is true for all embodiments shown but for purposes of simplification is omitted on subsequent diagrams.

Figure 5B:
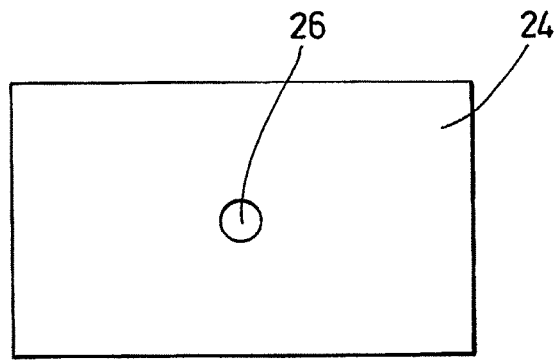

FIG. 5B shows an end plate 24 which is preferably provided an axial end of the preferred ion trap. The end plate 24 preferably has a hole 26 in the centre through which ions are preferably mass or mass to charge ratio selectively ejected. The ions may, less preferably, be ejected through the hole 26 on the basis of their ion mobility rather than mass to charge ratio.

An entrance plate similar to the end plate 24 may also be provided at the entrance region of the ion extraction device or preferred ion trap.

Figure 6:
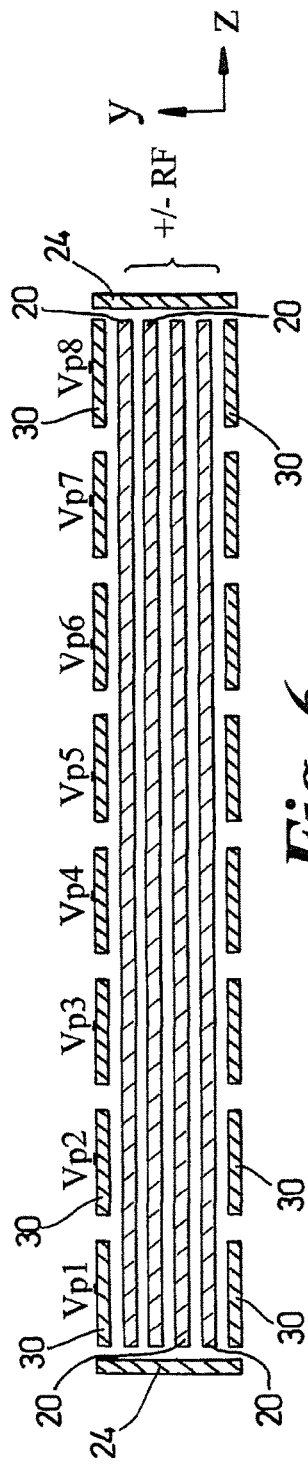
FIG. 6 shows a side view of a preferred ion trap.

FIG. 6 shows an embodiment wherein the ion trap comprises a plurality of segmented upper and lower DC electrodes 30. According to this embodiment an axial DC electric field or voltage gradient of desired form may be maintained along the length of the preferred ion trap. The axial DC or electrostatic electric field may be provided by applying different voltages Vp1-Vp8 to each of the upper and lower DC electrodes 30. The same DC voltage is preferably applied to the upper and lower electrodes which comprise an axial segment.

Figure 7:
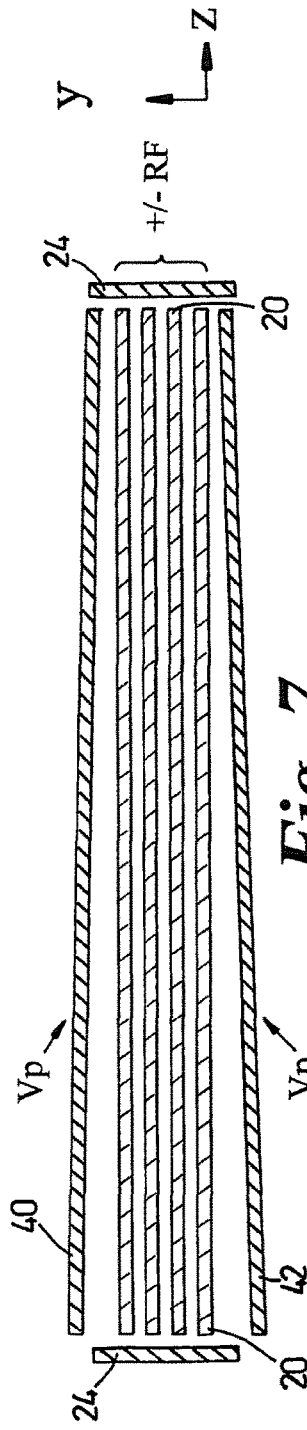
FIG. 7 shows a side view of another preferred ion extraction device.

FIG. 7 shows another embodiment wherein an axial electric field is created or providing by providing inclined top 40 and bottom 42 DC electrodes.

Figure 8:
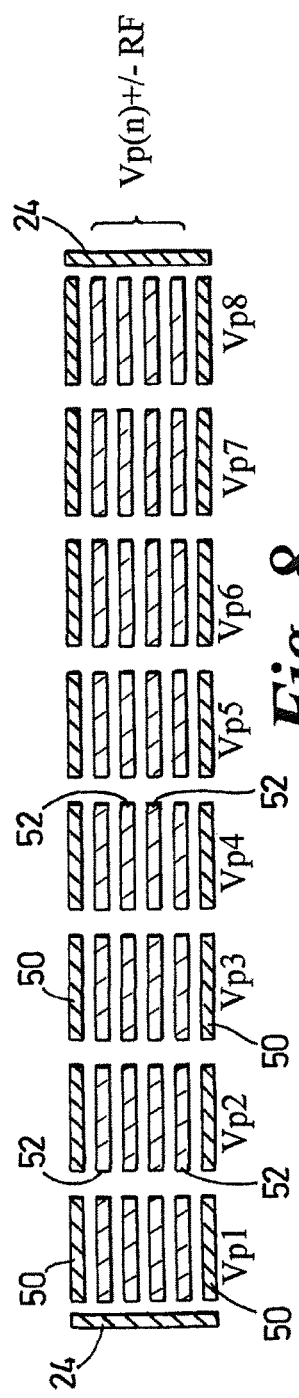
FIG. 8 shows a side view of a further preferred ion extraction device.

FIG. 8 shows a further embodiment wherein in addition to providing axially segmented DC electrodes a plurality of axially segmented RF plates or electrodes 50 are also provided. This embodiment permits greater flexibility in terms of creating trapping wells for purposes of upstream storage as will be explained further below.

Figure 9:
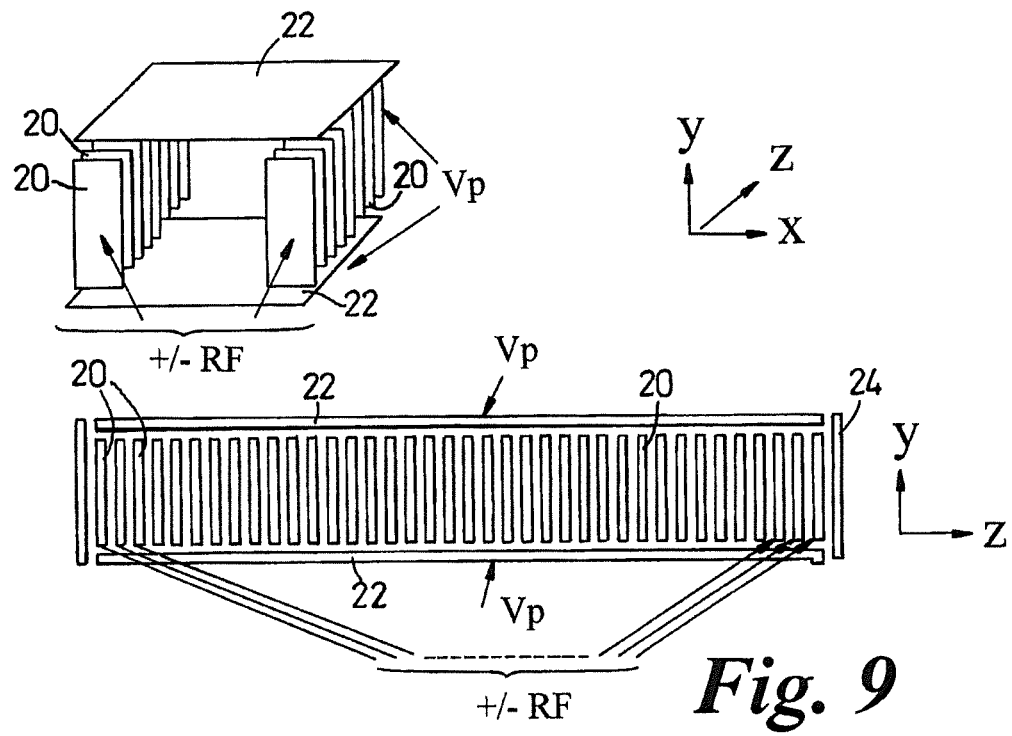
FIG. 9 shows a perspective and side view of an embodiment of an ion extraction device.

FIG. 9 show an alternative ion trap which is analogous to the embodiment shown in FIG. 5A except that the RF plates or electrodes 22 are stacked in the z-direction or axial direction rather than in the y-direction. Accordingly, the RF electrodes are provided in a plane which is orthogonal to the direction of ion movement. This is in contrast to the embodiment shown and described with reference to FIG. 5A wherein the RF electrodes are arranged generally in a plane parallel to the direction in which ions are transmitted along the ion trap.

Figure 10:
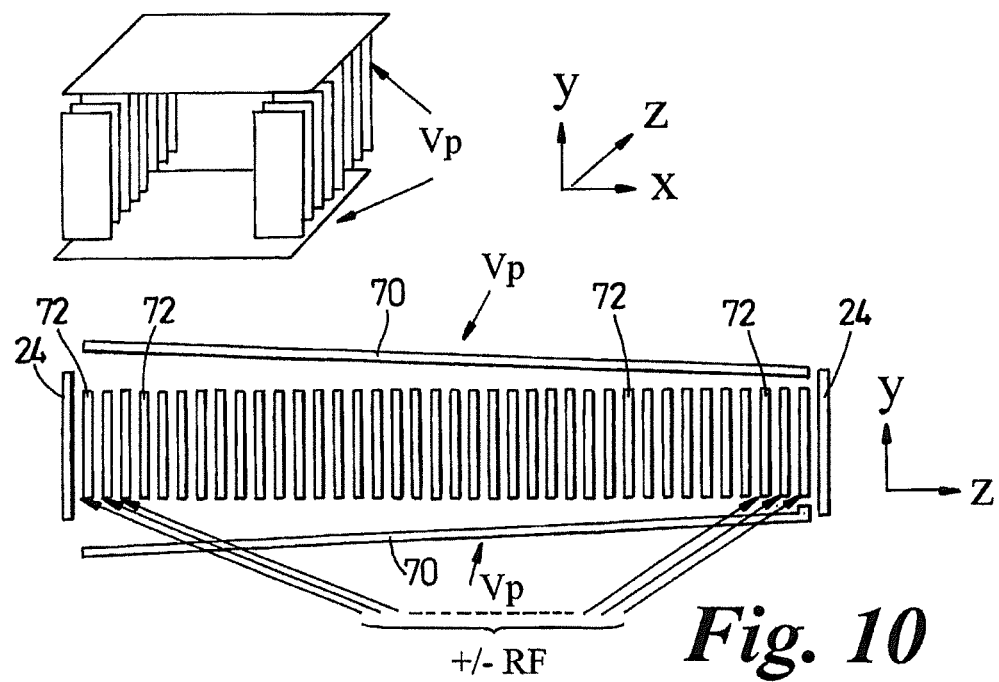
FIG. 10 shows a perspective and side view of an embodiment of an ion extraction device.

FIG. 10 shows an embodiment which is analogous to that shown in FIG. 7 except that the RF plates or electrodes 72 are stacked in the z-direction or axial direction.

FIG. 11 shows an embodiment wherein segmented RF plates 80 are stacked in the z-direction or axial direction and segmented DC plates 82 are also stacked in the z-direction or axial direction. The embodiment shown in FIG. 11 comprises a plurality of segmented RF/DC electrode units wherein each RF/DC electrode unit can be considered as comprising a coplanar arrangement of two opposed RF electrodes and two opposed DC electrodes. In this way a DC voltage having a polynomial function can be applied to the upper and lower DC electrodes 82 and/or the RF plates or electrodes 80 to create any desired function.

The ion extraction device or preferred ion trap may preferably have a length of 50 to 250 mm, a width of 5 to 50 mm and an extraction aperture diameter of 0.5 to 4 mm. Preferably, the extraction aperture diameter is about 2 mm.

Figure 13:
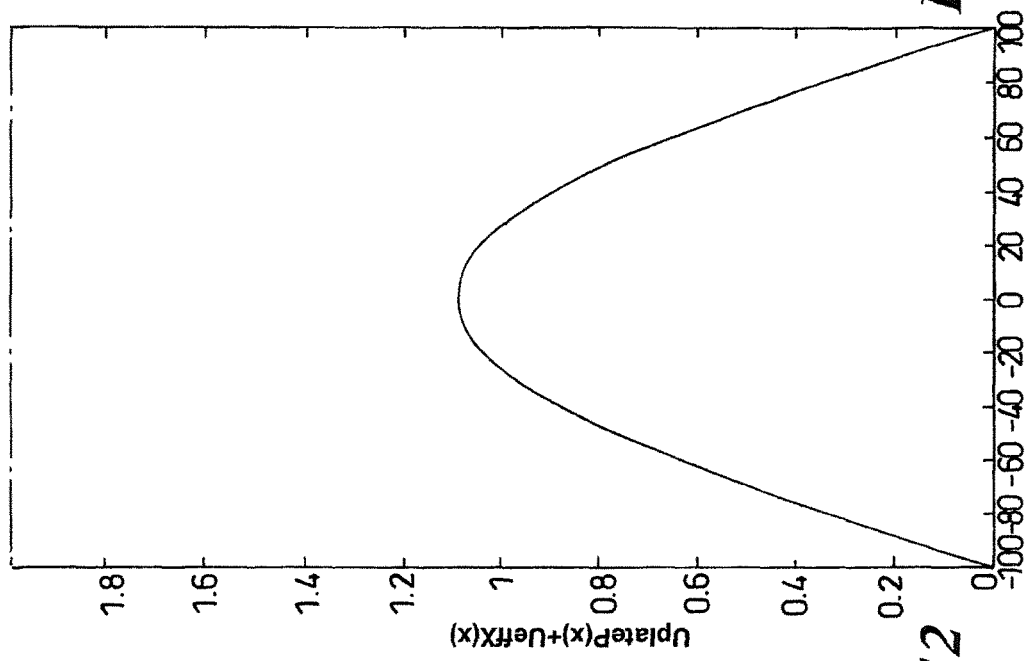
FIG. 13 shows a typical negative dispersion plot along the x axis provided using a device as shown in FIG. 5A.
Figure 12:
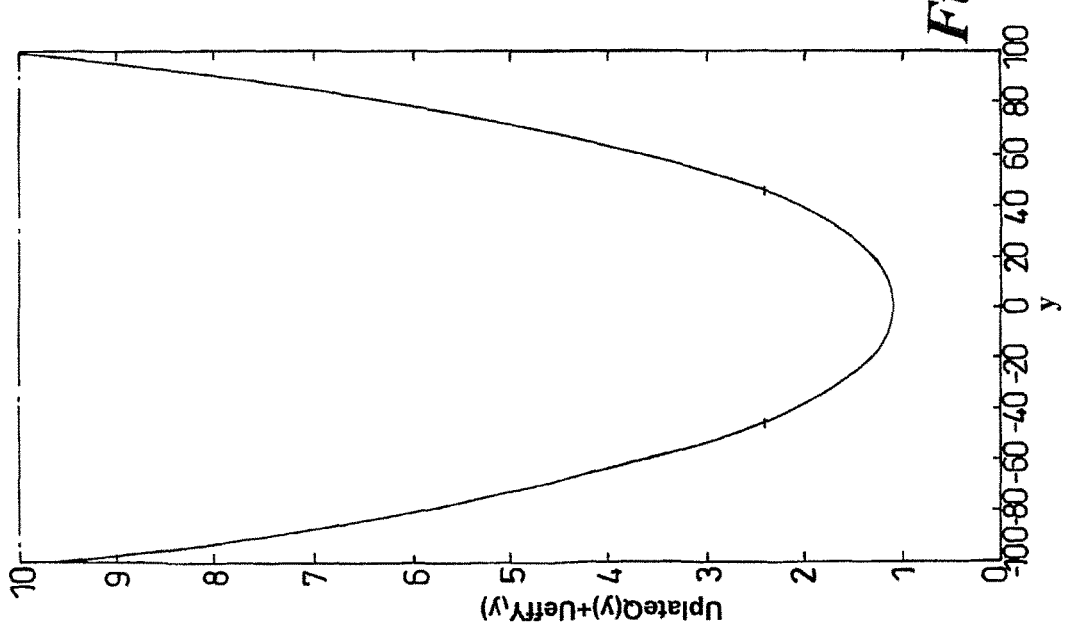
FIG. 12 shows a typical electrostatic potential well along the y axis produced using an ion extraction device as shown in FIG. 2.

FIG. 12 shows a typical electrostatic or DC potential well in the y-direction (e.g. vertical direction) of a preferred ion trap as shown in FIG. 5A. FIG. 13 shows a typical negative dispersion along the x-direction e.g. between the RF electrodes. These plots were calculated from the 2nd term in Eqn. 4.

Figure 14:
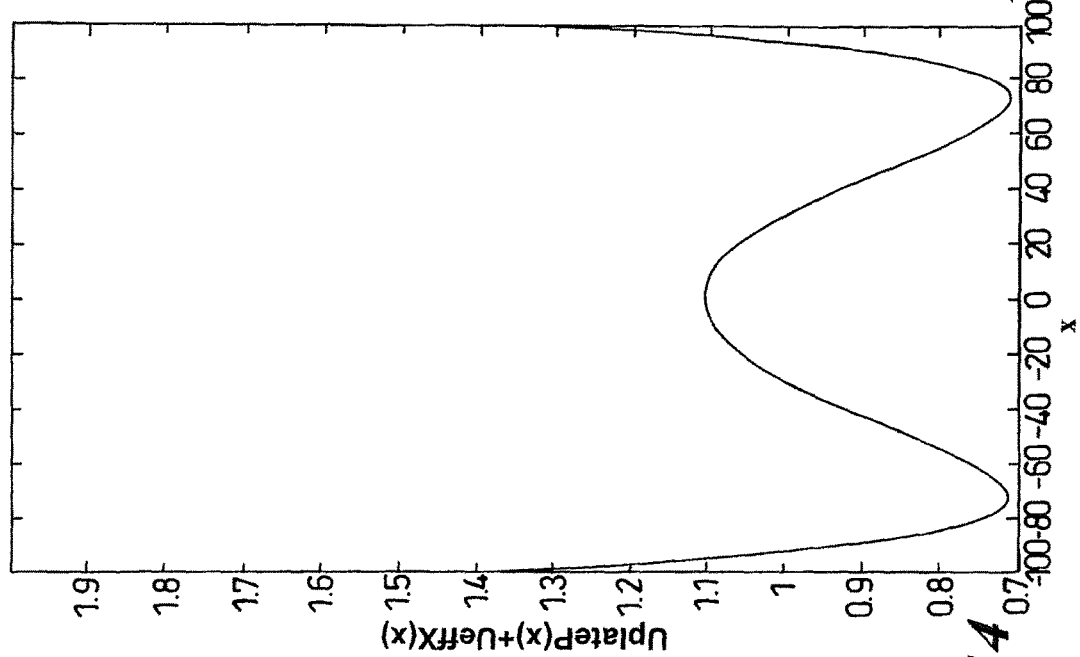
FIG. 14 shows the form of the effective potential well along the x axis produced using a device as shown in FIG. 5A.
Figure 15:
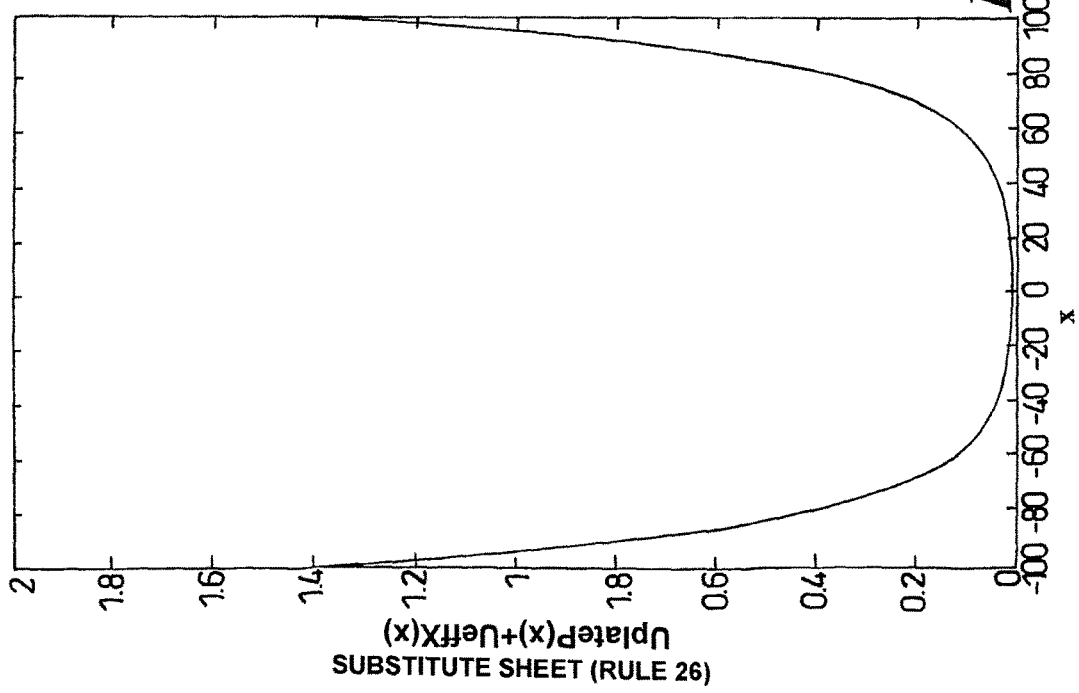
FIG. 15 shows a composite potential due to the combination of electrostatic and pondermotive potentials along the x axis produced using a device as shown in FIG. 5A.

FIG. 14 shows the form of the effective potential well along the x axis and is calculated from the 1st term in Eqn 4. FIG. 15 shows a composite potential due to the electrostatic or DC potential and the pondermotive or RF potential along the x-axis for the chosen device geometry. At the centre of the device near the y-axis it can be seen that the potential is at a local maximum. This is because the dispersive force in x at the centre of the ion guide or ion trap from the electrostatic or DC saddle point is greater than that produced by the pondermotive or RF trapping force from the RF effective potential. As one progresses closer to the edge of the ion guide or ion trap the RF effective potential exceeds the electrostatic dispersion and so complete x-y trapping is achieved in these two wells.

In the presence of a collision gas the kinetic energy of ions is preferably damped and the ions are preferably confined locally to these potential minima away from the centre of the preferred ion guide or ion trap.

Inspection of the first term of Eqn. 4 shows that the size of the RF effective potential well depends upon the charge squared and the mass. By carefully adjusting the electrostatic or DC voltage and/or the applied RF voltage it is possible to separate ions of similar mass but differing z.

Figure 16A:
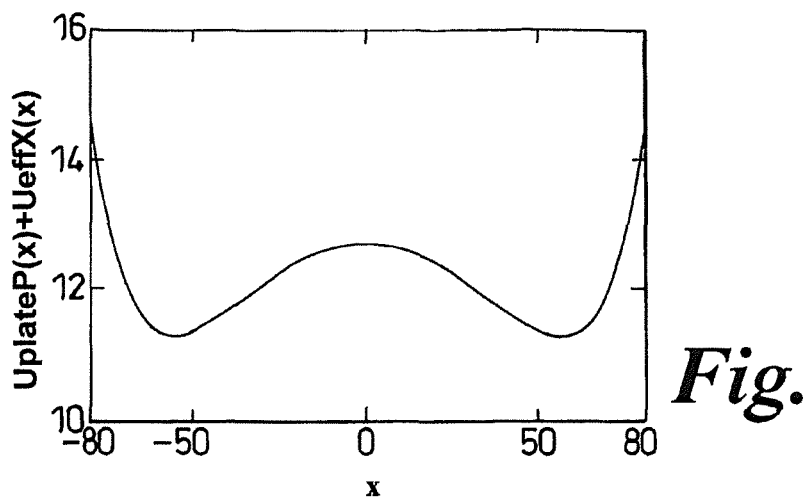
FIG. 16A shows the position of the potential minima for ions having M=1000 and z=2.
Figure 16B:
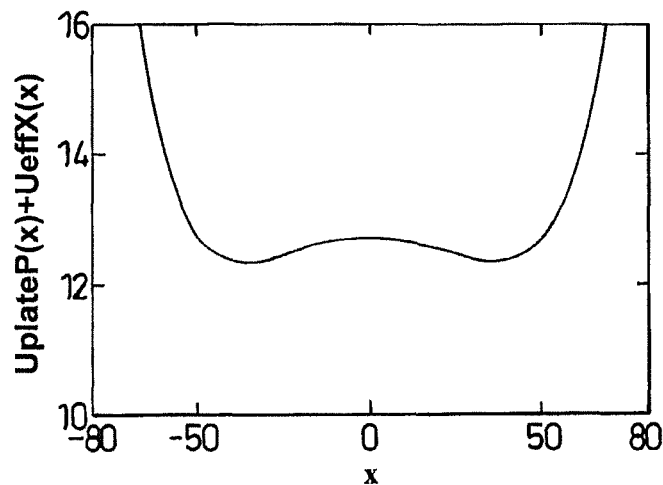
FIG. 16B shows the position of the potential minima for ions having M=500 and z=2 and FIG. 16C shows the position of the potential minima for ions having M=250 and z=2.
Figure 16C:
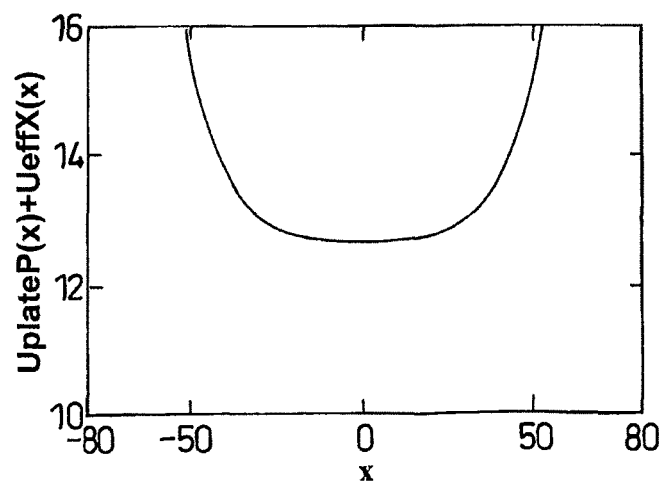

FIG. 16A shows the position of the potential minima for ions of M=1000, z=2, FIG. 16B shows the position of the potential minimum for M=500, z=2 and FIG. 16C shows the position of the potential minimum for M=250, z=2. The same voltage settings were used in the preferred ion guide or ion trap for the three figures and they demonstrate how spatial separation of ions having similar mass but different z can be achieved.

So far only the 2D behaviour of the preferred ion guide or ion trap has been discussed and the extraction of the ions to further stages has not been discussed. The preferred ion trap may be constructed to various lengths in order to increase the space charge capacity before degradation of performance.

Figure 17:
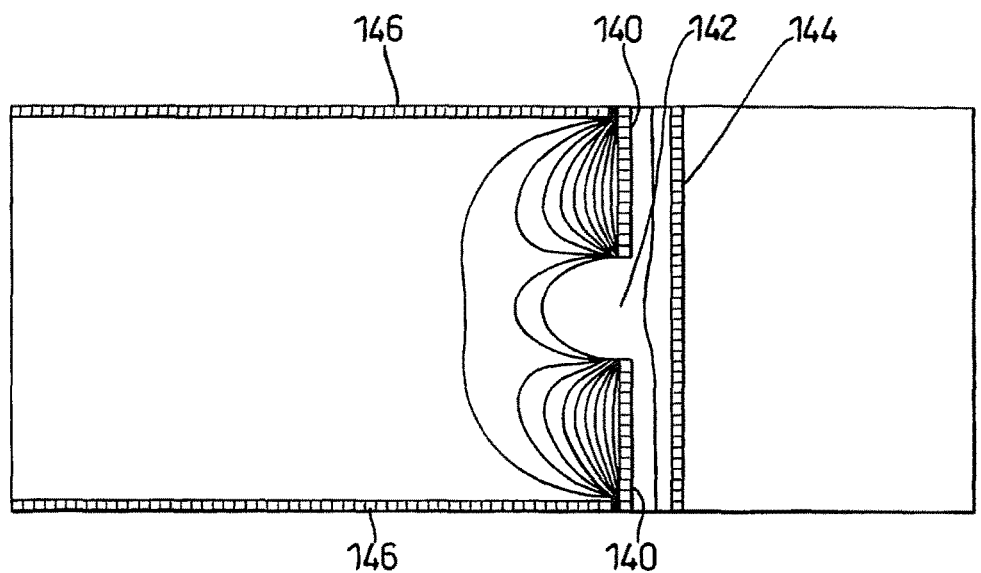
FIG. 17 shows a cross-sectional view of an exit region of a preferred ion extraction device.

In one embodiment as shown in FIG. 17 an end plate 140 is provided with an aperture 142 through which ions are preferably extracted. In normal operation the end plate 140 may be biased so as to trap ions in the body of the ion trap. An auxiliary electrode 144 is preferably situated behind the end plate 140 so as to cause a local extraction field in the centre of the ion trap. FIG. 17 also shows the end extremities of the upper and lower DC electrodes 146. Lines of equipotential showing the local extraction field are also shown in FIG. 17. Ions which reside in the potential wells away from the optic axis preferably remain trapped in the device whereas ions which reside towards the centre of the ion trap are preferably extracted from the ion trap in a mode of operation.

According to the preferred embodiment the RF and/or the electrostatic DC potentials may be preferably scanned or varied in order to bring sequentially those ions of desired mass to charge ratio and/or charge state z to the optic axis for subsequent ejection through the endplate hole. The spatial separation of different species of ions is preferably maintained during the extraction process so that the performance of the ion trap is not compromised.

Figure 18:
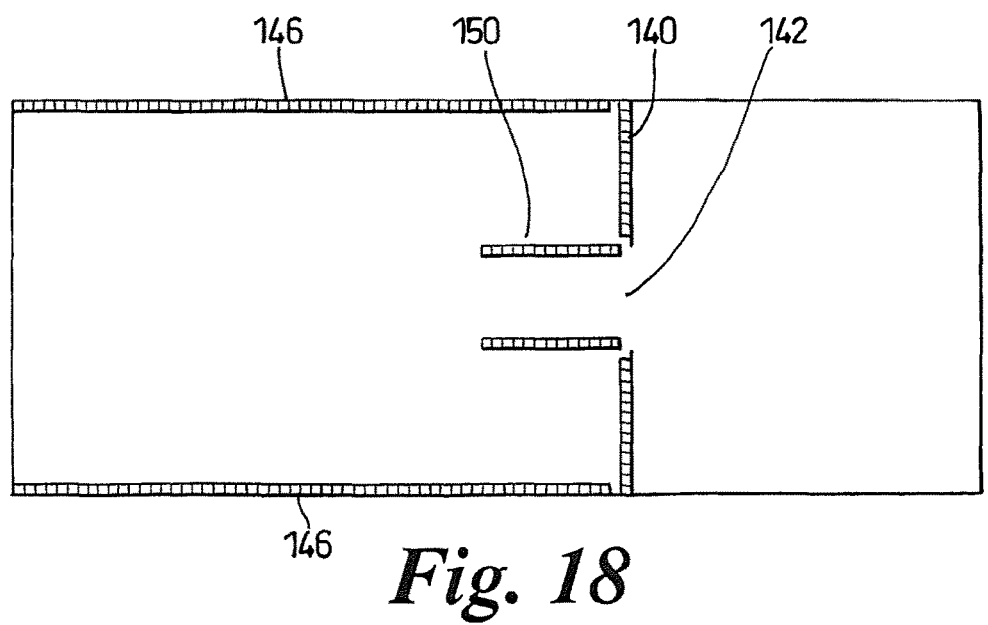
FIG. 18 shows a cross-sectional view of the exit region of an ion extraction device according to another embodiment.

Another way of extracting ions from the preferred ion trap is shown in FIG. 18 and comprises providing an end plate 140 which has an inwardly extending leaky dielectric tube 150. Ions may be extracted through the inwardly extending leaky dielectric tube 150. The leaky dielectric tube 150 is preferably positioned adjacent to the aperture 142. A trapping voltage is preferably applied to the end plate 140 which preferably acts to keep ions within the ion trap. Gas flow through the ion trap and/or the application of the electric field in the tube 150 may preferably act to drive or urge ions into the tube 150 and out of the preferred ion trap. RF fields may preferably be maintained through the leaky dielectric in order to keep ions towards the centre of the tube 150 during their exit e.g. to subsequent spectrometer stages or as the ions are passed to the scanning mass filter/analyser or mass spectrometer which is preferably provided downstream of the preferred ion trap.

The extraction elements of the preferred ion trap may be pulsed for optimum interfacing to the downstream elements of the mass spectrometer e.g. quadrupole mass filter/analyser or mass spectrometer. In alternative embodiments, populations of ions may be extracted from a number of predetermined locations from the preferred ion trap. A plurality of apertures may be provided for this purpose. Accordingly, populations of ions can be extracted in situ without causing a population of ions to move to a fixed extraction point such as the centre of the ion trap.

Figure 19A:
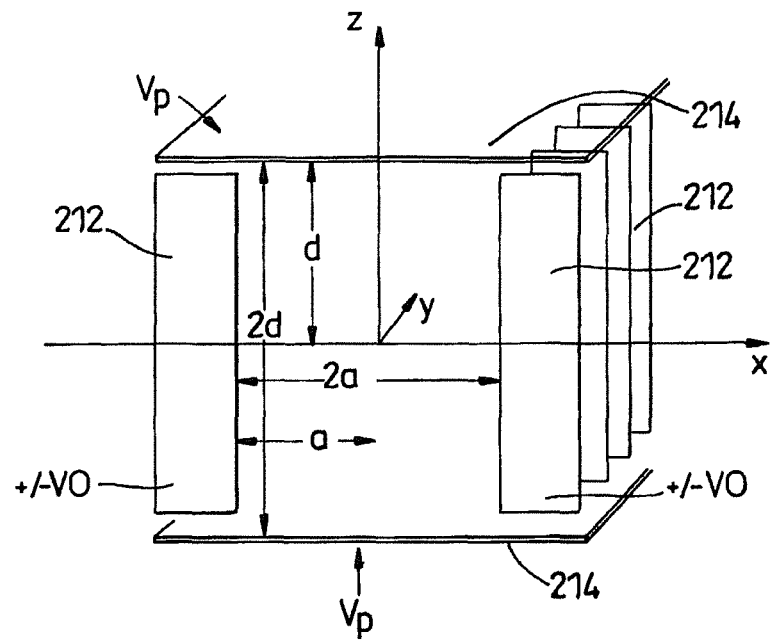
FIG. 19A shows a cross-sectional view of a DC electrode/RF electrode arrangement and FIG. 19B shows a perspective view of a cuboid device according to an embodiment.
Figure 19B:
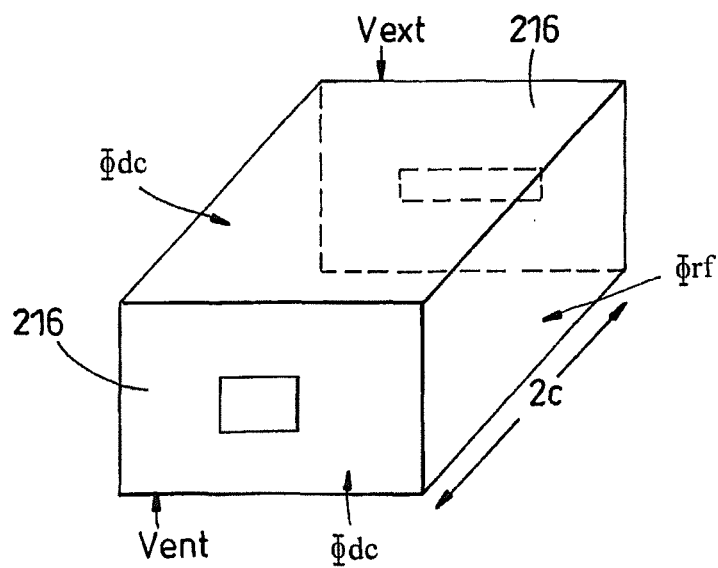

The preferred ion trap described above exploit phenomena associated with a general two dimensional solution. Further embodiments of the invention exploit phenomena associated with a general three dimensional solution. A general three dimensional solution has been found for the ion guide or ion trap whose form and notation is shown in FIGS. 19A and 19B. The ion guide or ion trap comprises a plurality of RF plates 212, a plurality of upper and lower DC electrodes 214 and a pair of end plates 216. The coordinate system utilised for the ion guide or ion trap shown in FIGS. 19A and 19B differs from the coordinate system utilised for the ion guide or ion trap shown and described with reference to FIG. 4.

The solution for the cuboid geometry has been developed whereby the resultant potential is again the superposition of the individual components which are shown below.

Injection plate Vent at y=−c:

$$\Phi_{ZX2}(x, y, z) = \sum_N \sum_M 16 \cdot \frac{V_{ent}}{NM\pi\pi} \cdot \frac{\sin\left[\frac{M\pi(A(x)+a)}{2a}\right]\sin\left[\frac{N\pi(C(z)+d)}{2d}\right]\sinh\left[\sqrt{\left(\frac{M\pi}{2a}\right)^2+\left(\frac{N\pi}{2d}\right)^2}\cdot(c-B(y))\right]}{\sinh\left[\sqrt{\left(\frac{M\pi}{2a}\right)^2+\left(\frac{N\pi}{2d}\right)^2}\cdot 2c\right]} \qquad (5)$$

Extraction plate Vext at y=c:

$$\Phi_{ZX1}(x, y, z) = \sum_N \sum_M 16 \cdot \frac{V_{ent}}{NM\pi\pi} \cdot \frac{\sin\left[\frac{M\pi(A(x)+a)}{2a}\right]\sin\left[\frac{N\pi(C(z)+d)}{2d}\right]\sinh\left[\sqrt{\left(\frac{M\pi}{2a}\right)^2+\left(\frac{N\pi}{2d}\right)^2}\cdot(B(y)+c)\right]}{\sinh\left[\sqrt{\left(\frac{M\pi}{2a}\right)^2+\left(\frac{N\pi}{2d}\right)^2}\cdot 2c\right]} \qquad (6)$$

Plates at z=+/−d, both with same voltage VP:

$$\Phi DC(x, y, z) = \sum_N \sum_M 16 \cdot \frac{VP}{NM\pi\pi} \cdot \frac{\sin\left[\frac{M\pi(A(x)+a)}{2a}\right]\sin\left[\frac{N\pi(B(y)+c)}{2c}\right]\cosh\left[\sqrt{\left(\frac{M\pi}{2a}\right)^2+\left(\frac{N\pi}{2d}\right)^2}\cdot (C(z))\right]}{\cosh\left[\sqrt{\left(\frac{M\pi}{2a}\right)^2+\left(\frac{N\pi}{2c}\right)^2}\cdot d\right]} \quad (7)$$

ΦRF is defined such that the electrodes are constant along the z axis, alternate along the y axis, and are positioned at x=+/−a:

$$\Phi RF(x, y, z) = \sum_M \frac{4V0}{M\pi} \cdot \frac{\sin\left[\frac{M\pi(C(x)+d)}{2d}\right]\sin\left[\frac{\pi(B(y))}{b}\right]\cosh\left[\sqrt{\left(\frac{M\pi}{2d}\right)^2+\left(\frac{\pi}{b}\right)^2}\cdot (A(x))\right]}{\cosh\left[\sqrt{\left(\frac{M\pi}{2d}\right)^2+\left(\frac{\pi}{b}\right)^2}\cdot a\right]} \quad (8)$$

The effective potential from this RF field is derived from the above expression but the resulting term is too long to include here. A number of examples of effective potentials are shown in the following figures for the geometry shown in FIGS. 19A and 19B calculated using the following parameters. The z axis to RF plate distance a is preferably 6 mm. The RF plate width b is preferably 10 mm. The half length of the ion trap in the y direction d is preferably 20 mm. The number of plates n from x axis to DC plate is preferably five. The peak voltage is preferably V0. The insertion plate voltage Vent is preferably 1 V. The extraction plate voltage Vext is preferably −1 V unless otherwise stated. The trapping plate voltage Vp is preferably 1 V. The following examples illustrate the mass or mass to charge ratio dependence of the effective potential and the ability of the preferred ion trap to trap and extract ions in the chosen direction.

FIGS. 20A-D show an embodiment of an ion extraction device of the present invention. The operation of the ion extraction device stems from the 3D solution discussed above. FIG. 20A shows an x-z slice through the centre of the ion trap showing upper and lower DC electrostatic trapping electrodes 220 and RF plate electrodes 222. The RF electrodes preferably form a pair of electrodes. Multiple pairs of RF electrodes preferably form two RF electrode stacks 224a,224b as shown in FIG. 20A. Each RF electrode in a stack preferably has a matching or corresponding electrode in the other stack positioned across the ion extraction or ion guiding region in the x direction. FIG. 20A shows such a pair of RF electrodes 222a,222b spaced apart in the x direction.

Opposite pairs of RF electrodes spaced apart in the x direction such as electrodes 222a,222b are preferably connected to the same phase of the AC or RF voltage applied to the RF electrodes 222. In contrast, opposite phases of the applied RF potential are preferably connected to adjacent electrodes in the same stack.

The upper and lower DC electrodes 220 are preferably axially segmented and preferably form a pair of DC electrode stacks 225a,225b extending axially along the length of the ion trap.

It can be seen that the ion guide or ion trap shown in FIG. 20A comprises a plurality of segmented RF/DC electrode units, wherein each RF/DC electrode unit comprises a co-planar arrangement of two opposed RF electrodes 222 and two opposed upper and lower DC electrodes 224. A DC voltage having a polynomial function can be applied to both the DC only electrodes 224 and the RF plates or electrodes 222 to create any desired function.

The ion guide or ion trap preferably further comprises a first end plate 226 and a second end plate 228. The first end plate 226 as shown in FIG. 20C preferably has an aperture 230 formed therein enabling ions to be supplied to the ion guide or ion trap. The aperture 230 may be of any convenient shape such as a square or a circle. The second end plate 228 preferably has an aperture 232 through which ions may be extracted from the ion guide or ion trap. The aperture 232 can be any suitable shape such as a slot as shown in FIG. 20D. Other suitable configurations for the aperture through which ions exit the device are discussed below.

Figure 21:
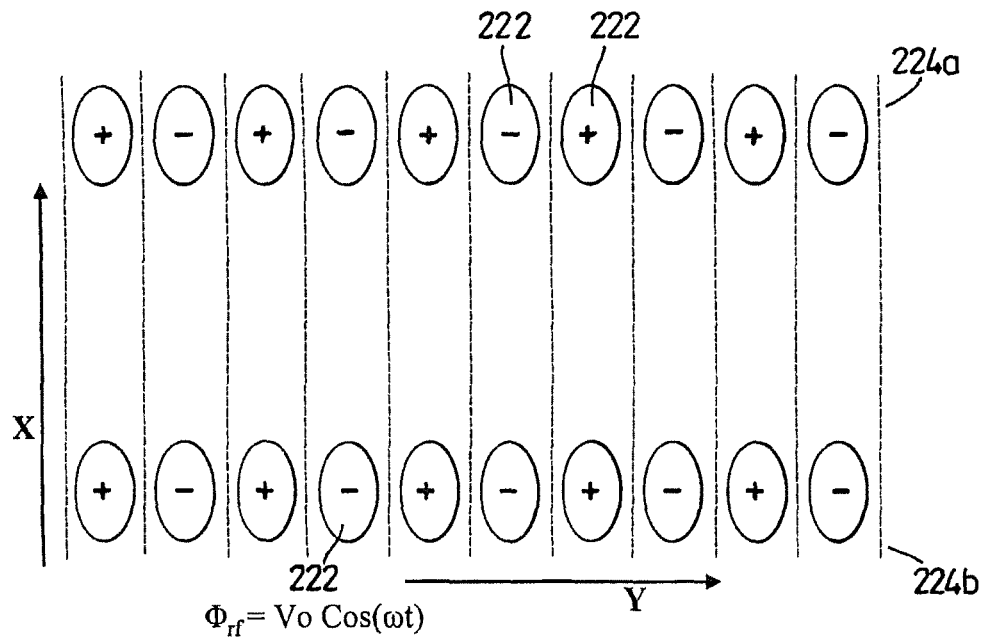
FIG. 21 is a plan view of the RF electrodes according to an embodiment of an ion extraction device showing the application of an RF potential to the electrodes.

FIG. 21 shows a plan view depicting the RF plate electrodes 222 in FIGS. 20A-B arranged in two parallel longitudinal stacks 224a, 224b. FIG. 21 depicts the way in which an AC or RF potential (defined by the equation $\theta_{rf}$=Vo cos (wt)) is applied to the RF electrodes 222. In particular, FIG. 21 shows the phases of the AC or RF potential as applied to each RF electrode 222. Pairs of RF electrodes 222 spaced apart in the x direction are preferably connected to the same phase of the AC or RF potential. In contrast, adjacent electrodes along the y-axis or axial length of the preferred ion guide or ion trap in the stack of electrodes are preferably connected to opposite phases of the AC or RF potential.

As will be appreciated, the phase of the AC or RF potential applied to any given electrode will change as a function of time and thus the positive and negative symbols utilised in FIG. 21 to describe the RF potential applied to each electrode 222 represent a snapshot in time. The effect of the way in which the AC or RF potential is applied to the axially segmented RF electrodes 222 is to produce a spatial periodicity in the effective or potential along the y-axis (i.e. optic axis). The periodicity in the axial effective potential is indicated by dotted lines in FIG. 21.

Figure 22:
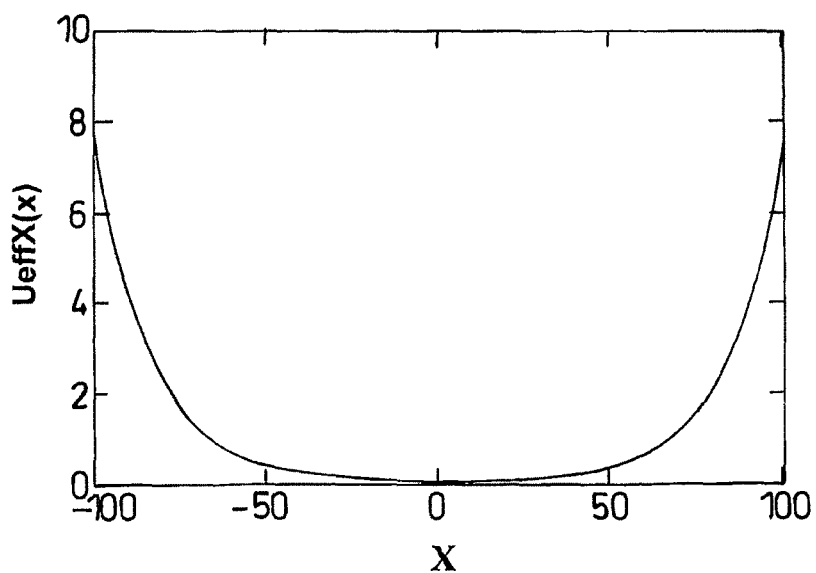
FIG. 22 shows the RF effective potential well in the x direction.

FIG. 22 shows a typical shape of an effective RF potential well in the x-direction i.e. in the radial direction between pairs of spaced apart RF electrodes 222 which are maintained at the same phase. FIG. 22 shows that the effective radial trapping potential increases steeply as an ion approaches either of the same phase RF electrodes 222 in a spaced apart pair.

Figure 23:
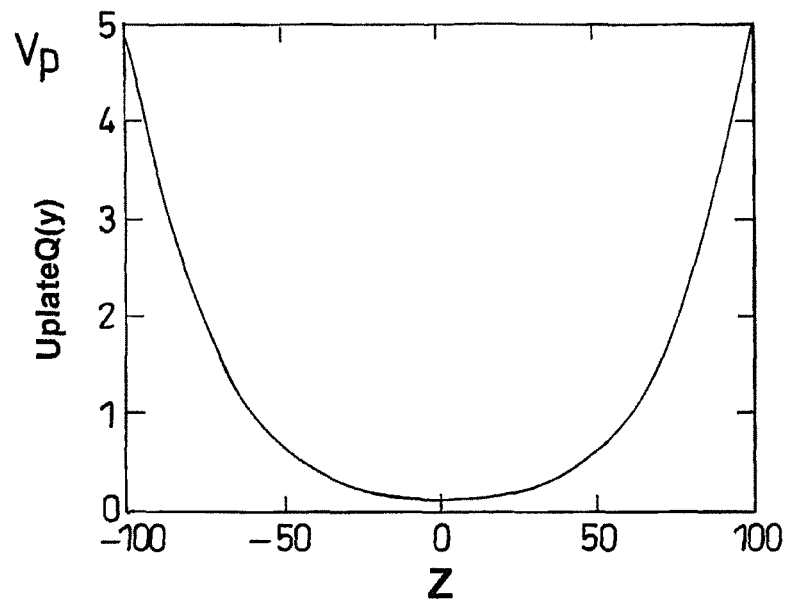
FIG. 23 shows the DC electrostatic potential well in the z direction.

FIG. 23 shows a typical DC electrostatic potential well in the z-direction (i.e. vertical radial direction) generated by the application of a voltage $V_p$ to the upper and lower DC electrostatic trapping electrodes 220. The potential also increases quite markedly as an ion approaches either of the upper or lower DC electrodes 220.

Figure 24:
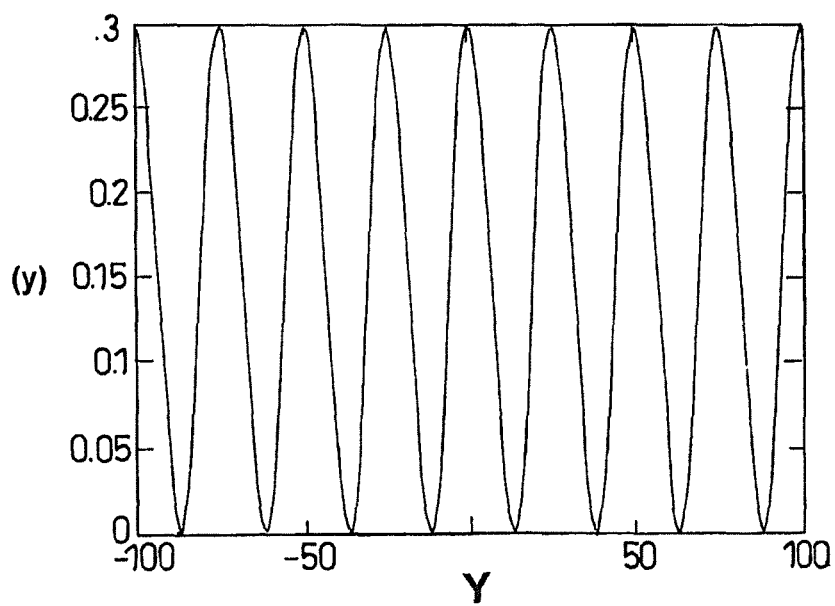
FIG. 24 shows the effective potential in the y or axial direction.

FIG. 24 shows the effective potential in the y-direction i.e. along the axial length of the ion extraction device or ion trap. It can be seen that the effective potential shows ripples along the y-axis. The magnitude of the ripple which is caused by the periodicity in the AC or RF potential along the y-axis is dependent upon the mass to charge ratio of an ion in the ion extraction device or ion trap. It has been found that the magnitude of the ripple of the effective potential along the y-axis is independent of the proximity of an ion to either the RF electrodes 222 or to the upper and lower DC electrodes 220.

FIGS. 25A-D shows the mass dependent effective potential in the y-direction (i.e. along the axis) in a number of different instances. FIGS. 25A and 25B show the effective potential for a singly charged ion of mass 2000. FIG. 25A shows the effective potential along the centre of the ion extraction device i.e. at x=0 and z=0 using the coordinate system shown in FIGS. 19A-19B. FIG. 25B shows the effective potential at an RF electrode 222. As expected, the potential at an RF electrode 222 is higher than at the centre of the device. However, in both instances the magnitude of the ripple is 0.3 V i.e. the magnitude of the ripple does not vary with position within the ion guide or ion trap.

Similarly, FIGS. 25C and 25D show the effective potential in the y-direction (i.e. along the optic axis) for a singly charged ion of mass 200. FIG. 25C shows the effective potential at the centre of the device and FIG. 25D shows the effective potential at an RF electrode 222. Again, the potential at RF electrode 222 is higher than in the centre of the device, but the magnitude of the ripple observed is the same in both instances. The magnitude of the ripple in this case is now 3V. This illustrates that the magnitude of the ripple is dependent upon the mass to charge ratio of the ion in the device.

FIGS. 26-32 show a variety of two dimensional effective potentials in a number of planes through the ion extraction device or ion trap as shown and described with reference to FIG. 20A. The ripples in the effective axial potential described above represent a mass dependent potential barrier. This phenomena is preferably utilised according to the preferred embodiment to trap fragment or parent ions and preferably to mass selectively release ions.

In preferred embodiments of the present invention an axial field may additionally be applied along the length of the ion trap. For example, appropriate potentials may be applied to the end plates 226,228 of the ion trap shown in FIG. 20A. The additional axial field preferably causes ions having relatively high mass to charge ratios to move along the length of the device whereas ions having relatively low mass to charge ratios will preferably encounter deeper potential wells in the y-direction (see FIGS. 25A-25D) and will preferably remain trapped in the body of the device. By judicious variation of the effective potential, ions having a chosen mass to charge ratio may be selectively extracted from the ion trap.

FIGS. 33A-B show how mass selective extraction of ions may be achieved through the application of an axial drift field along the axial length of the ion guide or ion trap. FIG. 33A shows the effective potential experienced by ions when the drift field is large enough to overcome the potential maxima created by the RF potential. In this instance, there is no axial energy barrier in the effective potential and the drift field is sufficient to enable ions to be transmitted along the length of the device. FIG. 33B depicts the effective potential in the instance in which the applied drift field reduces, but does not eliminate, the potential maxima created by the RF potential. In this instance, ions will become trapped behind the potential maxima in the effective potential. The applied RF potential may be swept in order to selectively transmit ions from high to low mass to charge ratios. In alternative embodiments, the magnitude of the applied drift field may be swept in order to selectively transmit ions.

FIG. 34 shows an alternative embodiment wherein a plurality of axially adjacent RF electrodes 222 are connected to a common phase of the applied oscillatory AC or RF potential. In each stack 224a,224b of RF electrodes 222 groups of three adjacent RF electrodes 360 are preferably connected to a common phase of the applied RF potential. Accordingly, along the axial direction the phase of the applied RF potential changes every third electrode. The effect of this embodiment is that, for a given set of RF electrodes, the spacing of the periodicity in the applied RF potential is increased i.e. the periodicity of the axial pseudo-potential wells is preferably increased.

In the example shown in FIG. 34, groups of three adjacent RF electrodes are connected to a common phase of the applied RF potential. However, the number of electrodes in a group of adjacent electrodes connected to a common RF potential is not limited to three and other embodiments are contemplated wherein, for example, two, four, five, six, seven, eight or more than eight axially adjacent RF electrodes may be connected together to a common phase of the RF voltage. According to a preferred embodiment six axially adjacent RF electrodes may be connected to a common phase of the RF voltage.

If axially adjacent RF electrodes in a stack are connected to opposite plates of the applied RF potential, as shown in FIG. 21, then relatively thick RF electrodes may be employed according to an embodiment in order to produce ripples in the axial potential which have a greater magnitude.

It is possible to utilise a combination of the approaches shown and described with relation to the embodiments shown and described in relation to both FIGS. 21 and 34. For example, it is possible to connect pluralities of axially adjacent RF electrodes to a common phase of the applied oscillatory RF potential, such as described with reference to FIG. 34, in order to increase the periodicity in the applied RF potential. An additional, ion trapping oscillatory AC or RF potential to provide extra confinement in the x direction may also be applied to adjacent RF electrodes in the manner shown in FIG. 21 i.e. the phases of the ion trapping oscillatory RF potential applied to adjacent RF electrodes are opposed.

It should be noted that the ion trapping oscillatory RF potential is not intended to produce the periodicity in the applied RF potential i.e. the periodic wells have already been created by the connected pluralities of adjacent RF electrodes. Rather, the ion trapping oscillatory RF potential acts to confine high mass to charge ratio ions which might otherwise strike the electrodes of the device by providing a strong potential barrier towards the sides of the device, whilst not affecting the effective RF potential along the main, longitudinal device axis significantly.

The ion trapping oscillatory RF potential may preferably be applied 90° out of phase with the RF potential applied to the groups of adjacent RF electrodes. This improves ion trapping and reduces the peak voltages on the RF electrodes. According to an embodiment the RF potential applied to the groups of adjacent RF electrodes may be 300 V and the ion trapping oscillatory RF potential may be 85 V. Both potentials may have a frequency of 1.5 MHz. It is an advantageous feature that, owing to the nature of the Laplace equation, the ion trapping oscillatory RF potential is additive to the effective potential of the ion trap.

FIG. 35 shows a preferred end plate 370 which is preferably provided at the exit of the ion guide or ion trap. The end plate 370 preferably has a slotted aperture 372 through which ions are preferably extracted from the ion trap. Due to the superposition of the electrostatic or DC potential produced by the DC electrodes and the RF effective potential, the effective potential along the x axis (i.e. between spaced apart pairs of RF electrodes across the device) can exhibit potential minima which are positioned away from the central axis of the ion guide or ion trap. The position of the potential minima is dependent upon the mass to charge ratio of the ion in the effective potential.

FIG. 36A shows the effective potential in the x direction for an ion having a mass to charge ratio of 500. FIG. 36B shows the effective potential for an ion having a lower mass to charge ratio of 50. It can be seen from FIG. 36B that whilst the minimum in the effective potential for an ion having a mass to charge ratio of 50 is situated at the centre of the ion trap, for an ion having a mass to charge ratio of 500 two potential minima are observed which are axially displaced from the centre of the ion guide or ion trap. By providing a slotted aperture 372 as shown in FIG. 35 it is possible to transmit ions from the ion trap irrespective of their distribution along the x-axis.

Figure 37A:
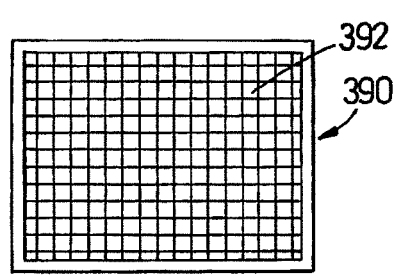
Figure 37B:
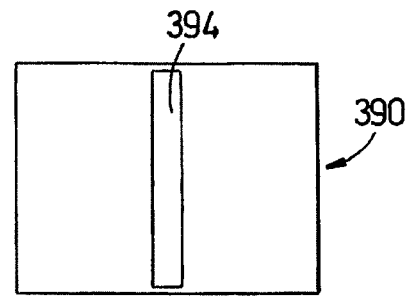
Figure 37C:
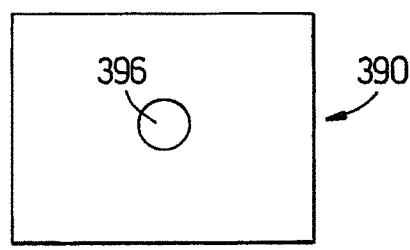
Figure 37D:
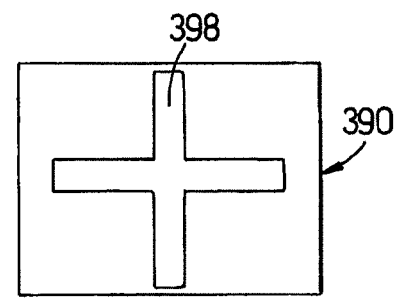
Figure 37E:
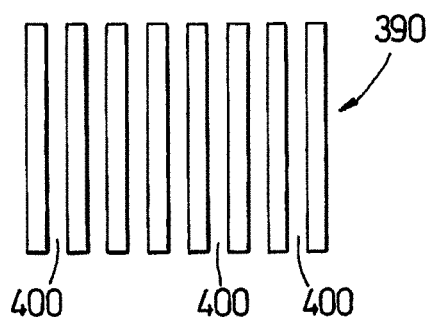

FIGS. 37A-E show end plates according to other embodiments. FIG. 37A shows an end plate 390 having a grid or mesh 392 defining a plurality of exit apertures. FIG. 37B shows an end plate 390 having a vertically slotted aperture 394. FIG. 37C shows an end plate 390 having circular aperture 396. FIG. 37D shows an end plate 390 having a cross shaped aperture 398 formed from vertical and horizontal slots. FIG. 37E shows an end plate 390 having a plurality of vertically slotted apertures 400. The methodologies described above with reference to the embodiment shown and described in of FIGS. 17 and 18 may be used in order to extract ions.

According to an embodiment a pair of spaced apart DC plates or electrodes may be provided which act as DC electrodes. The DC plates or electrodes preferably extend axially along the ion guide or ion trap. Alternatively, a pair of inclined spaced apart DC plates which act as DC electrodes enabling an axial field along the ion trap to be created may be provided.

The ion trap preferably has a length of 50 to 250 mm, a width of 5 to 50 mm and may according to a preferred embodiment comprise 140 RF electrodes in each stack (i.e. 280 RF electrodes in total).

FIG. 38 shows an embodiment wherein the ion guide or ion trap comprises a first fragmentation, thermalisation and trapping stage 420, followed by a mass selective transmission stage 422. The mass selective transmission stage 422 is followed in turn by a trap-time of flight stage 424. An optical beam shaper stage 426 may be provided at the exit region of the ion guide or ion trap and downstream of the trap-time of flight stage 424.

The mass selective transmission stage 422 preferably comprises an ion trap As discussed above. Each of the stages 420,422,424,426 of the overall ion guide or ion trap may also preferably comprise spaced apart stacks of RF electrodes 428 and corresponding spaced apart stacks of upper and lower DC electrodes 430. End plates 432 may also be preferably provided.

The initial fragmentation, thermalisation and trapping stage 420 may preferably be operated such that there is only a negligible ripple in the effective axial potential. The fragmentation, thermalisation and trapping stage may preferably have a relatively gentle drive axial field maintained across the stage. According to an embodiment ions are preferably accumulated and optionally fragmented within this stage 420 in a mode of operation. Populations of parent or fragment ions are then preferably transmitted to the mass selective transmission stage 422. The fragmentation, thermalisation and trapping stage 420 is preferably arranged to accumulate incoming ions whilst mass selective ejection preferably occurs in the downstream mass selective transmission stage 422.

The mass selective transmission stage 422 preferably operates generally in the manner as described above. A relatively large mass dependent ripple is preferably provided in the effective axial potential.

The-trap-time of flight stage 424 provided downstream of the mass selective transmission stage 422 preferably has a negligible ripple in the axial effective potential. The trap-time of flight stage 424 preferably accumulates ions and sends packets of ions to the beam shaper stage 426 arranged downstream. The trap-time of flight stage 424 preferably has a relatively gentle drive field maintained across the axial length of this stage 424.

Extraction of ions from the ion guide or ion trap is preferably synchronised with a pusher by a variable mass dependent delay as shown in FIG. 39. In contrast to the other stages, the beam shaper stage 426 preferably comprises an RF only electrode stage. Thus, potentials are preferably not applied to any DC electrodes in this stage 426. Accordingly, DC electrodes may not be provided in the beam shaper stage 426. The beam shaper stage 426 preferably has a negligible ripple in the axial effective potential.

As shown in FIG. 40 the beam shaper stage 426 may preferably comprise a plurality of different plates 440 which preferably have varying internal aspect ratio which may preferably prepare and/or alter the cross-sectional profile of the ion beam for introduction into a subsequent analysis stage. The subsequent analysis stage preferably comprises a mass spectrometer stage such as a quadrupole rod set mass filter/analyser or mass spectrometer. The beam shaper stage 426 may therefore according to an embodiment shape the cross-sectional profile of the ion beam so that the cross-sectional profile of the ion beam is optimised to be received in the downstream quadrupole rod set mass filter/analyser or mass spectrometer 14.

The electrodes of the preferred ion guide or ion trap may according to an embodiment be mounted on a Printed Circuit Board (PCB). The mounting of electrodes onto a PCB provides flexibility in terms of how the ion trap is wired. Advantageously, it has been found that PCB holes are accurate enough to obtain the desired ion-optical performance FIG. 41 shows an end view of a preferred ion trap shown generally at 450, comprising a plurality of RF electrodes 452 with upper and lower DC electrodes 454. The RF electrodes 452 preferably comprise RF plate electrodes and are preferably mounted directly onto PCBs 456,458. One stack of RF electrodes is preferably mounted on to a first PCB 456 and a second stack of RF electrodes is preferably mounted onto a second PCB 458. The upper and lower DC electrodes 454 are preferably mounted on members 460 which themselves are preferably mounted on PCBs 456,458 via edge connectors 462.

The passageway or ion guiding region defined by the spaced apart upper and lower DC electrodes 454 and the RF electrodes 452 preferably represents or comprises an ion extraction volume having an ion extraction pathway. In this example, the ion extraction volume is cuboid having a rectangular face defined by the spacings of the upper and lower DC electrodes 454 and the RF electrodes 452. The spacings are preferably 14 mm and 8 mm respectively resulting in an aspect ratio of 1.75. Other dimensions and/or aspect ratios are contemplated. However, it should be noted that the provision of a cuboid ion extraction volume as opposed to a cubic ion extraction volume (having an aspect ratio of 1.0) is particularly advantageous for generating desired axial effective potentials.

The ion trap shown in FIG. 41 preferably further comprises a top plate 463 and a bottom plate 464. The top and bottom plates 463,464 may be formed from metal and may be positioned against the PCBs 456,458 with gaskets 466 and fixed in place with suitable fixing means such as screws 268. A gas inlet 470 may be provided to the top plate 462. The RF electrodes 452 preferably have tabs 452a which preferably protrude through the PCBs 456,458 thereby permitting convenient wiring. Similarly, the upper and lower DC electrodes 454 preferably have tabs 454a which preferably protrude through the members 460 enabling convenient wiring of the DC electrodes.

Each DC electrode 454 may be attached to a separate member 460 with each DC electrode 454 or member 460 unit being spaced apart from each other. In this way apertures are preferably provided between the upper DC electrodes 454 or member 460 units permitting the entry of gas into the cell from the gas inlet 470. Entrance and exit plate assemblies including suitably shaped entrance and exit apertures are preferably fixed to the edges of the PCBs 456, 458 and top and bottom plates 462, 464 using gaskets.

FIG. 42 shows possible designs of hollow or apertured RF plates 480 482 which may be used according to an embodiment. The hollow or apertured plate electrodes result in a reduced capacitance and thus a reduced loading on the RF power supply. It is possible to provide adjacent plates that have a different shape. The plates may be chemically etched and may optionally be gold plated. The constructional approach depicted in FIG. 41 is convenient, cost effective and permits easy manufacture of preferred ion guides or ion traps. The ion guide or ion trap may be constructed by soldering, which may require use of a construction jig to hold the plates in place.

Greater analytical utility may be provided when a preferred ion guide or ion trap is coupled to further stages of a mass spectrometer. According to the preferred embodiment the ion trap is preferably coupled to a downstream quadrupole mass filter/analyser or mass spectrometer. It is also envisaged that when a preferred ion guide or ion trap is coupled to an orthogonal acceleration time of flight mass analyser improvements in duty cycle may be realised.

The preferred ion guide or ion trap when coupled to an orthogonal acceleration Time of Flight mass analyser enables a 100% duty cycle for all ions (e.g. parent and fragment ions). In one embodiment desired ions may be pulsed out of the ion guide or ion trap, for example by varying the RF potential, by an auxiliary extraction electrode or by an end plate. The pulsing of a pusher electrode of the orthogonal acceleration Time of Flight mass analyser may be preferably timed to coincide with the ejection of a mass to charge ratio packet of ions from the ion guide or ion trap. The extract-pulse cycle may be repeated until all the ions have been extracted from the ion guide or ion trap and then the ion guide or ion trap may be adjusted to eject ions of the next desired mass to charge ratio value. The simplicity of operation and mono-energetic nature of the extracted ions offer a significant advantage over conventional 3D Quadrupole Ion Trap (QIT) arrangements. A 100% duty cycle will depend upon the ion extraction device accumulating ions with 100% efficiency and being isolated by a 100% efficient ion trapping region upstream of the ion extraction device while it is ejecting ions sequentially to the Time of Flight mass analyser.

In one embodiment it is contemplated that the upstream ion trapping region could comprise another preferred ion extraction device which has been appropriately biased to prevent ions entering the downstream stage.

It has also been recognised that the operation of a preferred ion extraction device with an orthogonal acceleration Time of Flight mass analyser can improve signal to noise ratio particularly when coupled to Analogue to Digital Converter ("ADC") acquisition electronics. ADC converters offer significant dynamic range advantages over Time-to-Digital Converters ("TDC") for high ion currents. However, at low ion currents their poorer noise characteristics may obscure weak signals particularly over long integration periods. The improvement in signal to noise relies on two concepts namely concentration of ion signals into shorter timepackets and concentration into smaller discrete mass ranges.

FIG. 43 shows the steady implementation (i.e. constant ion signal into the device) of an accumulating ion trap 170 with extract pulse wide "W" and trapping time "T" split into n discrete and equal mass ranges. If the ion trap is 100% efficient and emits ions of all mass equally then the intensity of the ion packet is n(W+T)/W times more intense during its extraction phase (and emitted in a factor of W/n(W+T) shorter time) than an equivalent continuous experiment for any particular mass. Signal to noise is dramatically improved as the ADC need not be acquiring data while there is no signal, the mass range of acquisition set on the ADC being correlated to that being emitted by the ion trap of the preferred embodiment at that point in time. Typically the preferred ion trap may be set to emit over ten separate discrete mass ranges to cover the whole mass range of interest with data only being recorded into those mass channels corresponding to that being emitted by the ion trap. The ion trap to extract ratio is limited only by the space charge capacity of the ion trap as the overall charge contained within the ion trap increases by the ratio (W+T)/W.

The usefulness of selecting a chosen charge state or charge states has been previously recognised and is important for improving signal to noise ratio in Proteomics type applications. For example a tandem ion mobility spectrometer may be scanned in tandem with a quadrupole mass filter to select a chosen charge state. The output of a preferred ion extraction device when operating as a mobility separator may also be filtered by mass spectrometry means such as a quadrupole mass filter or axial Time of Flight (or other mass filter/analyser) to give complete selection of desired charge state so improving the signal to noise ratio in, for example, Proteomics experiments. The principle of operation of the ion extraction device of the present invention as a mobility separation device should be considered in the light of the added consideration that the magnitude of effective potential will vary with gas pressure and ion cross section. Tolmachev (A. V. Tolmachev et al: Nuclear Instruments and Methods in Physics Research B 124 (1997) 112-119) utilises the hard sphere model to predict how the magnitude of the effective potential varies with gas pressure and ion cross section. A multiplicative attenuation factor γ should be incorporated in the effective potential and is given by:

$$\gamma = \frac{\omega^2 \tau^2}{1 + \omega^2 \tau^2} \qquad (9)$$

where:

$$\tau = \frac{3(m + M)}{4mn\sigma v} \qquad (10)$$

where ω is the angular frequency of the RF driving field, m the mass of the background gas molecules, M the mass of the ion, n the number density of the buffer gas, v the average Maxwellian gas velocity and σ the collision cross section of the ion.

The model predicts attenuation of the effective potential field as gas pressure increases, in particular it is stated that if an ion undergoes a large number of collisions with residual gas molecules during the period of one RF cycle then the effective potential is reduced. The mobility of an ion is related to its collision cross section by the following relationship (Anal. Chem. 1998, 70, 2236-2242):

$$K = \frac{\sqrt{18\pi}}{16} \cdot \frac{q}{\sqrt{kT}} \cdot \sqrt{\frac{1}{M} + \frac{1}{m}} \cdot \frac{1000}{P} \cdot \frac{T}{273.2} \cdot \frac{1}{n\sigma}$$

wherein T is the absolute temperature, P the pressure in mbar, and k is Boltzmann's constant.

The gas pressure within the ion extraction device is then adjusted to the regime where the term γ becomes significantly less than 1 (at low pressures γ equals 1 for all ions and there is no attenuation of effective potential) so that ions of different cross section or ion mobility can be made to occupy different positions as the location of the potential well(s) moves due to the variation in effective potential described above. Mobility selective extraction of ions from the device can therefore be achieved by variation of either the gas pressure, or more preferably the applied RF voltage or DC trapping voltage in the same way as for mass selective ejection described above. Typical, but non-limiting, gas pressures for use of the device as an ion mobility separator are between 0.1 and 10 mbar.

The preferred ion guide or ion trap may be operated as a collision cell. To do so the ion guide or ion trap is preferably held at a potential such that ions are accelerated into the ion guide or ion trap at a desired ion energy. Ions are preferably arranged to collide with the gas present in the ion guide or ion trap with sufficient energy to fragment. The ions are preferably generally thermalised as the ions traverse the length of the ion guide or ion trap. By the time the ions reach the exit of the ion guide or ion trap they can preferably be separated according to their mass to charge ratios in the same way that a mixture of unfragmented ions, injected at low energy, can be separated.

An example of a mass spectrometer according to a preferred embodiment is shown in FIG. 44. Ions are preferably generated in an ion source 180 such as an Electrospray or MALDI source. The ions are then passed through a preferred ion trap 182 to a conventional quadrupole mass filter/analyser or mass spectrometer 184. The ions then pass through a preferred ion trap 186. Finally, the ions are then transmitted to mass analyser stage 188 which may comprise a quadrupole mass analyser, a Time of Flight mass, a Fourier Transform mass spectrometer, a magnetic sector mass analyser, an ion-trap mass analyser or an alternative form of mass spectrometer.

According to the preferred embodiment the preferred mass spectrometer is preferably operated on a fill-isolate-extract cycle. Ions are preferably allowed to enter the preferred ion trap 186 for a period of time preferably such that the space charge capacity of the preferred ion trap 186 is preferably not exceeded. The preferred ion trap 186 is then preferably isolated to prevent any more ions entering. Finally, ions are preferably extracted sequentially into further downstream stages of the mass spectrometer. It is desirable to isolate the ion extraction device or ion trap 186 to prevent artefacts e.g. if the device starts by ejecting an ion of low mass to charge ratio (denoted $M_L$) and progressively moves to eject ions of higher mass to charge ratio (denoted $M_H$) then any ions of $M_L$ that arrive in the preferred ion trap 186 at that time will also be transmitted. Similar effects can occur if, for example, the preferred ion trap starts by ejecting ions of high mobility and is then scanned to eject ions of lower mobility. Such artefacts will not be optimally detected if the ion extraction device or preferred ion trap 186 is interfaced to a Time of Flight or other mass spectrometer stage or can cause confusion if interfaced straightforwardly to a simple ion detector.

FIG. 44 also shows that an upstream ion guide 182 may be provided which preferably comprises a preferred ion extraction device or ion trap. In the case of Electrospray ionisation, a consequence of interfacing with the atmospheric ionisation process of Electrospray is that differentially pumped upstream chambers may necessarily be at higher pressures than those required for optimum operation of a quadrupole rod set mass filter/analyser or mass spectrometer. If the preferred ion trap 182 is operated in such a high pressure regime then the ion extraction device or ion trap may be operated as an efficient mobility separator. Therefore in one embodiment the ion trap 182 may comprise an ion mobility selective ion trap which is provided upstream of the quadrupole rod set mass filter/analyser or mass spectrometer 184 in order to improve signal to noise on, for example, multiply charged peptides. Mass selective ejection from downstream ion trap 186 may occur to give up to 100% duty cycle to the subsequent Time of Flight or other mass analyser stage 188.

An example of an experiment which would separate cluster ions of the form $[nM_c]^{n+}$ which all have the same mass to charge ratio ($M_c$) would be to select the ions at mass to charge ratio $M_c$ using a first quadrupole mass filter/analyser or mass spectrometer and then to pass them into a preferred ion mobility selective ion trap which can then sequentially eject ions according to their ion mobility. Ions with the highest mobility (and higher charge state) will be confined to the centre of the ion extraction device or ion trap before those of lower charge stages and will be extracted first. Such experiments are useful in non-covalent protein aggregation studies where conventional mass spectrometry cannot distinguish between these species.

Calculations have been performed to determine the improvement in duty cycle for a quadrupole mass filter/analyser or mass spectrometer that is coupled to a mass selective ion transmission stage in the manner depicted in FIGS. 2 and 3. The improvements in duty cycle are shown in FIG. 45 and are in relation to the quadrupole mass filter/analyser or mass spectrometer being operated without the mass selective ion transmission stage coupled to it. The improvements are presented as a ratio of the duty cycle of the quadrupole mass filter/analyser or mass spectrometer with mass selective ion transmission stage to the duty cycle of the quadrupole mass filter/analyser or mass spectrometer without the mass selective ion transmission stage. It can be seen that very large improvements in duty cycle are apparent across a wide ion mass range. The improvements are even more significant at relatively low ion mass or mass to charge ratio. Physically, this is due to the nature of the mass or mass to charge ratio selective ion transmission stage, which has a more or less constant mass resolution (as previously defined) across the ion mass range. From this it follows that at relatively low mass M, the minimum number of mass units (ΔM) that an ion can differ from mass M and still be resolved from ions of mass M will be smaller than at high M. Therefore, a greater proportion of the ions being introduced into the quadrupole mass filter/analyser or mass spectrometer at any given moment will correspond to the ion mass being transmitted by quadrupole mass filter/analyser or mass spectrometer. Put another way, more effective synchronisation of the ion ejection from the mass selective ion transmission stage and the mass scanning of the quadrupole mass filter/analyser or mass spectrometer is achieved.

The ion transmission stage is preferably configured so that the mass selective ejection of ions runs from high mass or mass to charge ratio ions to low mass or mass to charge ratio ions. However, less preferably the mass or mass to charge ratio selective ion trap may initially eject ions of relatively low mass or mass to charge ratio and sweep upwards towards the ejection of ions of relatively high mass or mass to charge ratio.

Although the ion trap according to the preferred embodiment as shown and described, for example, in relation to FIG. 19A has been described in detail, according to less preferred embodiments the ion trap may take other forms.

For example, according to a less preferred embodiment the ion trap 12 may comprise a plurality of electrodes wherein one or more substantially static inhomogeneous electric fields is created along the length of the ion trap 12. A quadratic or non-quadratic potential well is preferably created along the length of the ion trap 12. A time varying homogeneous axial electric field is preferably superimposed along the length of the preferred ion trap 12. The time varying homogeneous axial electric field is preferably varied with a frequency greater than the resonance or fundamental harmonic frequency of a majority of the ions located within the ion trap 12. Ions are preferably ejected from the ion trap 12 in a non-resonant manner by varying the amplitude and/or frequency of oscillation of the time varying homogeneous axial electric field.

Embodiments are also contemplated wherein one or more transient DC voltages may be applied to the axially segmented electrodes comprising the ion trap in order to urge ions along the axial length of the ion trap.

According to a preferred embodiment the ion trap may comprise a plurality of ring electrodes or electrodes having apertures through which ions are transmitted in use. A combination of DC and AC/RF voltages may preferably be applied to the ring electrodes or electrodes having apertures in order to create potential fields which confine ions within the ion guide and which cause periodic pseudo-potential wells to be created along the length of the ion trap. Furthermore, the applied voltages may also cause an additional static or transient axial electric field to be created which acts to urge ions along the length of the ion trap.

According to yet further embodiments the ion trap may comprise a 3D quadrupole or Paul ion trap, a 2D or linear quadrupole ion trap or a magnetic or Penning ion trap. Such ion traps are well known in the art and will not therefore be described in more detail.

Although the present invention has been described with reference to preferred embodiments, it will be understood by those skilled in the art that various changes in form and detail may be made without departing from the scope of the invention as set forth in the accompanying claims.

The invention claimed is:

1. A method of performing mass spectrometry including:
   sequentially and selectively ejecting ions from a mass selective ion trap or ion guide according to the mass to charge ratio of the ions;
   directing the ejected ions to a mass scanning mass spectrometer; and
   scanning the mass of the ions transmitted by the mass scanning mass spectrometer;
   in which the ejection of the ions from the ion trap or ion guide and the scanning of the mass scanning mass spectrometer are synchronised so that the mass of at least some of the ions directed into the mass scanning mass spectrometer corresponds to the mass of the ions transmitted by the mass scanning mass spectrometer,
   wherein the mass or mass to charge ratio resolution of said first mass filter/analyser or mass spectrometer is greater than the mass or mass to charge ratio resolution of said ion trap or ion guide.

2. A mass spectrometer comprising:
   a mass or mass to charge ratio selective ion trap or ion guide comprising a plurality of electrodes;
   a first mass filter/analyser or mass spectrometer arranged downstream of said mass or mass to charge ratio selective ion trap or ion guide;
   control means arranged and adapted:
   (i) to cause ions to be selectively ejected or released from said ion trap or ion guide according to their mass or mass to charge ratio; and
   (ii) to scan said first mass filter/analyser or mass spectrometer in a substantially synchronised manner with the selective ejection or release of ions from said ion trap or ion guide; and
   means arranged and adapted to apply one or more DC voltages or one or more DC voltage waveforms to said plurality of electrodes in order to urge ions along the length of said ion trap or ion guide,
   wherein the mass or mass to charge ratio resolution of said first mass filter/analyser or mass spectrometer is greater than the mass or mass to charge ratio resolution of said ion trap or ion guide.

3. A mass spectrometer as claimed in claim 2, wherein said first mass filter/analyser or mass spectrometer comprises a quadrupole rod set mass filter/analyser or mass spectrometer.

4. A mass spectrometer as claimed in claim 2, wherein said control means is arranged and adapted to cause ions to be sequentially or progressively ejected or released from said ion trap or ion guide according to their mass or mass to charge ratio.

5. A mass spectrometer as claimed in claim 2, wherein said control means is arranged and adapted to synchronise the selective ejection or release of ions from said ion trap or ion guide with the scanning of a mass or mass to charge ratio transmission window of said first mass filter/analyser or mass spectrometer.

6. A mass spectrometer as claimed in claim 2, wherein said ion trap or ion guide comprises a plurality of electrodes having apertures wherein ions are transmitted, in use, through said apertures.

7. A mass spectrometer as claimed in claim 2, further comprising AC or RF voltage means arranged and adapted to apply an AC or RF voltage to at least some of said plurality of electrodes.

8. A mass spectrometer as claimed in claim 2, wherein said ion trap or ion guide comprises means for confining ions radially within said ion trap.

9. A mass spectrometer as claimed in claim 2, wherein said ion trap or ion guide comprises means for generating a plurality of axial pseudo-potential wells having a periodicity.

10. A mass spectrometer as claimed in claim 9, wherein the amplitude of said axial pseudo-potential wells is dependent upon the mass to charge ratio of an ion.

11. A mass spectrometer as claimed in claim 2, wherein said ion trap or ion guide comprises first means arranged and adapted to maintain one or more DC, real or static potential wells or a substantially static inhomogeneous electric field along at least a portion of the axial length of said ion trap or ion guide in a first mode of operation.

12. A mass spectrometer as claimed in claim 11, wherein said ion trap or ion guide comprises second means arranged and adapted to maintain a time varying substantially homogeneous axial electric field along at least a portion of the axial length of said ion trap or ion guide in said first mode of operation.

13. A mass spectrometer as claimed in claim 2, further comprising ejection means arranged and adapted to mass or mass to charge ratio selectively eject ions from said ion trap or ion guide.

14. A mass spectrometer as claimed in claim 13, wherein said ejection means is arranged and adapted in a first mode of operation to eject ions substantially axially from said ion trap or ion guide.

15. A mass spectrometer as claimed in claim 2, further comprising means arranged and adapted to apply one or more transient DC voltages or one or more transient DC voltage waveforms to said plurality of electrodes.

16. A mass spectrometer as claimed in claim 2, further comprising means arranged and adapted to apply one or more transient DC voltages or one or more transient DC voltage waveforms to said plurality of electrodes initially at a first axial position, wherein said one or more transient DC voltages or one or more transient DC voltage waveforms are then subsequently provided at second, then third different axial positions along said ion trap or ion guide.

17. A mass spectrometer as claimed in claim 2, further comprising means arranged to apply one or more trapping electrostatic potentials along the axial length of said ion trap or ion guide.

18. A mass spectrometer as claimed in claim 2, wherein ions are urged along the length of the ion trap or ion guide by maintaining a constant or static DC voltage gradient along the length of the ion trap or ion guide.

19. A method of mass spectrometry comprising:
providing a mass or mass to charge ratio selective ion trap or ion guide;
providing a first mass filter/analyser or mass spectrometer downstream of said mass or mass to charge ratio selective ion trap or ion guide;
causing ions to be selectively ejected or released from said ion trap or ion guide according to their mass or mass to charge ratio;
scanning said first mass filter/analyser or mass spectrometer in a substantially synchronised manner with the selective ejection or release of ions from said ion trap or ion guide; and
applying one or more DC voltages or one or more DC voltage waveforms to said plurality of electrodes in order to urge ions along the length of said ion trap or ion guide,
wherein the mass or mass to charge ratio resolution of said first mass filter/analyser or mass spectrometer is greater than the mass or mass to charge ratio resolution of said ion trap or ion guide.

* * * * *